(12) United States Patent
Nakai et al.

(10) Patent No.: US 8,134,322 B2
(45) Date of Patent: Mar. 13, 2012

(54) MOTOR CONTROL APPARATUS

(75) Inventors: Yasuhiro Nakai, Kariya (JP); Shigeru Kamio, Nagoya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 12/926,585

(22) Filed: Nov. 29, 2010

(65) Prior Publication Data

US 2011/0068730 A1 Mar. 24, 2011

Related U.S. Application Data

(62) Division of application No. 12/382,603, filed on Mar. 19, 2009, now Pat. No. 8,013,563, which is a division of application No. 11/404,869, filed on Apr. 17, 2006, now abandoned, which is a division of application No. 10/443,795, filed on May 23, 2003, now Pat. No. 7,084,597.

(30) Foreign Application Priority Data

| Jun. 3, 2002 | (JP) | 2002-161849 |
| Jun. 17, 2002 | (JP) | 2002-175377 |
| Jun. 17, 2002 | (JP) | 2002-175378 |
| Jun. 18, 2002 | (JP) | 2002-177738 |
| Jun. 18, 2002 | (JP) | 2002-177739 |
| Jul. 16, 2002 | (JP) | 2002-207560 |
| Sep. 24, 2002 | (JP) | 2002-276521 |

(51) Int. Cl.
*H02P 25/08* (2006.01)
(52) U.S. Cl. .......... 318/437; 318/701
(58) Field of Classification Search .......... 318/437, 318/685, 696, 700, 701
See application file for complete search history.

(56) References Cited

U.S. PATENT DOCUMENTS

| 3,775,648 A | 11/1973 | Brown et al. |
| 4,112,493 A | 9/1978 | Roch et al. |
| 4,299,308 A | 11/1981 | Shung et al. |
| 4,394,594 A | 7/1983 | Schmider et al. |
| 4,468,596 A | 8/1984 | Kinzl et al. |
| 4,494,052 A | 1/1985 | Kelleher et al. |

(Continued)

FOREIGN PATENT DOCUMENTS

JP 55-125096 9/1980

(Continued)

OTHER PUBLICATIONS

Office Action (7 pgs.) dated Dec. 8, 2010 issued in co-pending U.S. Appl. No. 12/382,603.

(Continued)

*Primary Examiner* — Bentsu Ro
(74) *Attorney, Agent, or Firm* — Nixon & Vanderhye P.C.

(57) ABSTRACT

In an automatic transmission position control by a motor, it is determined whether the present instant belongs to a starting period, that is, the present instant is immediately after resetting of a control unit or application of power to it. If it is the starting period, an actual shift position that is detected from an output of an output shaft sensor for detecting a rotation position of a motor is set as an instructed shift position. With this measure, even if the control unit is reset for a certain reason while the vehicle is running, the instructed shift position is not changed in association with the resetting. This prevents trouble that the shift position is switched contrary to the intention of the driver, whereby the reliability of a position switching control can be increased.

6 Claims, 49 Drawing Sheets

U.S. PATENT DOCUMENTS

| | | | | |
|---|---|---|---|---|
| 4,514,670 A | * | 4/1985 | Fassel et al. | 318/467 |
| 4,563,619 A | | 1/1986 | Davis et al. | |
| 4,583,033 A | | 4/1986 | Uehara et al. | |
| 4,670,696 A | | 6/1987 | Byrne et al. | |
| 4,673,848 A | * | 6/1987 | Hagiwara et al. | 318/266 |
| 4,698,562 A | | 10/1987 | Gale et al. | |
| 4,701,687 A | | 10/1987 | Yoshimoto | |
| 4,747,269 A | | 5/1988 | David | |
| 4,761,602 A | | 8/1988 | Leibovich | |
| 4,868,478 A | | 9/1989 | Hedlund et al. | |
| 4,883,999 A | | 11/1989 | Hendershot | |
| 4,959,596 A | | 9/1990 | MacMinn et al. | |
| 4,959,598 A | * | 9/1990 | Yoshida et al. | 318/599 |
| 4,995,159 A | | 2/1991 | Hancock et al. | |
| 5,006,045 A | | 4/1991 | Shimoda et al. | |
| RE33,910 E | | 5/1992 | Compton | |
| 5,168,202 A | | 12/1992 | Bradshaw et al. | |
| 5,489,831 A | | 2/1996 | Harris | |
| 5,539,293 A | | 7/1996 | Randall et al. | |
| 5,649,808 A | | 7/1997 | Gruszecki et al. | |
| 5,661,381 A | | 8/1997 | Blackburn | |
| 5,717,298 A | | 2/1998 | Tang et al. | |
| 5,801,509 A | | 9/1998 | Sawa et al. | |
| 5,820,349 A | | 10/1998 | Caillat | |
| 5,872,442 A | | 2/1999 | Gotou | |
| 5,998,952 A | | 12/1999 | McLaughlin et al. | |
| 6,008,545 A | | 12/1999 | Nagano et al. | |
| 6,040,665 A | | 3/2000 | Shirai et al. | |
| 6,046,560 A | | 4/2000 | Lu et al. | |
| 6,046,561 A | | 4/2000 | Zup et al. | |
| 6,186,599 B1 | | 2/2001 | Otomo et al. | |
| 6,328,136 B1 | | 12/2001 | Tauchi et al. | |
| 6,483,212 B1 | | 11/2002 | Mimura et al. | |
| 6,492,742 B1 | | 12/2002 | Fujikawa et al. | |
| 6,548,977 B2 | | 4/2003 | Vu et al. | |
| 6,653,811 B2 | | 11/2003 | Branecky | |
| 7,026,770 B2 | | 4/2006 | Hemphill et al. | |
| 7,084,597 B2 | | 8/2006 | Nakai et al. | |
| 7,156,217 B2 | | 1/2007 | Raber | |
| 7,221,116 B2 | | 5/2007 | Nakai et al. | |
| 2002/0185990 A1 | | 12/2002 | Elliott et al. | |
| 2003/0030405 A1 | | 2/2003 | Branecky | |
| 2006/0197489 A1 | | 9/2006 | Nakai et al. | |
| 2007/0182353 A1 | | 8/2007 | Kamio et al. | |

FOREIGN PATENT DOCUMENTS

| | | |
|---|---|---|
| JP | 61-15167 | 7/1986 |
| JP | 61-151567 | 7/1986 |
| JP | 02-136098 | 5/1990 |
| JP | 03-124284 | 5/1991 |
| JP | 3-114000 | 11/1991 |
| JP | 05-161396 | 6/1993 |
| JP | 06-178573 | 6/1994 |
| JP | 0 825 708 B1 | 2/1998 |
| JP | 10-146083 | 5/1998 |
| JP | 10-233894 | 9/1998 |
| JP | 11-356079 | 12/1999 |
| JP | 2000-037090 | 2/2000 |
| JP | 2000-69779 | 3/2000 |
| JP | 2000-188892 | 7/2000 |
| JP | 2001-258284 | 9/2001 |
| JP | 2001-268988 | 9/2001 |
| JP | 2001-271917 | 10/2001 |
| JP | 2001-271925 | 10/2001 |
| JP | 2001271917 | 10/2001 |
| WO | 96/23348 | 8/1996 |

OTHER PUBLICATIONS

Office Action issued Jan. 9, 2009 in corresponding U.S. Appl. No. 11/730,871.

Notice of Allowance issued in related U.S. Appl. No. 11/257,306, Date: Jan. 11, 2007.

Office Action issued in related U.S. Appl. No. 11/730,871, Date: Jun. 23, 2009.

Office Action dated Apr. 23, 2010 issued in related U.S. Appl. No. 11/404,869.

Advisory Action issued Jun. 3, 2009 in co-pending U.S. Appl. No. 11/730,871.

Office Action issued Oct. 20, 2020 in U.S. Appl. No. 12/382,603.

* cited by examiner

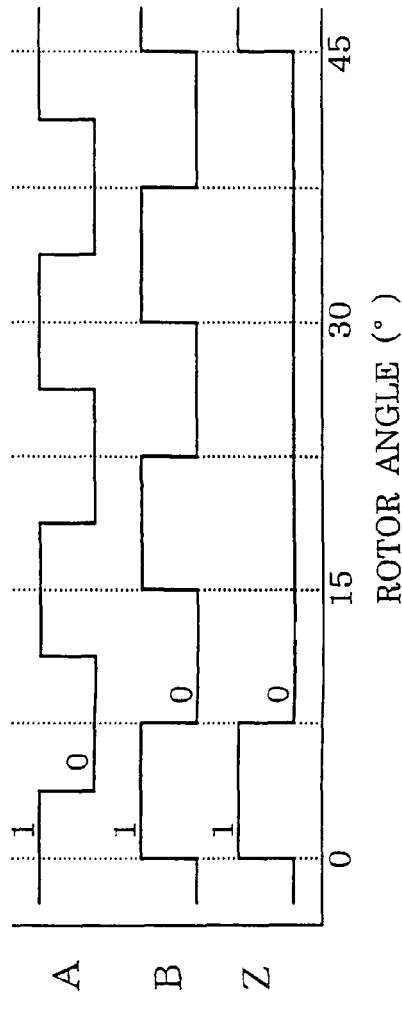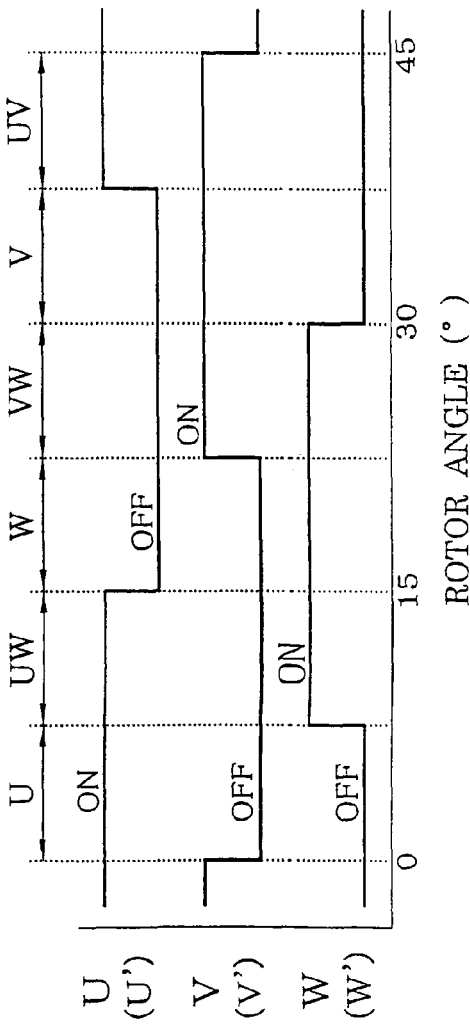

```
    ENCODER
    COUNTER
       │
       ▼
┌─────────────────┐
│  READ A(i), B(i)│──301
└─────────────────┘
       │
       ▼
┌──────────────────────────────┐
│ ΔN=f(A(i), B(i), A(i-1), B(i-1))│──302
└──────────────────────────────┘
       │
       ▼
┌─────────────────┐
│  Ncnt=Ncnt+ΔN   │──303
└─────────────────┘
       │
       ▼
┌─────────────────┐
│   A(i)=A(i-1)   │──304
│   B(i)=B(i-1)   │
└─────────────────┘
       │
       ▼
      END
```

| B (i) | A (i) | B (i-1) | A (i-1) | ΔN |
|---|---|---|---|---|
| 0 | 1 | 0 | 0 | -1 |
| 1 | 0 | 0 | 0 | +1 |
| 0 | 0 | 0 | 0 | 0 |
| 1 | 1 | 0 | 0 | 0 |
| 1 | 1 | 0 | 1 | -1 |
| 0 | 0 | 0 | 1 | +1 |
| 0 | 1 | 0 | 1 | 0 |
| 1 | 0 | 0 | 1 | 0 |
| 0 | 0 | 1 | 0 | -1 |
| 1 | 1 | 1 | 0 | +1 |
| 1 | 0 | 1 | 0 | 0 |
| 0 | 1 | 1 | 0 | 0 |
| 1 | 0 | 1 | 1 | -1 |
| 0 | 1 | 1 | 1 | +1 |
| 1 | 1 | 1 | 1 | 0 |
| 0 | 0 | 1 | 1 | 0 |

| Mptn%12 | 0 | 1 | 2 | 3 | 4 | 5 | 6 | 7 | 8 | 9 | 10 | 11 |
|---|---|---|---|---|---|---|---|---|---|---|---|---|
| CURRENT SUPPLY | VW | VW | W | W | UW | UW | U | U | UV | UV | V | V |

| BATTERY (V) | 7.5 | 10 | 12 | 16 |
|---|---|---|---|---|
| DUTY (%) | 30 | 20 | 20 | 10 |

| BATTERY (V) | 7.5 | 12 | 14 | 16 |
|---|---|---|---|---|
| $\Delta$Nover | 30 | 40 | 50 | 60 |

$\Delta Gnp = \Delta Gp = (\Delta Nact - \Delta Nd)/2$

| Mptn%12 | 0 | 1 | 2 | 3 | 4 | 5 | 6 | 7 | 8 | 9 | 10 | 11 |
|---|---|---|---|---|---|---|---|---|---|---|---|---|
| CURRENT SUPPLY | W | W | W | W | U | U | U | U | V | V | V | V |

MOTOR CONTROL APPARATUS

CROSS REFERENCE TO RELATED APPLICATION

This is a divisional of U.S. application Ser. No. 12/382,603, filed Mar. 19, 2009, which in turn is a divisional U.S. application Ser. No. 11/404,869, filed Apr. 17, 2006, which in turn is a divisional of U.S. application Ser. No. 10/443,795 (now U.S. Pat. No. 7,084,597), filed May 23, 2003, the entire contents of each of which are hereby incorporated by reference in this application. This application is based on and incorporates herein by reference Japanese Patent Application Nos. 2002-161849 filed on Jun. 3, 2002, 2002-175377 filed on Jun. 17, 2002, 2002-175378 filed on Jun. 17, 2002, 2002-177738 filed on Jun. 18, 2002, 2002-177739 filed on Jun. 18, 2002, 2002-207560 filed on Jul. 16, 2002, and 2002-276521 filed on Sep. 24, 2002.

FIELD OF THE INVENTION

The present invention relates to a motor control apparatus for rotationally driving (rotating) the rotor of a motor by sequentially switching the current supply phase of the motor on the basis of an output signal of an encoder.

BACKGROUND OF THE INVENTION

Among brushless motors such as switched reluctance motors the demand for which has increased recently because they are inexpensive and simple in structure are ones that incorporate an encoder for outputting a pulse signal in synchronism with the rotation of the rotor and in which the rotor is rotated by sequentially switching the current supply phase by counting pulses of the output signal of the encoder and detecting the rotation position of the rotor on the basis of the count.

First, in this type of motor having an encoder, the rotation amount (i.e., a rotation angle) from a start position of the rotor can merely be detected on the basis of the count, after starting, of an output signal of the encoder. Therefore, the motor cannot be driven normally unless a corresponding relationship between the rotor rotation position and the current supply phase is obtained by detecting the absolute rotation position of the rotor by a certain method after the application of power.

In this connection, for example, JP-A-2000-69779 discloses a switched reluctance motor in which current supply is simultaneously effected for two phases at the beginning of a starting period and a current supply phase is determined after a lapse of a prescribed time by using, as a reference, a rotation position of the rotor at that time. However, mere simultaneous two-phase current supply at the beginning of a starting period not always causes the rotor to rotate to a position corresponding to the two current supply phases; there may occur a case that a corresponding relationship between the rotor rotation position and the current supply phase is not obtained. Another mode is proposed in which current supply is effected for one phase first and for two phases simultaneously.

An unstable region that will be caused by two-phase current supply is eliminated by effecting one-phase current supply first. The rotor is rotated to a single stable point by later two-phase current supply and a reference position of the rotor is thereby learned. However, producing lower torque than two-phase current supply does, one-phase current supply may not be sufficient for the rotor to rotate to a corresponding position. Therefore, merely effecting one-phase current supply first may not eliminate an unstable region that will be caused by two-phase current supply, and a reference position of the rotor may still be learned erroneously.

Second, where a position switching control is performed with a motor having an encoder, if the rotation direction of the rotor is revered due to some inexorability while the rotor is rotated to a target position on the basis of the count of the encoder, the count changing direction of the encoder is also reversed. As a result, the current supply phase switching order that is determined on the basis of the count of the encoder is also reversed to generate torque that drives the rotor in the reverse direction. Once the rotor starts to rotate in the reverse direction, the reverse rotation is accelerated rather than suppressed. This raises a problem that long time is needed to return the rotation direction from the reverse direction to the normal direction; the rotor may reach a target position with a long delay or, in the worst case, it may become impossible to stop the reverse rotation, that is, the motor may become uncontrollable.

Third, where the rotor is rotated to a target position by a feedback control, the following control is performed. Every time a new target position is set, a feedback control is performed in which the rotor is rotated toward the target position by switching the current supply phase sequentially on the basis of the count of the encoder. When the count of the encoder has reached a target count that is set as corresponding to the target position, it is determined that the rotor has reached the target position, whereupon the feedback control is finished and the rotor is stopped at the target position. In this case, the rotor can be kept at the target position by electromagnetic force by continuing to energize the winding of the phase corresponding to the target position after completion of the feedback control. However, in this configuration, if the rotor is stopped for a long time, the winding of the same phase continues to be energized for a long time and hence may overheat and burn. To prevent the winding from overheating or burning, the winding is not energized while the rotor is stopped.

However, where the rotor is not energized while it is stopped, there is no electromagnetic force for keeping the rotor at a target position (i.e., a position when the rotor stopped) and hence the rotor may deviate from the target position. One countermeasure is to provide a mechanical stopping and holding mechanism for keeping the rotor at a target position by spring force or the like. However, even with this measure, the rotor may still deviate from the target position due to play amount in the stopping and holding mechanism, its variations in manufacture, or the like. If the position of the rotor deviates in a period when it should be stopped, a feedback control is restarted from a current supply phase that is different from A-phase for which current supply should be effected first. In this case, the rotor may not be rotated normally to a target position; for example, a loss of synchronization occurs at the start of the feedback control to cause a failure of starting or the rotor is rotated away from the target position.

If the rotor deviates only slightly while it is stopped and the position of the rotor stays within a range corresponding to a count of the encoder with which the preceding feedback control finished, current supply is effected first for A-phase with which the preceding feedback control finished. However, a feedback control is performed by using, as a reference, a position of the rotor for current supply. Therefore, even if the deviation of the rotor is so small that its position stays within a range corresponding to a count of the encoder, a loss of synchronization may still occur at the start of a feedback control to cause a failure of starting if the feedback control is started after current supply is effected for A-phase for which current supply should be effected first and before the rotor is moved to a position for current supply and kept there.

Fourth, the rotation amount (i.e., rotation angle) of the motor is converted via a rotation transmission system into the manipulated variable for a control object (a position switching device). However, play amount due to backlash, clearances, etc. exists between constituent parts of the rotation transmission system. Therefore, even if the rotation amount of the motor can be controlled correctly on the basis of the count of the encoder, an error corresponding to the play amount in the rotation transmission system occurs in the manipulated variable for the control object and hence the manipulated variable for the control object cannot be controlled accurately.

Fifth, in rotating the rotor to a target position, the current supply phase switching is performed on the basis of the count of the encoder. To generate torque for rotating the rotor, the phase of the current supply phase need to lead the rotation phase of the rotor. As the rotation speed of the rotor increases after a start of driving, the variation rate of the count of the encoder increases and the current supply phase switching becomes faster. However, torque is generated actually with a delay corresponding to the inductance of the winding of a current supply phase from a start of current supply of the winding. Therefore, if the rotation speed of the rotor is too high, the rotor rotates by a considerable angle from a start of current supply of the current supply phase winding to actual torque generation, that is, the generation of torque of the current supply phase delays from the actual rotation phase of the rotor. In this state, the driving torque decreases and the rotation speed of the rotor lowers. A requirement of increase in position switching rate (i.e., increase in the rotation speed of the rotor) cannot be satisfied.

One countermeasure against this problem would be setting the phase lead of the current supply phase to a large value in advance. However, if the phase lead of the current supply phase is large at a start of driving (i.e., at starting), the starting torque becomes low and the starting of the motor becomes unstable or results in a failure. Further, if the phase lead of the current supply phase is set large and the rotation speed of the rotor is thereby increased, the rotor tends to pass a target position due to inertia at an end of driving (occurrence of an overshoot), that is, it is difficult to stop the rotor at the target position correctly. Another measure for increasing the stability of the position switching control would be effecting current supply in such a manner that the current supply phase is selected so that rotor is temporarily stopped and kept there at a start of driving, at an end of the driving, and when the target position is changed (or the rotation direction is reversed). However, if this is done by one-phase current supply that produces low position-keeping torque, the rotor vibrates and cannot be stopped completely at each position.

Sixth, the motor is controlled by a microcomputer and the microcomputer may be reset for a certain reason (e.g., a short power break) while controlling the motor. If the microcomputer is reset, target position data after the resetting become different from those before the resetting because a RAM for storing target position data is also reset. As such, resetting of the microcomputer may cause a problem that a control object is switched contrary to the intention so as to be directed to an unintended position.

Seventh, where a motor feedback control according to JP-A-2001-271917 is employed, the current supply phase is switched in synchronism with output of pulses of a pulse signal of the encoder. Therefore, if the rotation of the rotor is stopped for a certain reason during a feedback control and the output of the pulse signal from the encoder is also stopped, the current supply phase switching can no longer be performed. This means a problem that the rotor cannot be rotated to a target position.

SUMMARY OF THE INVENTION

An object of the present invention is to improve the motor control apparatus s having the above drawbacks.

According to a first aspect of the invention, in an initial drive that is performed after application of power, a corresponding relationship between a count of the output signal of the encoder, a rotation position of the rotor, and a current supply phase at an end of the initial drive is learned by counting pulses of the output signal of the encoder by effecting current supply for all phases of the motor around according to a prescribed time schedule. In an ordinary drive that is performed after the initial drive, a current supply phase is determined on the basis of a count of the output signal of the encoder and a learning result that is obtained at the end of the initial drive. As described above, current supply is effected for all the phases around in an initial drive, whereby a rotation position of the rotor necessarily coincides with one of the current supply phases.

From this time onward, the rotor rotates in synchronism with the current supply phase switching and pulse output signals are output from the encoder in synchronism with the rotation of the rotor. Therefore, an angle (i.e., a rotation amount) by which the rotor has rotated actually in synchronism with the current supply phase switching until the end of the initial drive is recognized by checking an encoder count of the output signals of the encoder at the end of the initial drive, whereby a corresponding relationship between the encoder count, a rotation position of the rotor, and a current supply phase at the end of the initial drive can be recognized. Learning this corresponding relationship makes it possible to rotate the motor normally by selecting a correct current supply phase in a subsequent ordinary drive on the basis of a count of the output signals of the encoder and a learning result at the end of the initial drive.

According to a second aspect of the invention, in rotating the rotor to a target position on the basis of the encoder count, the variation direction of the encoder count is monitored and it is determined whether the rotation direction of the rotor has reversed from the rotation direction toward the target position. If reversing is detected, current supply for phases with which the rotor is driven in the reverse direction is prohibited. With this measure, even if the rotation direction of the rotor is reversed due to some inexorability and the variation direction of the encoder count is thereby reversed while the rotor is rotated to a target position on the basis of the encoder count, generation of torque that drives the rotor in the reverse rotation direction can be prevented. Therefore, the time taken to return the rotation direction from the reverse direction to the normal direction can be shortened. A stable position switching control (positioning control) is enabled.

According to a third aspect of the invention, current supply of the motor is turned off after execution of a feedback control in which rotational driving on the rotor is started each time the target position is changed and the rotor is rotated to a new target position by sequentially switching the current supply phase of the motor on the basis of the count of the output signal of the encoder. Before another feedback control is started from a current supply-off state of the motor, in a prescribed period, a feedback control start position stopping and holding process in which a current supply phase is selected on the basis of a current count of the output signal of the encoder and current supply is effected for the selected current supply phase, and the control means thereafter rotates the rotor to a target position by performing the feedback control.

As described above, a feedback control start position stopping and holding process is executed immediately before the start of a feedback control, whereby the rotor is kept at a position where the preceding feedback control finished. Therefore, even if the position of the rotor deviated in a period when the rotor should be stopped, the rotor can be positioned at a proper position at the start of a feedback control. As a result, at the start of the feedback control, the position of the rotor and the current supply phase can reliably be synchronized with each other from the first current supply phase. It becomes possible to prevent a loss of synchronization and prevent the rotor from rotating away from a target position at the start of the feedback control, to allow the rotor to reliably rotate to the target position with a stable feedback control, and to perform a position switching control (positioning control) that is highly stable and reliable.

According to a fourth aspect of the invention, a play amount of a rotation transmission system for converting a rotation amount of the motor into a manipulated variable for a control object is learned. To learn a play amount of the rotation transmission system, a first-direction butting control for rotating the rotor until butting occurs at one limit position of a movable range of the control object and a second-direction butting control for rotating the rotor until butting occurs at the other limit position of the movable range are performed. An increase or decrease of the encoder count from the one limit position to the other limit position is determined as an actual measurement value of the movable range of the control object, and a difference between the actual measurement value of the movable range and a design value of the movable range is learned as a play amount of the rotation transmission system. When the rotor is thereafter rotated to the target position, the target position is set by taking the learned play amount of the of the rotation transmission system into consideration.

According to a fifth aspect of the invention, the phase lead of the current supply phase with respect to the rotation phase of the rotor is corrected in accordance with the rotation speed of the rotor. Starting torque can be increased by decreasing the phase lead of the current supply phase at a start of driving, whereby the rotation speed of the rotor can be raised quickly. Since the phase lead of the current supply phase is corrected so as to increase as the rotation speed of the rotor increases, a synchronized relationship between the generation of torque of the current supply phase and the actual rotation phase of the rotor can be maintained even during high-speed rotation, which makes it possible to rotate the rotor stably at high speed. Superior starting performance and superior high-speed rotation performance can thus be attained simultaneously.

According to a sixth aspect of the invention, a target position is stored in a nonvolatile memory. At starting, the target position stored in the nonvolatile memory is set as a target position of starting. With this measure, even if the controller (e.g., a microcomputer) of the motor is reset for a certain reason, at subsequent starting a target value that is stored in the nonvolatile memory immediately before the resetting is set as a target value of starting. Therefore, target value data are not changed in association with the resetting, which prevents a control object from being rotated to an unintended position.

According to a seventh aspect of the invention, a first current supply phase is set on the basis of an encoder count in synchronism with output of a pulse of an output signal of the encoder during a drive control on the motor. A second current supply phase is set on the basis of the encoder count in a prescribed cycle until the rotor reaches a target position. Every time a first or second current supply phase is set, the a winding of the thus-set current supply phase is energized.

With this configuration, even if the rotation of the rotor is once stopped for a certain reason during a motor drive control and the encoder stops outputting a pulse output signal, the second current supply phase is set in the prescribed cycle on the basis of an encoder count of that instant. Therefore, the current supply phase can be switched even after the rotor was once stopped, and the rotor can be rotated so as to come as close to a target position as possible.

BRIEF DESCRIPTION OF THE DRAWINGS

The above and other objects, features and advantages of the present invention will become more apparent from the following detailed description made with reference to the accompanying drawings. In the drawings:

FIG. 7A is a time chart showing output waveforms of the encoder;

FIG. 7B is a time chart showing a current supply phase switching pattern;

DETAILED DESCRIPTION OF THE PREFERRED EMBODIMENT

First Embodiment

A first embodiment in which the present invention is applied to a position switching device of a vehicle will be hereinafter described with reference to FIGS. 1-48.

Figure 1:
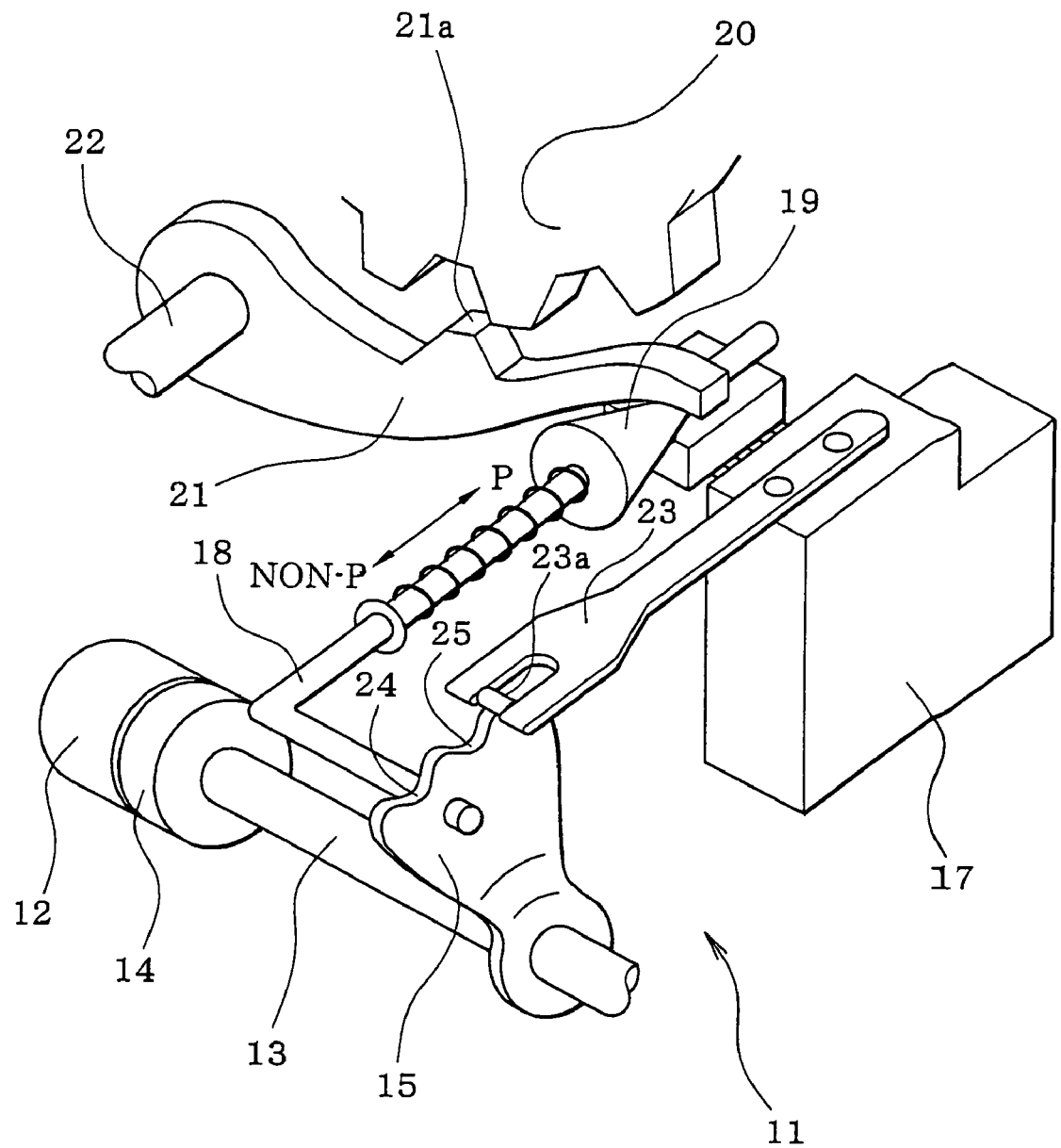
FIG. 1 is a perspective view of a position switching device according to a first embodiment of the present invention.

First, the configuration of a position switching mechanism 11 will be described with reference to FIG. 1. A motor 12 as a drive source of the position switching mechanism 11 is a switched reluctance motor, for example, incorporates a speed-reducing mechanism 26 (see FIG. 4), and is equipped with an output shaft sensor 14 for detecting a rotation position of the output shaft 13 of the speed-reducing mechanism 26. A detent lever 15 is fixed to the output shaft 13.

An L-shaped parking rod 18 is fixed to the detent lever 15. A conical body 19 that is provided at the tip of the parking rod 18 is in contact with a lock lever 21. The lock lever 21 is moved in the vertical direction in accordance with the position 2c of the conical body 19 and thereby locks or unlocks a parking gear 20. The parking gear 20 is attached to the output shaft of an automatic transmission 27. If the parking gear 20 is locked by the lock lever 21, the drive wheels of the vehicle are kept in a rotation-prevented state (i.e., a parking state).

On the other hand, a detent spring 23 for keeping the detent lever 15 at the position of a parking position (hereinafter abbreviated as "P-position") or the other range (hereinafter referred to as "non-P-position") is fixed to a support base 17. The detent lever 15 is kept at the P-position when an engaging portion 23a that is provided at the tip of the detent spring 23 goes into a P-position holding recess 24 of the detent lever 15. The detent lever 15 is kept at the non-P-position when the engaging portion 23a of the detent spring 23 goes into a non-P-position holding recess 25 of the detent lever 15.

In the P-position, the parking rod 18 is moved in such a direction as to approach the lock lever 21, whereby a thick portion of the conical body 19 lifts up the lock lever 21 and a projection 21a of the lock lever 21 goes into a tooth space of the parking gear 20 to lock it. As a result, the output shaft of the automatic transmission 27 (and the drive wheels) is kept in a locked state (i.e., a parking state).

On the other hand, in the non-P-position, the parking rod 18 is moved in such a direction as to go away from the lock lever 21, whereby the thick portion of the conical body 19 goes out of contact with the lock lever 21 and hence the lock lever 21 goes down. As a result, the projection 21a of the lock lever 21 disengages from the parking gear 20 and hence the parking gear 20 is unlocked. The output shaft of the automatic transmission 27 is kept in a rotatable state (i.e., a state that the vehicle is capable of running).

The above output shaft sensor 14 is a rotary sensor (e.g., a potentiometer) for outputting a voltage corresponding to a rotation angle of the output shaft 13 of the speed-reducing mechanism 26 of the motor 12. Whether the current range is the P-position or the non-P-position can be recognized on the basis of the output voltage of the output shaft sensor 14.

Figure 2:
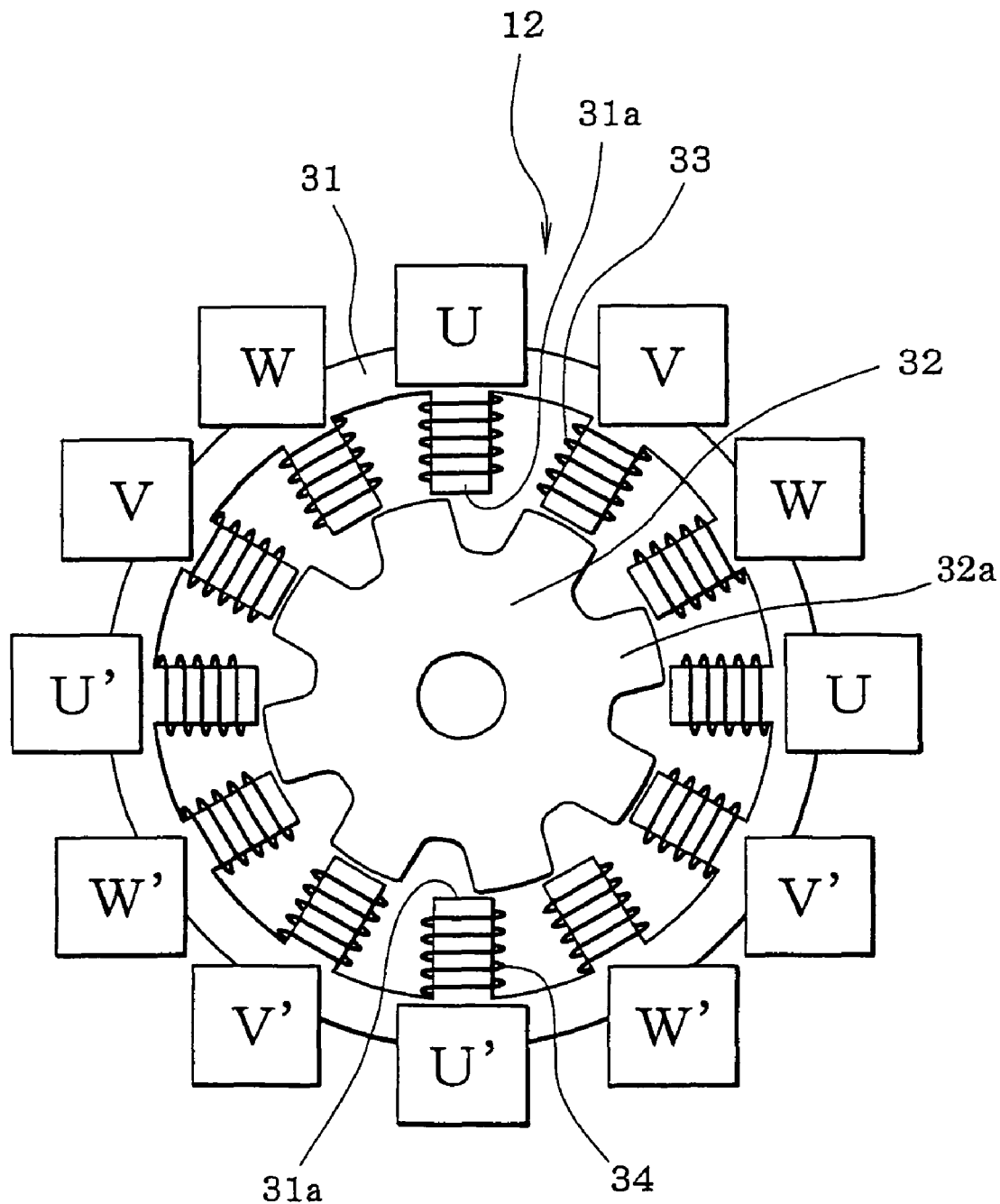
FIG. 2 shows the structure of an SR motor.

Next, the structure of the motor 12 will be described with reference to FIG. 2. In this embodiment, the motor 12 is a switched reluctance motor (hereinafter abbreviated as "SR motor"). The SR motor 12, in which both of a stator 31 and a rotor 32 have salient poles, has an advantage that no permanent magnet is necessary and hence the structure is simple. The inner circumferential surface of a cylindrical body of the stator 31 is formed with 12 salient poles 31a, for example, at regular intervals.

On the other hand, the rotor 32 has eight salient poles 32a, for example, that project outward and are arranged at regular intervals in the circumferential direction. As the rotor 32 rotates, each salient pole 32a of the rotor 32 faces the salient poles 31a of the stator 31 in order with a small gap interposed in between. The 12 salient poles 31a of the stator 31 are wound with a total of six windings 33 of U, V, and W-phases and a total of six windings 34 of U', V', and W-phases in order. It goes without saying that the number of salient poles 31a of the stator 31 and the number of salient poles 32a of the rotor 32 may be changed as appropriate.

Figure 3:
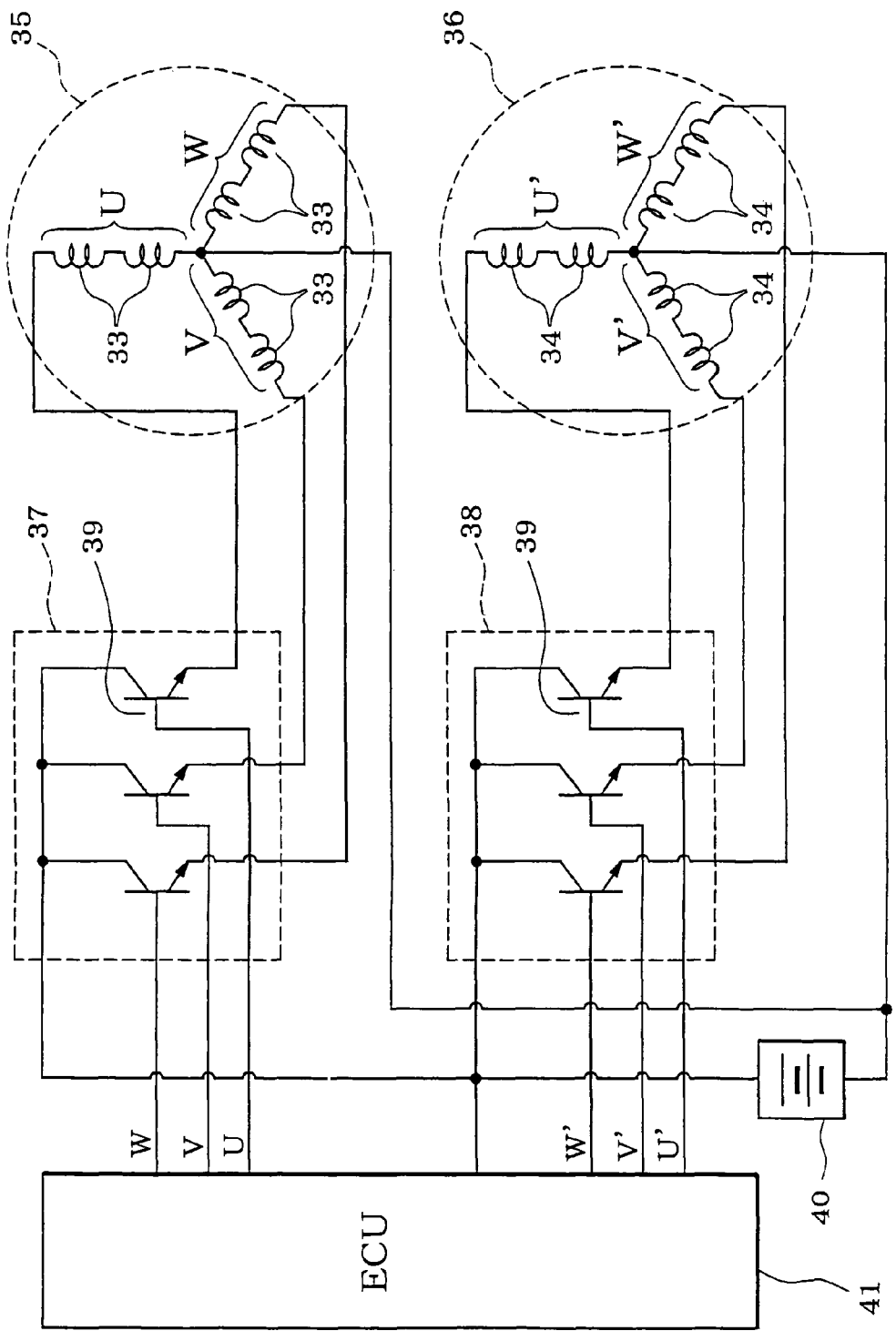
FIG. 3 is a circuit diagram showing the configuration of a circuit for driving the SR motor.

In this embodiment, the windings 33 and 34 are wound on the 12 salient poles 31a of the stator 31 in order of V-phase→W-phase→U-phase→V-phase→W-phase→U-phase→V'-phase→W-phase→U'-phase→V'-phase→W-phase→U'-phase, for example. As shown in FIG. 3, the six windings 33 of the U, V, and W-phases and the six windings 34 of the U', V', and W-phases are connected to each other so as to form two systems of motor energizing sections 35 and 36. The one motor energizing section 35 is formed by Y-connecting the six windings 33 of the U, V, and W-phases (the two windings 33 of the same phase are connected to each other in series). The other one motor energizing section 36 is formed by Y-connecting the six windings 34 of the U', V', and W-phases (the two windings 34 of the same phase are connected to each other in series). In the two motor energizing sections 35 and 36, the windings of the U-phase and the U'-phase are energized at the same time, the windings of the V-phase and the V'-phase are energized at the same time, and the windings of the W-phase and the W-phase are energized at the same time.

The two motor energizing sections 35 and 36 are driven by separate motor drivers 37 and 38, respectively, with a battery 40 of the vehicle used as a power source. Providing the two systems of motor energizing sections 35 and 36 and the two systems of motor drivers 37 and 38 in this manner makes it possible to rotate the SR motor 12 through the other system even if one system fails. Although the circuit configuration of each of the motor drivers 37 and 38 is of a unipolar driving type in which a switching element 39 such as a transistor is provided for each phase, a bipolar driving type circuit configuration may be employed in which two switching elements are provided for each phase. It goes without saying that the invention is also applicable to a configuration in which only a single-system motor energizing section and only a single-system motor driver are provided.

Figure 4:
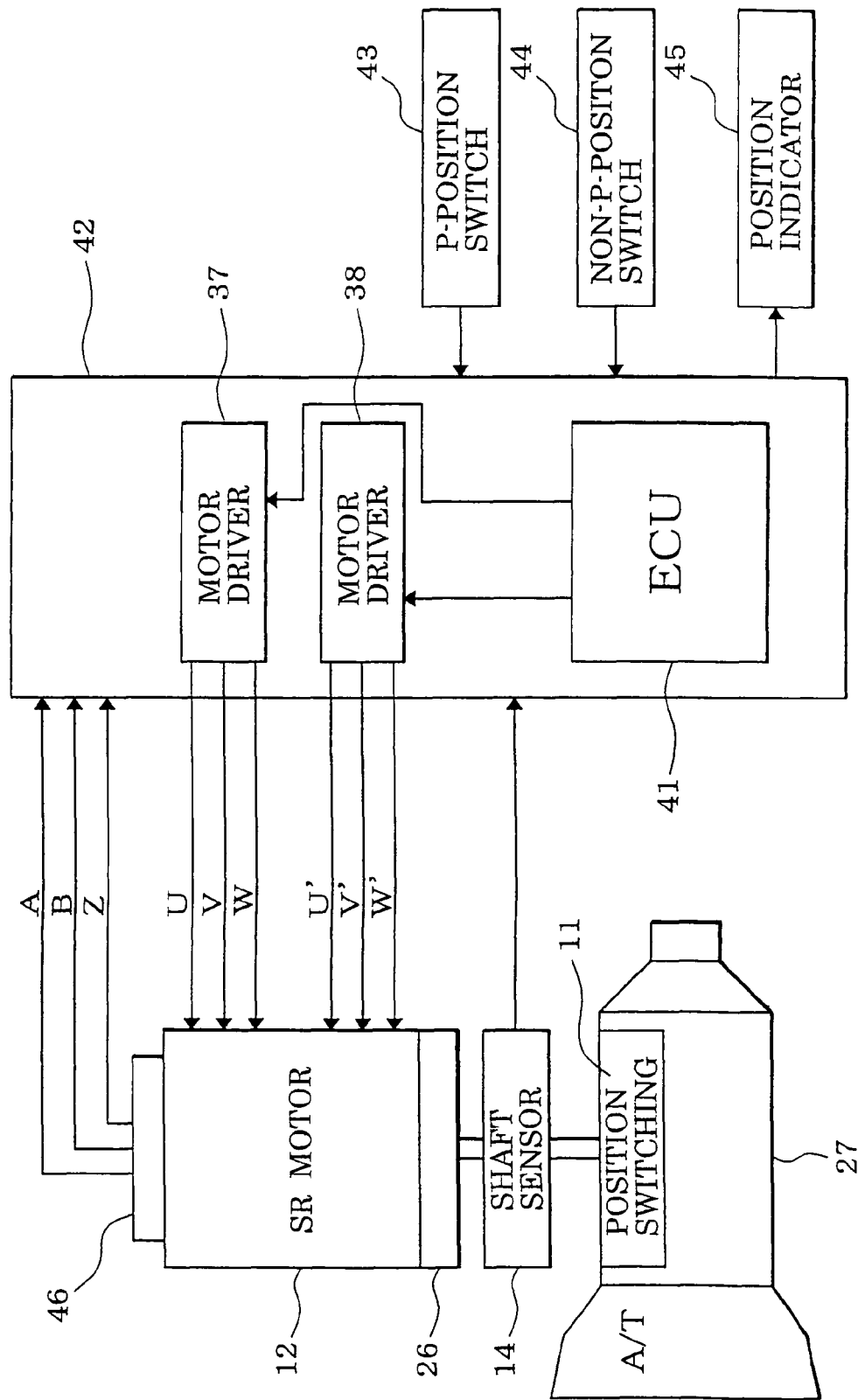
FIG. 4 schematically shows the configuration of the entire control system of the position switching device.

The on/off control on the switching elements 39 of the motor drivers 37 and 38 is performed by an ECU 41 (control means). As shown in FIG. 4, the ECU 41 and the motor drivers 37 and 38 are incorporated in a position switching controller 42. Manipulation signals from a P-position switch 43 for a manipulation of switching to the P-position and a non-P-position switch 44 for a manipulation of switching to the non-P-position are input to the position switching controller 42. A range that has been selected by manipulating the P-position switch 43 or the non-P-position switch 44 is indicated in a range indication section 45 that is provided in an instrument panel (not shown). The P-position switch 43 or the non-P-position switch 44 are momentary switches, for example.

Figure 5:
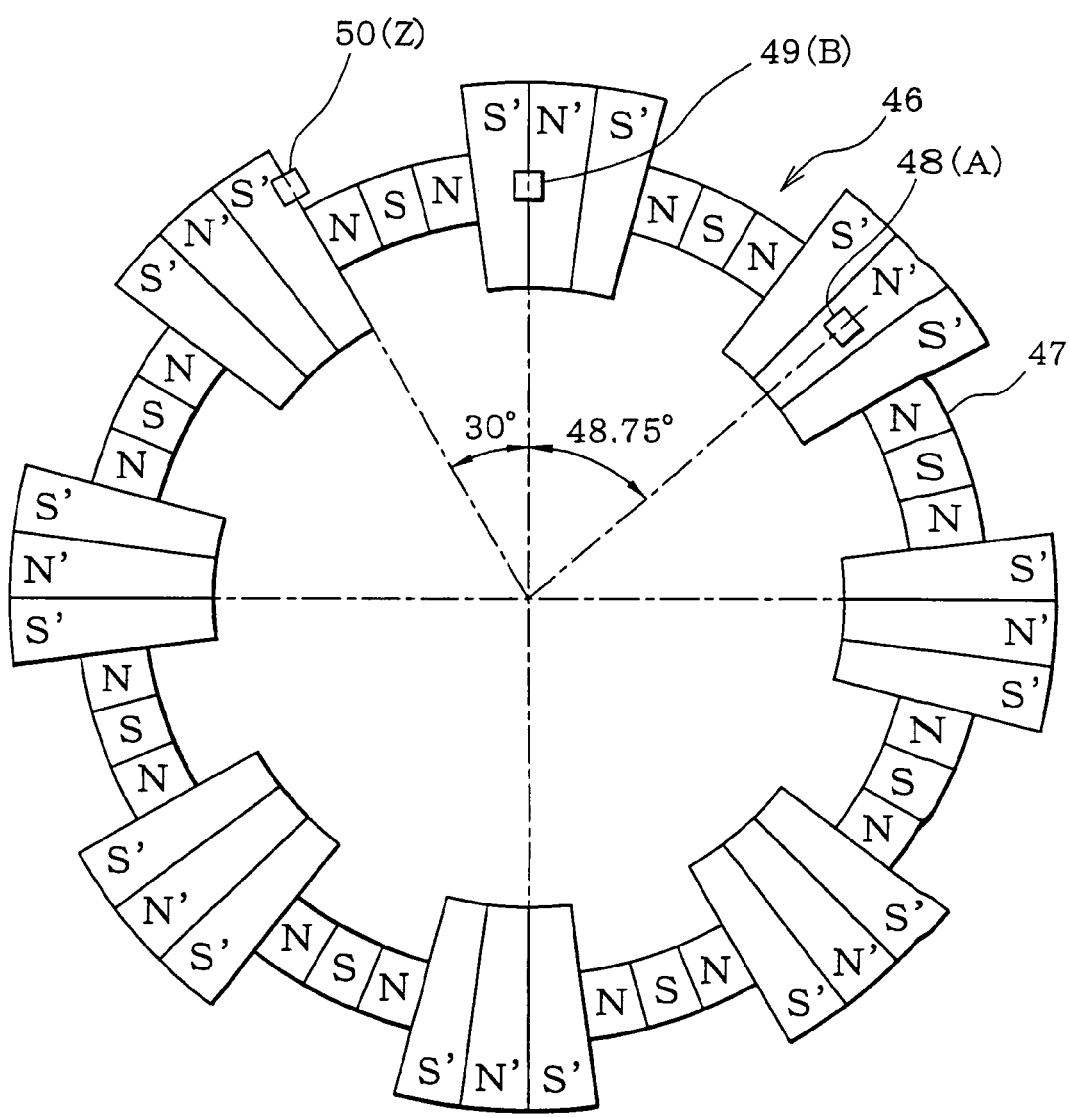
FIG. 5 is a plan view showing the structure of a rotary magnet of an encoder.
Figure 6:
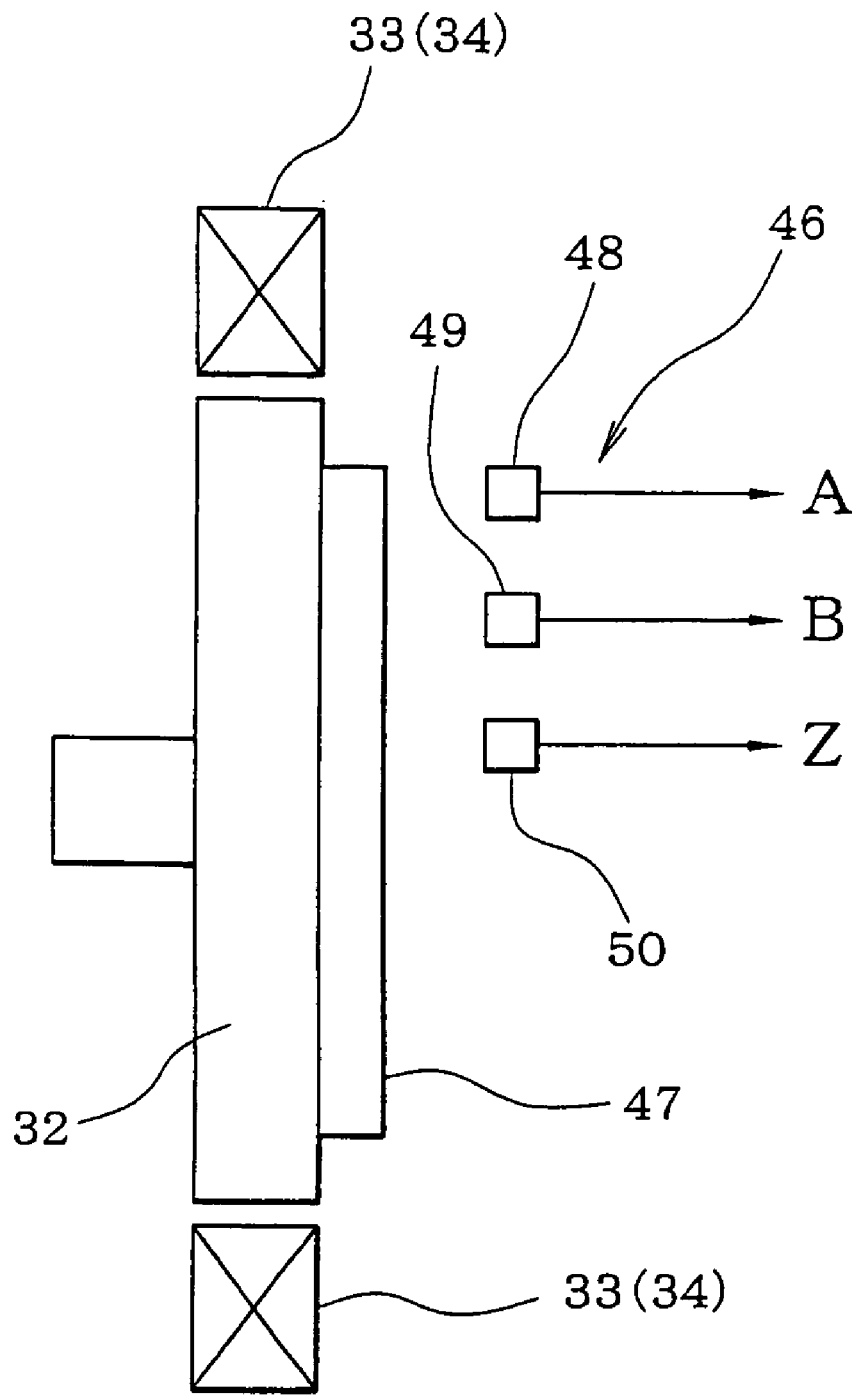
FIG. 6 is a side view of the encoder.

The SR motor 12 is equipped with an encoder 46 for detecting a rotation position of the rotor 32. A specific structure of the encoder 46, which is a magnetic rotary encoder, for example, is as follows. As shown in FIGS. 5 and 6, an annular rotary magnet 47 that is magnetized in such a manner that N poles and S poles are arranged alternately in the circumferential direction with a constant pitch is fixed to a side surface of the rotor 32 concentrically. Three magnetism detecting elements 48-50 such as Hall ICs are opposed to the rotary magnet 47. In this embodiment, the magnetization pitch of the N poles and the S poles of the rotary magnet 47 is set at 7.5° which is equal to a rotation angle of the rotor 32 corresponding to single current supply on the SR motor 12. As described later, when the current supply phase of the SR motor 12 is switched six times by a one/two-phase current supply method, current supply is effected for all the phases around and the rotor 32 and the rotary magnet 47 rotate together by 7.5°×6=45°. The number of N poles and S poles existing in this rotation angle range 45° of the rotary magnet 47 is six in total.

N poles (N' poles) corresponding to reference rotation positions of the rotor 32 and S poles (S' poles) on both sides of each of those N poles are wider than the other magnetic poles in the radial direction. In this embodiment, in view of the fact that the rotor 32 and the rotary magnet 47 rotate together by 45° while current supply is effected for all the phases of the SR motor 12 around, the wide magnetized portions (N') corresponding to the reference rotation positions of the rotor 32 are formed with a pitch of 45°. Therefore, a total of eight wide magnetized portions (N') corresponding to the reference rotation positions are formed in the entire rotary magnet 47. Alternatively, one single wide magnetized portion (N') corresponding to a reference rotation position may be formed in the entire rotary magnet 47.

The three magnetism detecting elements 48-50 are disposed so as to have the following positional relationships with each other and with the rotary magnet 47. The magnetism detecting element 48 for outputting an A-phase signal and the magnetism detecting element 49 for outputting a B-phase signal are disposed on the same circle at such positions as to be able to face both of the narrow magnetized portions (N and S) and the wide magnetized portions (N' and S') of the rotary magnet 47. On the other hand, the magnetism detecting element 50 for outputting a Z-phase signal is disposed outside or inside the narrow magnetized portions (N and S) of the rotary magnet 47 at such positions as to be able to face only the wide magnetized portions (N' and S'). The interval between the two magnetism detecting elements 48 and 49 for outputting an A-phase signal and a B-phase signal, respectively, is set so that the phase difference between the A-phase signal and the B-phase signal becomes 90° in terms of an electrical angle (3.75° in terms of a mechanical angle) as shown in FIG. 7A.

The term "electrical angle" means an angle that is obtained when the cycle of occurrence of each of the A-phase signal and the B-phase signal is regarded as 360°. The term "mechanical angle" is an angle that is obtained when the angle of one rotation of the rotor 32 is regarded as 360°; that is, the mechanical angle of the phase difference between the A-phase signal and the B-phase signal is an angle by which the rotor 32 rotates in a time from a trailing edge (or rising edge) of the A-phase signal to that of the B-phase signal. The magnetism detecting element 50 for outputting the Z-phase signal is disposed so that the phase difference between the Z-phase signal and the B-phase signal (or A-phase signal) becomes 0.

The outputs of the respective magnetism detecting elements 48-50 are at a high level "1" when they face an N pole (or N' pole) and are at a low level "0" when they face an S pole (or S' pole). The output (Z-phase signal) of the magnetism detecting element 50 is at a high level "1" when it faces a wide N' pole corresponding to a reference rotation position of the rotor 32 and is at a low level when it is located at the other positions.

In this embodiment, the rotor 32 is rotated as the ECU 41 counts both of rising edges and trailing edges of the A-phase signal and the B-phase signal according to an encoder counter routine (described later) and switches the current supply phase of the SR motor 12 on the basis of the encoder count. In this operation, the ECU 41 determines the rotation direction of the rotor 32 on the basis of the order of occurrence of an A-phase signal pulse and a B-phase signal pulse. The ECU 41 increases the encoder count in the case of normal rotation (i.e., rotation in a direction from the P-position to the non-P position), and decreases the encoder count in the case of reverse rotation (i.e., rotation in a direction from the non-P-position to the P-position). With this measure, the correspondence between the encoder count and the rotation position of the rotor 32 is maintained irrespective of whether the rotor 32 is rotating in the normal direction or the reverse direction. Therefore, the rotor 32 can be rotated in either the normal direction or the reverse direction by detecting the rotation position (i.e., rotation angle) of the rotor 32 on the basis of the encoder count and energizes windings 33 or 34 of A-phase corresponding to the detected rotation position.

FIGS. 7A and 7B show output waveforms of the encoder 46 and a current supply phase switching pattern in a case that the rotor 32 is rotated in the reverse direction (i.e., the rotation direction from the non-P-position to the P-position), respectively. In either of the case that the rotor 32 is rotating in the reverse direction (i.e., the rotation direction from the non-P-position to the P-position) and the case that the rotor 32 is rotating in the normal direction (i.e., the rotation direction from the P-position to the non-P-position), switching is made between one-phase current supply and two-phase current supply every time the rotor 32 rotates by 7.5°. As the rotor 32 rotates by 45°, current supply is effected for all the phases around in order of U-phase→U and W-phases→W-phase→V and W-phases→V-phase→U and V-phases, for example. Every time the current supply phase is switched, the rotor 32 rotates by 7.5° and the magnetic poles of the rotary magnet 47 that face the A-phase signal magnetism detecting element 48 and the B-phase signal magnetism detecting element 49 change from an N pole to an S pole (or an N' pole to an S' pole) or from an S pole to an N pole (or an S' pole to an N' pole), whereby the levels of the A-phase signal and the B-phase signal are inverted alternately.

As a result, the encoder count increases (or decreases) by two every time the rotor rotates by 7.5°. Further, every time current supply is effected for all the phases around and the rotor rotates by 7.5°, the Z-phase magnetism detecting element 50 faces a wide N' pole corresponding to a reference rotation position of the rotor 32 and the Z signal has a high-level value "1." In this specification, an event that the A-phase signal, the B-phase signal, or the Z-phase signal has a high-level value "1" may be referred to as "an A-phase signal pulse, a B-phase signal pulse, or a Z-phase signal pulse is output."

Since the encoder count is stored in the RAM of the ECU 41, the encoder count disappears when the power to the ECU 41 is turned off. Therefore, an encoder count ("0") in the ECU 41 immediately after power application does not correspond to an actual rotation position (or a current supply phase) of the rotor 32. To switch the current supply phase on the basis of the encoder count, it is necessary to establish correspondence between an encoder count and an actual rotation position of the rotor 32, that is, between an encoder count and a current supply phase, after power application.

In this embodiment the ECU 41 of the position switching controller 42 executes an initial drive routine shown in FIGS. 8 and 9 (described later). That is, during an initial drive that is performed after power application to the ECU 41, current supply is effected for all the phases of the SR motor 12 around according to a prescribed time schedule and edges of the A-phase signal and the B-phase signal of the encoder 46 are counted. A corresponding relationship between an encoder count, a rotation position of the rotor 32, and a current supply phase at the time of completion of the initial drive is learned. In an ordinary drive that is performed subsequently, the current supply phase is determined on the basis of the encoder count and a learning result that was obtained at the end of the initial drive.

Figure 12:
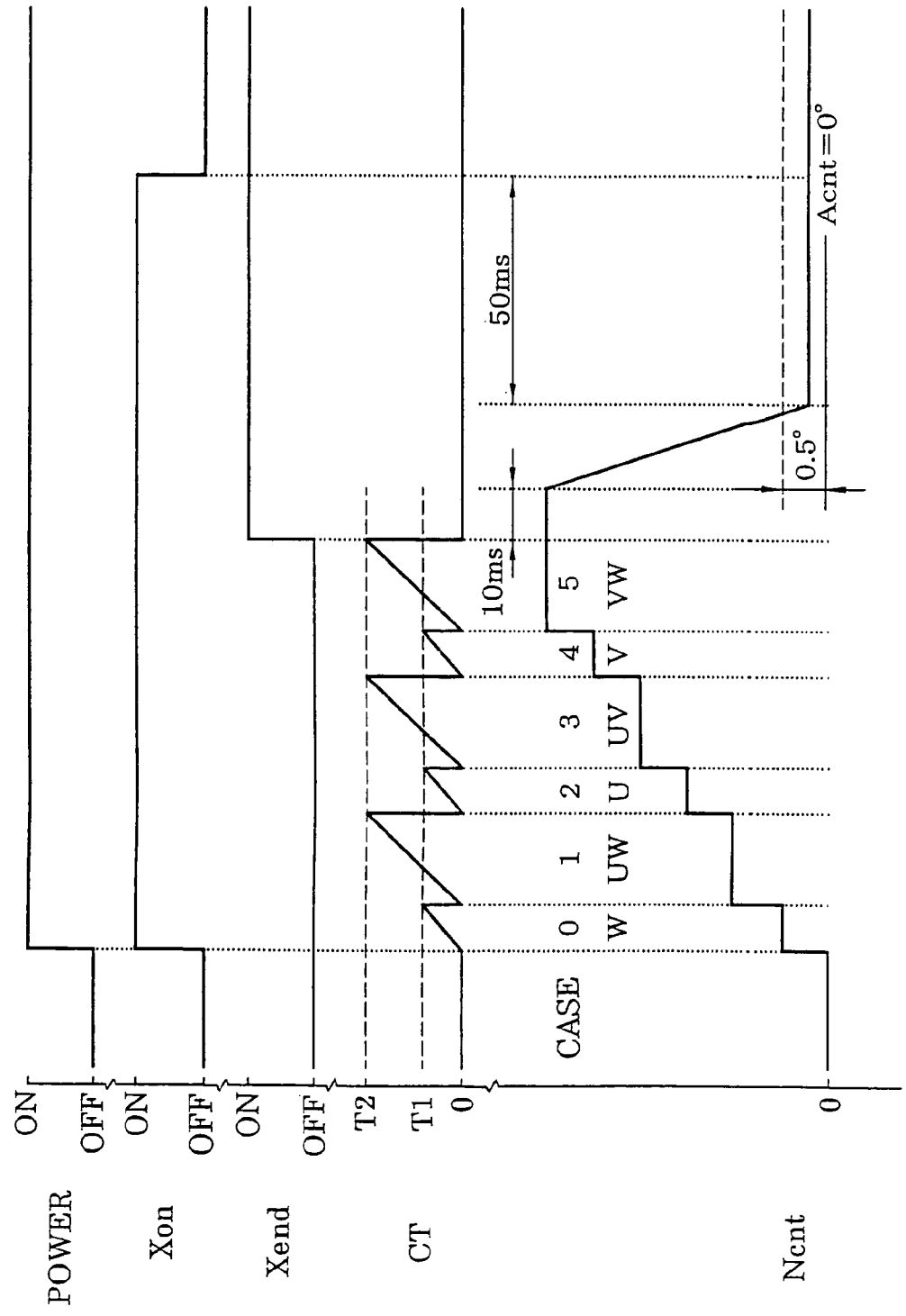
FIG. 12 is a time chart showing an exemplary control of a P-position initial drive.

The learning during an initial drive is performed in the following manner. As shown in FIG. 12, where an initial drive is performed when power is applied to the ECU 41 with the P-posit ion set, current supply is effected for all the phases around according to a prescribed time schedule in order of W-phase→U and W-phases→U-phase→U and V-phases→V-phase→V and W-phases, for example, and the rotor 32 is driven in the normal rotation direction (i.e., the rotation direction from the P-position to the non-P-position).

On the other hand, where an initial drive is performed when power is applied to the ECU 41 with the non-P-position set, current supply is effected for all the phases around according to a prescribed time schedule in order of V-phase→U and V-phases→U-phase→U and W-phases→W-phase→V and W-phases, for example, and the rotor 32 is driven in the reverse rotation direction (i.e., the rotation direction from the non-P-position to the P-position).

In the initial drive, a time T1 of one-phase current supply is set shorter than a time T2 of two-phase current supply; for example, T1 and T2 are set to 10 ms and 100 ms, respectively. In one-phase current supply which produces low torque, the rotor 32 vibrates even after synchronization has been established between the rotation position of the rotor 32 and the current supply phase during an initial drive. In view of this, the time T1 of one-phase current supply is set short so that switching is made to the next two-phase current supply as soon as possible. In this manner, vibration of the rotor 32 is stopped quickly and the output signals of the encoder 46 are stabilized.

If current supply is effected for all the phases around during an initial drive in the above manner, the rotation position of the rotor 32 and the current supply phase necessarily coincide with each other at a certain current supply phase. From this time onward, the rotor 32 rotates in synchronism with the current supply phase switching and the A-phase signal and the B-phase signal are output from the encoder 46 in synchronism with the rotation of the rotor 32.

Both of rising edges and trailing edges of the A-phase signal and the B-phase signal of the encoder 46 are counted during the initial drive. Therefore, an angle (i.e., a rotation amount) by which the rotor 32 has rotated actually in synchronism with the current supply phase switching until the end of the initial drive can be found by checking an encoder count at the end of the initial drive. In this manner, a corresponding relationship between an encoder count, a rotation position of the rotor 32, and a current supply phase at the end of the initial drive is recognized.

In the example of FIG. 12, in an initial drive, the rotor 32 starts with the first current supply phase (W-phase). The rotor rotates by 7.5° and the encoder count increases by two every time the current supply phase is switched. The encoder count reaches 12 at the end of the initial drive.

In contrast, if, for example, the rotor 32 is not rotated by the first three current supply attempts (W-phase→U and W-phases→U-phase) and is rotated by the fourth and ensuing current supply attempts (only three current supply attempts; U and V-phases→V-phase→V and W-phases) in such a manner that the rotation position of the rotor 32 and the current supply phase are synchronized with each other, the rotor 32 rotates 7.5°×3=22.5° until the end of the initial drive and the encoder count reaches 2×3=6. Therefore, an angle (i.e., a rotation amount) by which the rotor 32 has rotated actually in synchronism with the current supply phase switching until the end of the initial drive can be found by checking an encoder count at the end of the initial drive.

Whereas the last current supply phases of an initial drive are always the V and W-phases, the final encoder count need not always be 12 and may be 8 or 4, for example. In an ordinary drive that is performed after the end of an initial drive, the current supply phase is determined on the basis of the encoder count. Therefore, correct current supply phases cannot be selected unless a deviation in encoder count that has occurred in an initial drive is corrected for.

In view of the above, this embodiment makes it possible to select correct current supply phases during an ordinary drive by learning an encoder count at the end of an initial drive as an initial positional deviation learned value and correcting the encoder count using the initial positional deviation learned value during a subsequent ordinary drive. In this manner, the deviation between the encoder count and the current supply phase (i.e., the rotation position of the rotor 32) at the end of the initial drive is corrected for and correct current supply phases can be selected during the ordinary drive.

After the end of the initial drive, as shown in FIG. 12, a feedback control start position stopping and holding process (described later) is executed in which current supply is effected for the same phases as the current supply phases at the end of the initial drive (i.e., V and W-phases) for 10 ms, for example, whereby the rotor 32 is kept at the position where it existed at the end of the initial drive. Then, a feedback control (described later) is performed, whereby the rotor 32 is rotated to a target position Acnt by switching the current supply phase on the basis of an encoder count at that instant and an initial positional deviation learned value. At an instant when the rotation position (encoder count) of the rotor 32 has reached a position that is 0.5° or less, for example, short of the target position Acnt, the current supply phase switching is finished and the rotor 32 is stopped. Then, a target position stopping and holding process (described later) is executed in which current supply is effected for the same phase(s) and the rotor 32 is kept stopped for 50 ms, for example. Then current supply is stopped thereafter unless the target position Acnt is changed.

If a position switching request occurs, that is, the P-position switch 43 or the non-P-position switch 44 is manipulated, during an initial drive, a transition is made to an ordinary drive after the next two-phase current supply is effected (in two-phase current supply itself if a position switching request occurs during that two-phase current supply). And a corresponding relationship between an encoder count, a rotation position of the rotor 32, and a current supply phase at the end of the two-phase current supply is learned. In a subsequent ordinary drive, the current supply phase is determined on the basis of a learning result at the end of the two-phase current supply and the encoder count.

Producing high torque, two-phase current supply can rotate the rotor 32 to a position corresponding to the two-phase current supply even if there was some deviation from it. Therefore, the probability would be high that merely performing two-phase current supply once or twice during an initial drive establishes synchronization between the rotation position and the current supply phase. Therefore, if a position switching request occurs during an initial drive, it would be proper to make a transition to an ordinary drive after completion of the next (or current) two-phase current supply. With this measure, a transition to an ordinary drive can be made quickly after a corresponding relationship between an encoder count, a rotation position of the rotor 32, and a current supply phase is learned.

Figure 13:
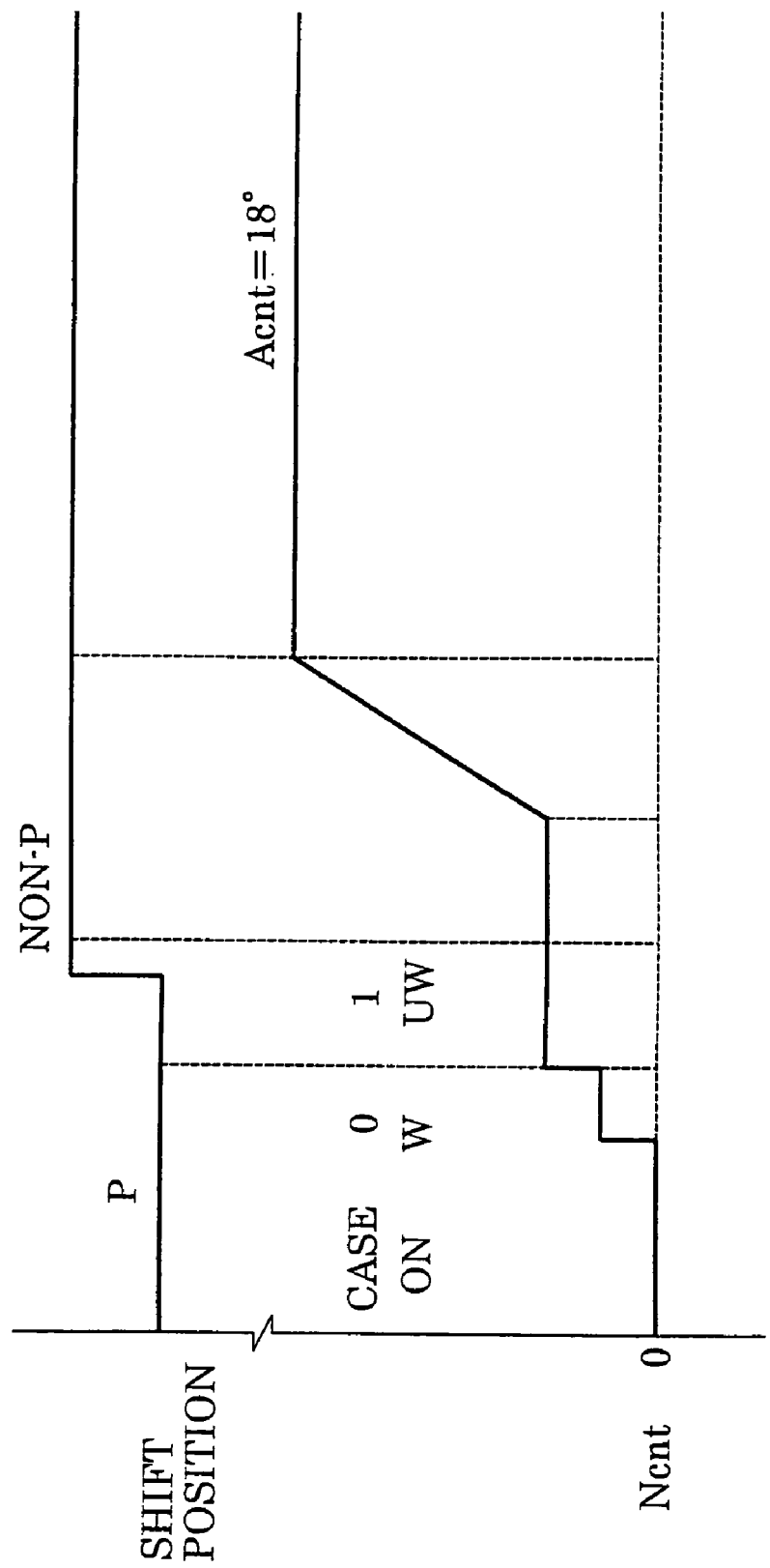
FIG. 13 is a time chart showing an exemplary control in a case that a position switching manipulation is performed during an initial drive.

For example, as shown in a time chart of FIG. 13, if a position switching request from the P-position to the non-P-position occurs during a second current supply attempt (U and W-phases) in an initial drive, the initial drive is finished with the current supply for the U and W-phases and a transition is made to an ordinary drive and a corresponding relationship between an encoder count, a rotation position of the rotor 32, and a current supply phase at the end of the current supply for the U and W-phases is learned. In this embodiment, even in the case where a transition is made to an ordinary drive before completion of an initial drive, an encoder count that would be obtained at the end of the initial drive is estimated with an assumption that the initial drive has been completed as scheduled and an estimate value is employed as an initial positional deviation learned value.

For example, in a case that the initial drive is finished after two current supply attempts for the W-phase and the U and W-phases as shown in FIG. 13, that is, the initial drive is finished without performing four current supply attempts that are supposed to be performed thereafter, it is assumed that the four current supply attempts (U-phase→U and V-phases→V-phase→V and W-phases) have been performed and an initial positional deviation learned value is calculated by adding a count increase (2×4=8) corresponding to a rotation angle of the four current supply attempts to an encoder count at the end of the current supply for the U and W-phases.

In the conventional position switching control, every time the instructed shift position (target position) is switched from the P-posit ion to the non-P-position or in the opposite direction, a feedback control is performed in which the rotor 32 is rotated to the target position by sequentially switching the current supply phase of the SR motor 12 on the basis of the encoder count and the current supply of the SR motor 12 is then turned off.

In this case, after the end of the feedback control, the rotor 12 can be kept at the target position by electromagnetic force by continuing to energize the windings of A-phase corresponding to the target position. However, in this configuration, if the rotor 32 is stopped for a long time, the windings of the same phase continue to be energized for a long time and hence may overheat and burn. To prevent the windings from overheating or burning, the windings are not energized while the rotor 32 is stopped.

However, if the rotor 32 is not energized while it is stopped, there is no electromagnetic force for keeping the rotor 32 at the target position (i.e., the position at the end of the feedback control) and hence the rotor 32 may deviate from the target position. In this embodiment, the mechanical stopping and holding mechanism is provided that keeps the rotor 32 at a target position by spring force of the detent spring 23. However, even in this case, the rotor 32 may deviate from the target position due to play amount in the stopping and holding mechanism, variations in manufacture, etc.

In the conventional position switching control, to start a feedback control, a first current supply phase is determined by using an encoder count at the end of the preceding feedback control. The feedback control is started as soon as the first current supply phase is determined.

Therefore, in the conventional position switching control, if the position of the rotor 32 deviates while it is stopped, a feedback control is started with a current supply phase that is different from A-phase for which current supply should be effected first. In this case, the rotor 32 may not be rotated normally to a target position; for example, a loss of synchronization occurs at the start of the feedback control to cause a failure of starting or the rotor 32 is rotated away from the target position.

If the rotor 32 deviates only slightly while it is stopped and hence the position of the rotor 32 stays within a range corresponding to an encoder count at the end of the preceding feedback control, A-phase for which current supply is effected first is a current supply phase at the end of the preceding feedback control. In this case, even the conventional position switching control has no problems about the first current supply phase.

However, a feedback control is performed by using, as a reference, a position of the rotor 32 for current supply. Therefore, even if the deviation of the rotor 32 is so small that its position stays within a range corresponding to an encoder count at the end of the preceding feedback control, a loss of synchronization may still occur at the start of a feedback control to cause a failure of starting if the feedback control is started after current supply is effected for A-phase for which current supply should be effected first and before the rotor 32 is moved to a position for current supply and kept there.

Figure 18:
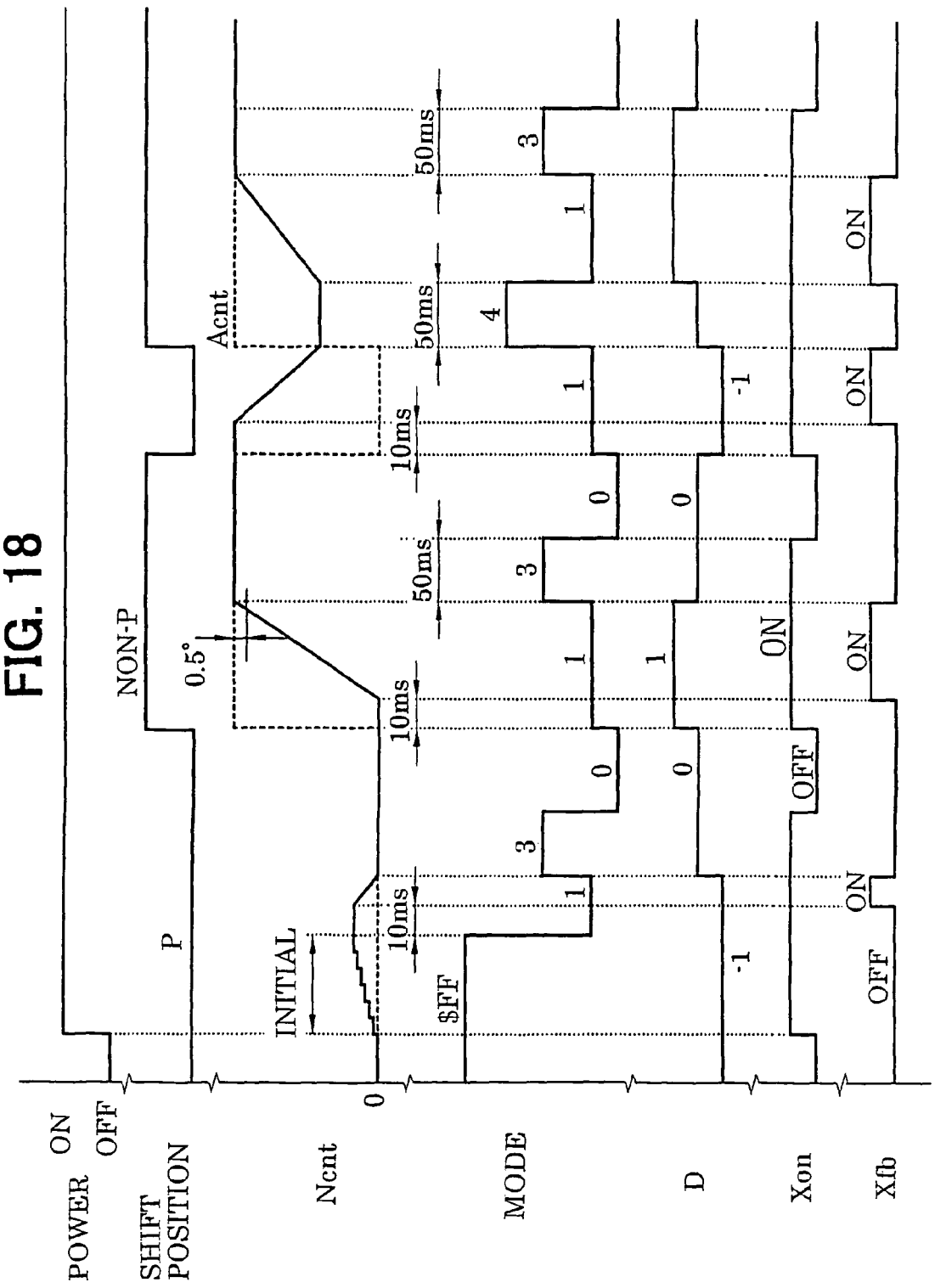
FIG. 18 is a time chart showing an exemplary control on the SR motor.
Figure 19:
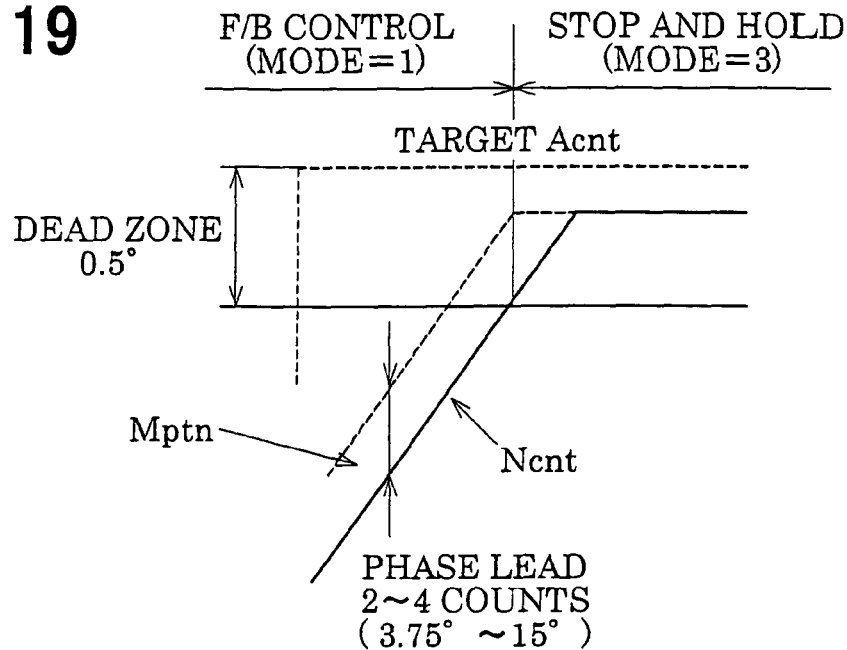
FIG. 19 is a time chart showing timing of a transition from a feedback control to a target position stopping and holding process.

As a countermeasure against the above problem, in this embodiment, as shown in FIG. 18, to start a feedback control from a state that the SR motor 12 is not energized, a process (hereinafter referred to as "feedback control start position stopping and holding process") in which current supply phases are selected on the basis of a current encoder count and the rotor 32 is stopped and kept at a stop position by two-phase current supply is executed for a prescribed time (e.g., 10 ms). The feedback control is then performed to rotate the rotor 32 to a target position.

With this measure, even if the rotor 32 deviated in a period when it should be stopped, the positional deviation of the rotor 32 is corrected for by the feedback control start position stopping and holding process immediately before a start of a feedback control, whereby a position of the rotor 32 at the start of the feedback control can be determined correctly. Therefore, the position of the rotor 32 and the current supply phase (i.e., encoder count) can reliably be synchronized with each other from the first current supply phase at the start of a feedback control. It becomes possible to prevent a loss of synchronization and prevent the rotor 32 from rotating away from a target position at the start of a feedback control, to allow the rotor 32 to reliably rotate to a target position with a stable feedback control, and to perform a position switching control (positioning control) that is highly stable and reliable.

To increase the response speed of the position switching control, the time that is taken by the rotor 32 to reach a target position is shorted by increasing its rotation speed. As a result, immediately after reaching a target position the rotor 32 has not stopped completely but is vibrating. If the current supply is turned off in such a state, inertia may cause the rotor 32 to stop at a position that greatly deviates from a target position. If the rotor 32 has too large a positional deviation at the end of a feedback control, the positional deviation may not be corrected for even if a feedback control start position stopping and holding process is executed immediately before the next feedback control is started.

As a countermeasure against this problem, in this embodiment, the current supply of the SR motor 12 is turned off after a process for stopping the rotor 32 at a position where it existed at the end of a feedback control and keeping the rotor 32 there by two-phase current supply (hereinafter referred to as "target position stopping and holding process") is executed for a prescribed time (e.g., 50 ms) after the end of the feedback control. With this measure, the current supply can be turned off after the rotor 32 has reached a target position and its vibration has stopped, whereby the rotor 32 is prevented from stopping at a position deviating greatly from the target position due to inertia. This makes it possible to satisfy the requirement of increase in the response speed of the position switching control while maintaining high stability and reliability of the position switching control.

In this embodiment, if the instructed shift position (target position) is changed during a feedback control to necessitate reversing the rotation direction of the rotor 32, a process for stopping the rotor 32 at a reversing position and keeping it there by two-phase current supply (hereinafter referred to as "reversing position stopping and holding process") is executed for a prescribed time (e.g., 50 ms). The feedback control is then restarted to rotate the rotor 32 to a new target position. With this measure, when the instructed shift position (target position) is changed during a feedback control, a reversing operation can be performed stably by stopping the rotor 32 at a reversing position and keeping the it there. This prevents an event that deviation of a reversing position causes a loss of synchronization (i.e., deviation of current supply phases) and makes it possible to rotate the rotor 32 to a new target position reliably.

In this embodiment, a feedback control is finished and a transition is made to a target position stopping and holding process when the difference between the encoder count and a target count that corresponds to a target position has become smaller than or equal to a prescribed value (e.g., a count corresponding to A-phase lead of the current supply phase) during the feedback control. To rotate the rotor 32, it is necessary to cause the phase of the current supply phase to lead the actual position of the rotor 32 by 2 to 4 counts (3.75° to 15° in terms of the rotation angle of the rotor 32).

Therefore, if a feedback control is finished when the difference between the encoder count and a target count has become equal to, for example, a count corresponding to A-phase lead of the current supply phase, the last current supply phase of the feedback control should coincide with a current supply phase with which to stop the rotor 32 at the target position and keep it there. Therefore, after a transition is made to a target position stopping and holding process, the current supply for the last current supply phase of the feedback control can be continued; the transition from the feedback control to the target position stopping and holding process can be made smoothly.

To generate torque for rotating the rotor 32, it is necessary to cause the phase of the current supply phase to lead the rotation phase of the rotor 32. As the rotation speed of the rotor 32 increases after a start of a feedback control, the variation rate of the encoder count increases and the current supply phase switching becomes faster. However, torque is generated actually with a delay corresponding to the inductance of the windings 33 or 34 of a current supply phase from a start of current supply of the windings 33 or 34. Therefore, if the rotation speed of the rotor 32 is too high, the rotor 32 rotates by a considerable angle from a start of current supply of the windings 33 or 34 of the current supply phase to actual generation of torque, that is, the generation of torque of the current supply phase delays from the actual rotation phase of the rotor 32. In this state, the driving torque decreases and the rotation speed of the rotor 32 lowers. A requirement of increase in position switching rate (i.e., increase in the rotation speed of the rotor 32) cannot be satisfied.

One countermeasure against this problem would be setting the phase lead of the current supply phase to a large value in advance. However, if the phase lead of the current supply phase is large at a start of a feedback control (i.e., at starting), the starting torque becomes low and the starting of the SR motor 12 becomes unstable or results in a failure.

Further, if the phase lead of the current supply phase is set large and the rotation speed of the rotor 32 is thereby increased, the rotor 32 tends to pass a target position due to inertia at an end of a feedback control (occurrence of an overshoot), that is, it is difficult to stop the rotor 32 at the target position correctly.

In view of the above, in this embodiment, the phase lead of the current supply phase with respect to the rotation phase of the rotor 32 is corrected in accordance with the rotation speed of the rotor 32 during a feedback control. And when it becomes necessary to decrease the rotation speed of the rotor 32 (e.g., because the rotor 32 comes close to a target position), the phase lead of the current supply phase is corrected in the decreasing direction. Specifically, correcting the phase lead of the current supply phase in the decreasing direction at a start of a feedback control can increase starting torque and thereby raise the rotation speed of the rotor 32 quickly. Correcting the phase lead of the current supply phase in the increasing direction as the rotation speed of the rotor 32 increases can maintain the synchronized relationship between the generation of torque of the current supply phase and the actual rotation phase of the rotor 32 even during high-speed rotation, and hence makes it possible to rotate the rotor 32 stably at high speed. This makes it possible to attain both of good starting performance and good high-speed rotation performance.

When the rotor 32 comes close to the target position afterwards, the phase lead of the current supply phase is corrected in the decreasing direction, whereby a state that the generation of torque of the current supply phase is delayed from the actual rotation phase of the rotor 32 is established. In this manner, the driving torque can be decreased or torque (braking torque) can be generated in the direction opposite to the rotation direction of the rotor 32, whereby the rotation speed of the rotor 32 can be decreased reliably and the rotor 32 can be stopped at the target position correctly. This makes it possible to perform a feedback control that is superior in starting performance, high-speed rotation performance, and stop performance (deceleration performance).

The rotation amount (i.e., rotation angle) of the rotor 32 is converted into the manipulated variable for the position switching mechanism 11 (i.e., the slide length of the parking rod 18) via the rotation transmission system that is composed of the speed-reducing mechanism 26, the output shaft 13, the detent lever 15, etc. and the constituent parts of the rotation transmission system has play amount. For example, backlash exists between the gears of the speed-reducing mechanism 26. In a structure in which a connecting portion having a non-circular cross-section that is formed at the tip of the rotary shaft of the motor 12 is fitted into a fitting hole of the output shaft 13, a certain clearance is needed to facilitate work of fitting the former into the latter.

Figure 35:
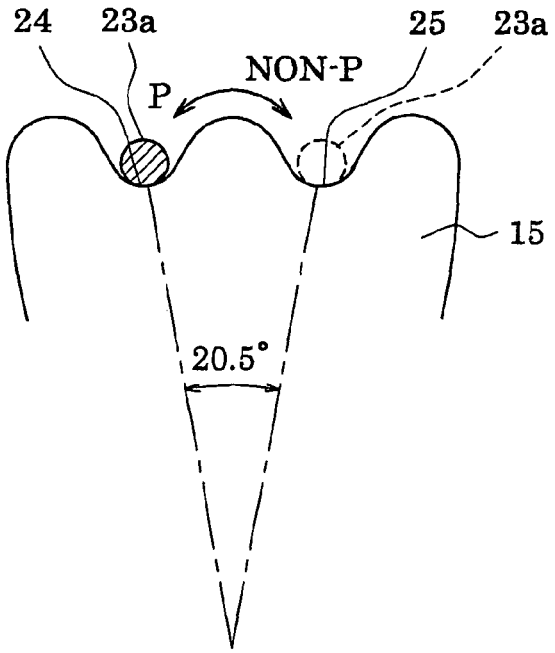
FIG. 35 illustrates a relationship between an engaging portion of a detent spring and each of a P-position holding recess and a non-P-position holding recess of a detent lever.

Further, as shown in FIG. 35, when the engaging portion 23a of the detent spring 23 goes into the P-position holding recess 24 or the non-P-position holding recess 25 of the detent lever 15, a slight gap (play amount) exists between the engaging portion 23a and the side walls of the holding recess 24 or 25. As exemplified above, play amount such as backlash and gaps between parts exist in the rotation transmission system for converting the rotation amount of the rotor 32 into the manipulated variable for the position switching mechanism 11 (i.e., the slide length of the parking rod 18). Even if the rotation amount of the rotor 32 can be controlled correctly on the basis of the encoder count, the manipulated variable for the position switching mechanism 11 has an error corresponding to the play amount in the rotation transmission system; the manipulated variable for the position switching mechanism 11 cannot be controlled accurately.

In view of the above, this embodiment is provided with a function of learning an amount of play amount in the rotation transmission system. Specifically, to learn an amount of play amount in the rotation transmission system, a P-position-side butting control (i.e., a first-direction butting control) for rotating the rotor 32 until the engaging portion 23a of the detent spring 23 butts against a side wall of the P-position holding recess 24 as a P-position-side limit position of the movable range of the position switching mechanism 11 and a non-P-position-side butting control (i.e., a second-direction butting control) for rotating the rotor 32 until the engaging portion 23a of the detent spring 23 butts against a side wall of the non-P-position holding recess 25 as a non-P-position-side limit position are performed, whereby an increase or decrease of the encoder count corresponding to the range from the P-position-side limit position to the non-P-position-side limit position is determined as an actual measurement value of the movable range of the position switching mechanism 11.

The difference between this actual measurement value of the movable range and its design value is learned as a play amount of the rotation transmission system. When the rotor 32 is rotated to a target position afterwards, the target position is set by taking the learned play amount of the rotation transmission system into consideration. This makes it possible to set, even if the rotation transmission system has play amount, a target value taking the play amount into consideration and to thereby control the manipulated variable for the position switching mechanism 11 accurately.

If there is a sufficient time to learn a play amount of the rotation transmission system from application of power (i.e., turning-on of the ignition switch) to the ECU 41 which controls the SR motor 12 to a start of a control on the position switching mechanism 11, a play amount of the rotation transmission system may be learned after application of power to the ECU 41 and before a start of a control on the position switching mechanism 11 by performing a P-position-side butting control and a non-P-position-side butting control successively. However, where it is necessary to quickly start a control on the position switching mechanism 11 after application of power to the ECU 41, there may not be a sufficient time to learn a play amount of the rotation transmission system after application of power to the ECU 41.

In view of the above, in this embodiment, after a control on the position switching mechanism 11 was started without learning a play amount, in a state that the rotor 32 is stopped at the P-position, a P-position-side butting control is performed and an encoder count when the engaging portion 23a is in contact with the side wall of the P-position holding recess 24 is stored in the RAM of the ECU 41. In a state that the rotor 32 is stopped at the non-P-position, a non-P-position-side butting control is performed and an encoder count when the engaging portion 23a is in contact with the side wall of the non-P-position holding recess 25 is stored in the RAM of the ECU 41. The difference between the encoder counts obtained by the P-position-side butting control and the non-P-position-side butting control is calculated as an actual measurement value of the movable range of the position switching mechanism 11. The difference between the actual measurement value of the movable range and its design value is learned as a play amount.

With this measure, even if there was not a sufficient time to learn a play amount of the rotation transmission system from application of power to the ECU 41 to a start of a control on the position switching mechanism 11 and hence a control on the position switching mechanism 11 was started without learning a play amount of the rotation transmission system, a play amount can be learned by performing butting controls when the rotor 32 is stopped at the P-position and the non-P-position. In this case, the same control as in the conventional case that does not take a play amount of the rotation transmission system into consideration may be performed before completion of learning of a play amount. Alternatively, the control object may be controlled by using a preset, average play amount or a storage value of a learned play amount of the preceding learning. In the following description, the abbreviated term "butting control" means either of a P-position-side butting control and a non-P-position-side butting control.

In this embodiment, when a butting control is performed, the torque of the SR motor 12 is made lower than in an ordinary drive by making the current supply duty ratio (i.e., current supply factor) of the SR motor 12 smaller than in an ordinary drive. The torque of the SR motor 12 is set so strong that the engaging portion 23a of the detent spring 23 can reliably go over the projection between the two holding recesses 24 and 25 of the detent lever 15 at the time of position switching. However, in the butting control, the torque of the SR motor 12 causes the engaging portion 23a of the detent spring 23 to butt against the holding recess 24 or 25 of the detent lever 15. Therefore, if the torque of the SR motor 12 is too strong, the parts of the rotation transmission system such as the engaging portion 23a of the detent spring 23 may be deformed or damaged gradually to lower the durability and reliability as the number of times of butting controls increases.

As a countermeasure against this problem, the torque of the SR motor 12 is reduced during a butting control, whereby the force of butting of the engaging portion 23a of the detent spring 23 against the side wall of the holding recess 24 or 25 can be weakened. This makes it possible to prevent butting controls from deforming or damaging the parts of the rotation transmission system such as the engaging portion 23a of the detent spring 23 and to thereby secure high durability and reliability. In the butting control of this embodiment, the engaging portion 23a of the detent spring 23 need not go over the projection between the two holding recesses 24 and 25 of the detent lever 15. Therefore, even if the torque of the SR motor 12 is decreased during a butting control, the butting control can be performed normally as long as the torque is higher than a minimum value necessary to cause the engaging portion 23a of the detent spring 23 to butt against the side wall of each of the holding recesses 24 and 25.

In this embodiment, during a butting control, the phase lead of the current supply phase is corrected so as to decrease the rotation speed of the rotor 32. If the rotation speed of the rotor 32 is too high during butting controls, the engaging portion 23a of the detent spring 23 collides with the side walls of the holding recesses 24 and 25 of the detent lever 15 at high speed and resulting impact gradually deforms or damages the parts of the rotation transmission system such as the engaging portion 23a of the detent spring 23. Decreasing the rotation speed of the rotor 32 during butting controls lowers the speed at which the engaging portion 23a of the detent spring 23 collides with the side walls of the holding recesses 24 and 25 of the detent lever 15 during butting controls and hence can weaken resulting impact. This makes it possible to prevent butting controls from deforming or damaging the parts of the rotation transmission system such as the engaging portion 23a of the detent spring 23 and to thereby secure high durability and reliability.

In this embodiment, during a butting control, an angle (i.e., a ride correction value) by which the engaging portion 23a of the detent spring 23 slightly rides the side wall of the holding recess 24 or 25 of the detent lever 15 in a state that the engaging portion 23a is in contact with the side wall is inferred on the basis of the battery voltage as a power source voltage for the SR motor 12. And an actual measurement value of the movable range of the position switching mechanism 11 is corrected by the inferred value. The angle (i.e., ride correction value) by which the engaging portion 23a of the detent spring 23 rides the side wall of the holding recess 24 or 25 of the detent lever 15 during a butting control increases as the torque of the SR motor 12 increases. In general, the torque of the SR motor 12 varies with the power source voltage therefor (i.e., battery voltage) and hence a correlation exists between the power source voltage and the torque of the SR motor 12. The power source voltage can be used as replacement information for the torque of the SR motor 12. Therefore, an actual measurement value of the movable range of the position switching mechanism 11 can be determined accurately by inferring an angle (i.e., a ride correction value) by which the engaging portion 23a of the detent spring 23 rides the side wall of the holding recess 24 or 25 of the detent lever 15 during abutting control on the basis of the power source voltage (i.e., battery voltage) as replacement information for the torque of the SR motor 12 and correcting an actual measurement value of the movable range of the position switching mechanism 11 by the inferred value.

In this embodiment, a butting control is finished when the encoder count comes not to vary in the butting control with a determination that the engaging portion 23a of the detent spring 23 has butted against the side wall of the holding recess 24 or 25 of the detent lever 15. This makes it possible to determine a correct encoder count of a state that the engaging portion 23a of the detent spring 23 is in contact with the side wall of the holding recess 24 or 25 of the detent lever 15 and to thereby determine, accurately, an actual measurement value of the movable range of the position switching mechanism 11. The above measure can also shorten the time during which the engaging portion 23a of the detent spring 23 is kept in contact with the side wall of the holding recess 24 or 25 of the detent lever 15, which can further reduce the degree of deterioration of the parts of the rotation transmission system such as the engaging portion 23a of the detent spring 23 due to butting controls.

In this embodiment, a butting control is finished when it is determined that the engaging portion 23a of the detent spring 23 does not butt against the side wall of the holding recess 24 or 25 of the detent lever 15 even if the butting control has been performed for a prescribed time or more. If the engaging portion 23a of the detent spring 23 does not butt against the side wall of the holding recess 24 or 25 of the detent lever 15 even if a butting control has been performed for a long time, a certain system abnormality such as a failure of the SR motor 12 or the encoder 46 should have occurred. Forcibly finishing the butting control in such a case is a fail-safe measure.

Incidentally, there may occur an event that the CPU of the ECU 41 which controls the SR motor 12 is reset for a certain reason (e.g., a short power break). Once the CPU of the ECU 41 is reset, the RAM which stores data of an instructed shift position (target position) is also reset. An instructed shift position after the RAM resetting is different from that before the RAM resetting. For example, if the CPU of the ECU 41 which controls the SR motor 12 is reset for a certain reason while the vehicle is driven with the instructed shift position being the non-P-position, the instructed shift position data stored in the RAM is initialized to a value corresponding to the P-position (indicated by a broken line in FIG. 48). Therefore, if a position switching control is performed on the basis of an instructed shift position stored in the RAM when the CPU of the ECU 41 has been reset during a drive, trouble occurs that the shift position is switched contrary to the intention of the driver.

To solve this problem, in this embodiment, with attention paid to the output shaft sensor 14 which detects a rotation position of the output shaft 13 of the SR motor 12, an actual shift position that is detected by the output shaft sensor 14 at starting (e.g., after resetting of the CPU of the ECU 41 or after power application to it) is set as an instructed shift position of starting. With this measure, even if the CPU of the ECU 41 is reset for a certain reason during a drive, the instructed shift position is not changed in association with the resetting. This prevents trouble that the shift position is switched contrary to the intention of the driver; the reliability of the position switching control can be increased. If the rotation direction of the rotor 32 is revered due to some inexorability during a feedback control, the variation direction of the encoder count is also reversed. As a result, the current supply phase switching order that is determined on the basis of the encoder count is also reversed to generate torque that drives the rotor 32 in the reverse direction. Once the rotor starts to rotate in the reverse direction, the reverse rotation is accelerated rather than suppressed. This raises a problem that long time is needed to return the rotation direction from the reverse direction to the normal direction; the rotor may reach a target position with a long delay or, in the worst case, it may become impossible to stop the reverse rotation, that is, the SR motor 12 may become uncontrollable.

As a countermeasure against this problem, in this embodiment, during a feedback control, the variation direction of the encoder count is monitored and it is determined whether the rotation direction of the rotor 32 has reversed from a direction toward a target position. If reversing of the rotation direction is detected, current supply for phases with which the rotor 32 is driven in the reverse direction is prohibited and current supply is effected for A-phase for which current supply was effected immediately before the reversing. Effecting current supply for the phase for which current supply was effected immediately before the reversing can generate braking torque that suppresses the reverse rotation of the rotor 32. The braking torque can suppress the reverse rotation quickly, whereby the rotation direction of the rotor 32 can quickly be returned from the reverse direction to the normal direction.

The above position switching is performed by the ECU 41 of the position switching controller 42 according to the following routines, each of which will be described below in detail.

[Initial Drive]

Figure 8:
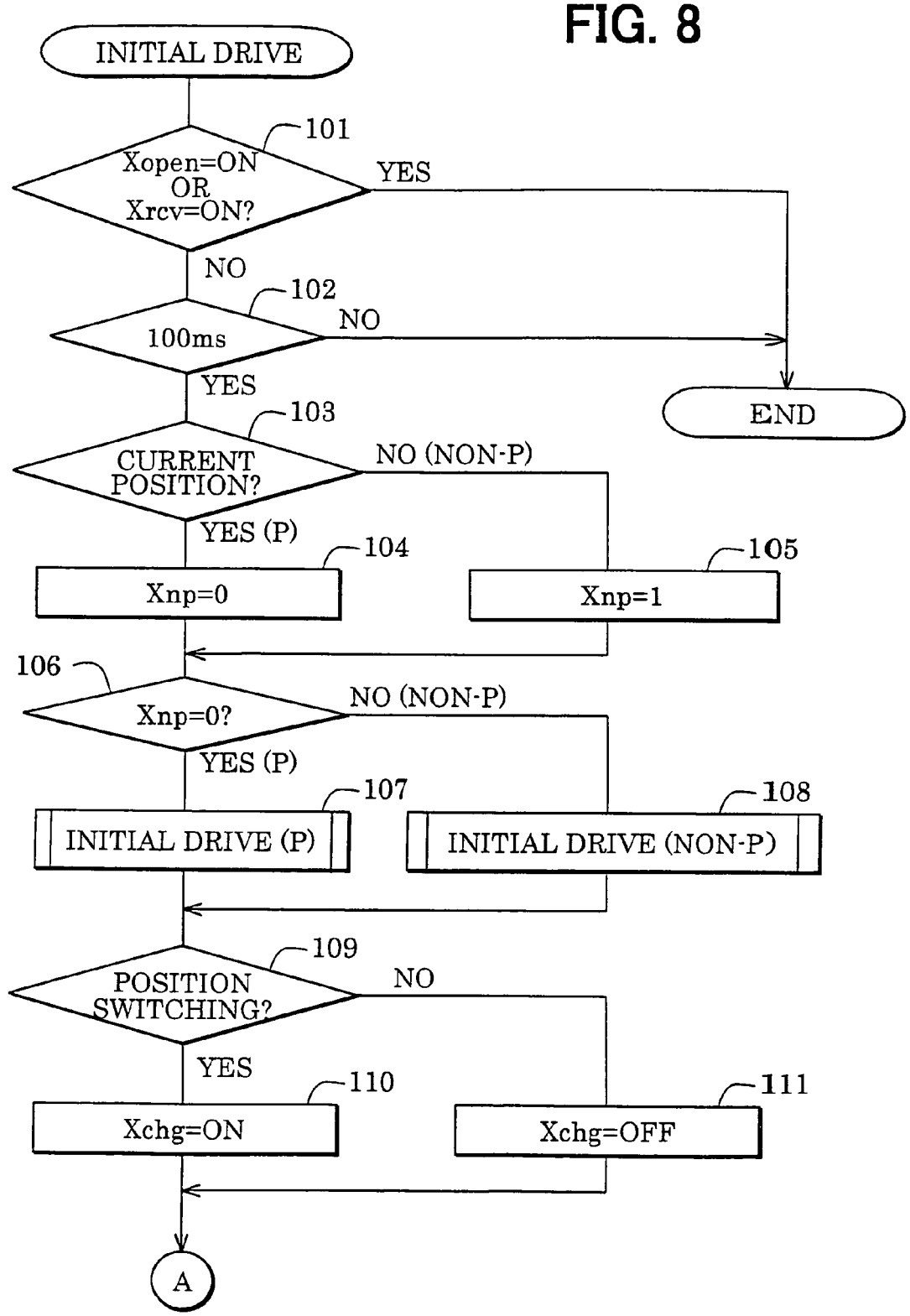
FIGS. 8 and 9 are flowcharts showing an initial drive routine.
Figure 9:
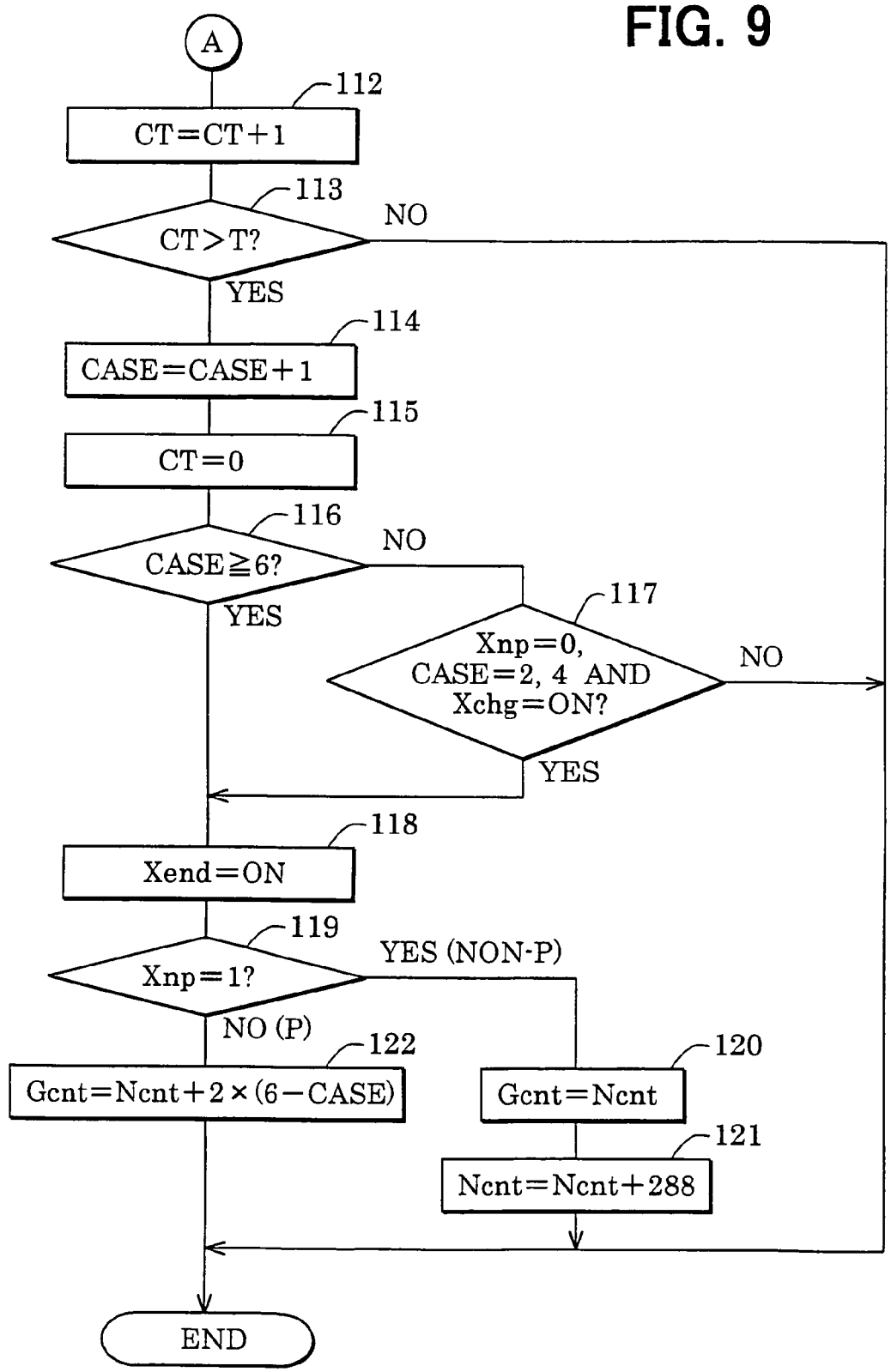

An initial drive is performed according to an initial drive routine shown in FIGS. 8 and 9. This routine is executed in a prescribed cycle (e.g., every 1 ms) until an end of the initial drive immediately after application of power to the ECU 41 (i.e., immediately after manipulation of the ignition switch from the OFF position to the ACC position).

Upon activation of this routine, at step 101, it is determined whether an open-loop control execution flag Xopen is "on" or a recovery process execution flag Xrcv is "on." The open-loop control execution flag Xopen is a flag indicating whether an open-loop control (fail-safe process) to be executed when the encoder 46 or the SR motor 12 has failed is being executed. The open-loop control execution flag Xopen being "on" means that the open-loop control is being executed. The recovery process execution flag Xrcv is a flag indicating whether a recovery process (open-loop control) to be executed temporarily upon occurrence of a temporal operation abnormality has occurred is being executed. The recovery process execution flag Xrcv being "on" means that the recovery process is being executed.

If the determination result at step 101 is "yes," this routine is finished without executing the remaining steps. If the determination result at step 101 is "no," the routine proceeds to step 102, where it is determined whether a prescribed time (e.g., 100 ms) that is a waiting time from initialization of the ECU 41 to stabilization of the output voltage of the output shaft sensor 14 has elapsed. When the prescribed time has elapsed from the initialization of the ECU 41, the routine proceeds to step 103, where an output voltage of the output shaft sensor 14 is read. Whether the current range is the P-position or the non-P-position is determined on the basis of whether the output voltage is lower than or equal to a range determination value. If the current range is the P-position, the routine proceeds to step 104, where a range determination flag Xnp is set to "0" that means the P-position. If the current range is the non-P-position, the routine proceeds to step 105, where the range determination flag Xnp is set to "1" that means the non-P-position.

Figure 10:
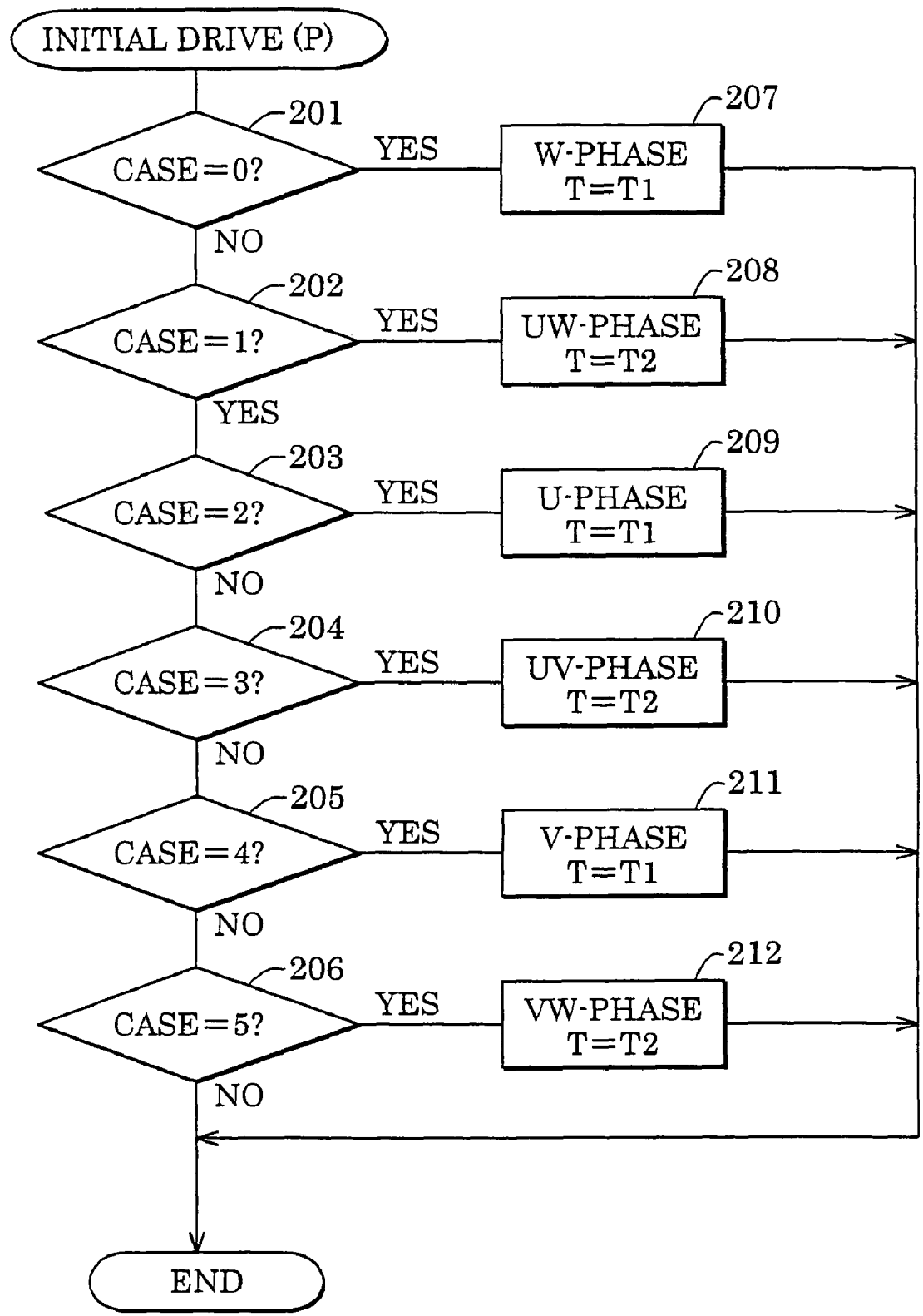
FIG. 10 is a flowchart showing a P-position initial drive routine.
Figure 11:
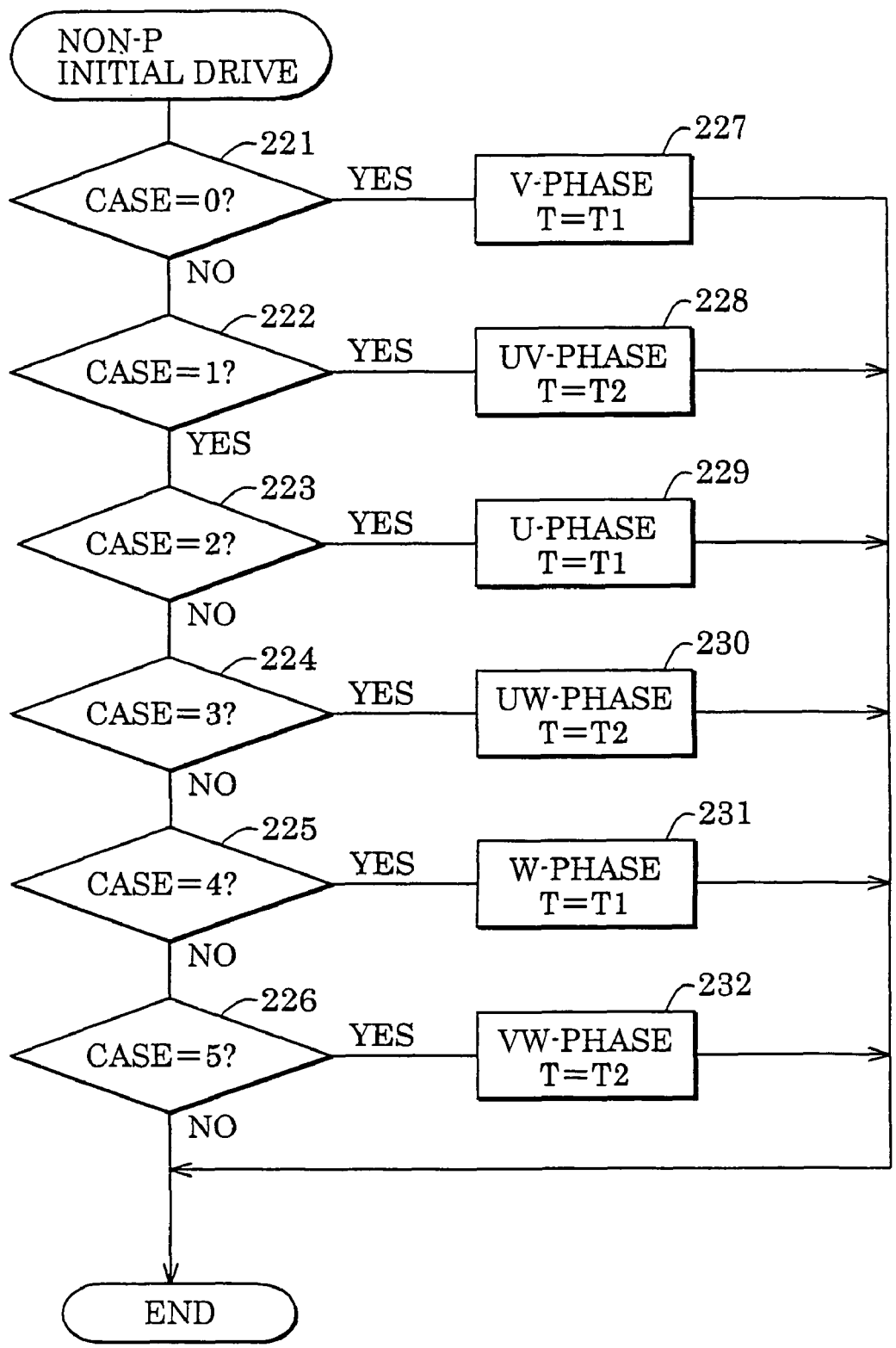
FIG. 11 is a flowchart showing a non-P-position initial drive routine.

Then, the routine proceeds to step 106, where it is determined whether the range determination flag Xnp is "0" (P-position). If the range determination flag Xnp is "0" (P-position), the routine proceeds to step 107, where a P-position initial drive routine shown in FIG. 10 is executed. If the range determination flag Xnp is "1" (non-P-position), the routine proceeds to step 108, where a non-P-position initial drive routine shown in FIG. 11 is executed.

If the P-position initial drive routine of FIG. 10 is activated at step 107, it is determined at steps 201-206 which of "0" to "5" the count CASE of a current-supply counter that counts the current-supply during an initial drive is equal to. The count CASE of the current-supply counter has an initial value "0" that is set in the initialization processing and is incremented by one for each current supply (step 114 in FIG. 9). A current supply phase and a current supply time T are set in the following manner in accordance with a result of the determination of the count CASE.

If CASE=0 (first current supply), the routine proceeds to step 207, where W-phase current supply is selected and the current supply time T is set to T1 (e.g., 10 ms).

If CASE=1 (second current supply), the routine proceeds to step 208, where U/W-phase current supply is selected and the current supply time T is set to T2 (e.g., 100 ms).

If CASE=2 (third current supply), the routine proceeds to step 209, where U-phase current supply is selected and the current supply time T is set to T1 (e.g., 10 ms).

If CASE=3 (fourth current supply), the routine proceeds to step 210, where U/V-phase current supply is selected and the current supply time T is set to T2 (e.g., 100 ms).

If CASE=4 (fifth current supply), the routine proceeds to step 211, where V-phase current supply is selected and the current supply time T is set to T1 (e.g., 10 ms).

If CASE=5 (sixth current supply), the routine proceeds to step 212, where V/W-phase current supply is selected and the current supply time T is set to T2 (e.g., 100 ms).

With the above steps, in the case where the initial drive should be performed with the P-position, current supply is effected all the phases around in order of W-phase→U and W-phases→U-phase→U and V-phases→V-phase→V and W-phases, whereby the rotor 32 is driven in the normal rotation direction (i.e., the rotation direction from the P position to the non-P-position). In this case, the one-phase current supply time T1 is set shorter than the two-phase current supply time T2.

On the other hand, if the non-P-position initial drive 2c routine of FIG. 11 is activated at step 108, it is determined at steps 221-226 which of "0" to "5" the count CASE of the current-supply counter is equal to. A current supply phase and a current supply time T are set in the following manner in accordance with a result of the determination of the count CASE.

If CASE=0 (first current supply), the routine proceeds to step 227, where V-phase current supply is selected and the current supply time T is set to T1 (e.g., 10 ms).

If CASE=1 (second current supply), the routine proceeds to step 228, where U/V-phase current supply is selected and the current supply time T is set to T2 (e.g., 100 ms).

If CASE=2 (third current supply), the routine proceeds to step 229, where U-phase current supply is selected and the current supply time T is set to T1 (e.g., 10 ms).

If CASE=3 (fourth current supply), the routine proceeds to step 230, where U/W-phase current supply is selected and the current supply time T is set to T2 (e.g., 100 ms).

If CASE=4 (fifth current supply), the routine proceeds to step 231, where W-phase current supply is selected and the current supply time T is set to T1 (e.g., 10 ms).

If CASE=5 (sixth current supply), the routine proceeds to step 232, where V/W-phase current supply is selected and the current supply time T is set to T2 (e.g., 100 ms).

With the above steps, in the case where the initial drive should be performed with the non-P-position, current supply is effected all the phases around in order of V-phase→U and V-phases→U-phase→U and W-phases→W-phase→V and W-phases, whereby the rotor 32 is driven in the reverse rotation direction (i.e., the rotation direction from the non-P position to the P-position). Also in this case, the one-phase current supply time T1 is set shorter than the two-phase current supply time T2.

After the P-position initial drive routine of FIG. 10 or the non-P-position initial drive routine of FIG. 11 is executed in the above manner, the routine proceeds to step 109 shown in FIG. 8, where it is determined whether a position switching manipulation (i.e., a manipulation on the P-position switch 43 or the non-P-position switch 44) has been performed during the initial drive. If a position switching manipulation has been performed during the initial drive, the routine proceeds to step 110, where a position switching manipulation flag Xchg is set to "on." If no position switching manipulation has been performed, the routine proceeds to step 111, where the position switching manipulation flag Xchg is set to "off."

Then, the routine proceeds to step 112 shown in FIG. 9, where the count CT of a counter that counts the current supply time of the current supply phase is incremented. At the next step 113, it is determined whether the current supply time CT of the current supply phase has exceeded the current supply time T that was set in the routine of FIG. 10 or 11. If the current supply time CT has not exceeded the current supply time T, this routine is finished without executing the remaining steps. In this manner, current supply is continued for the current supply phase until the current supply time CT of the current supply phase exceeds the current supply time T (=T1 or T2) that was set in the routine of FIG. 10 or 11.

Then, at an instant when the current supply time CT of the current supply phase has exceeded the current supply time T (=T1 or T2) that was set in the routine of FIG. 10 or 11, the routine proceeds to step 114, where the count CASE of the current-supply counter is incremented by one and the current supply phase is switched to the next phase. At the next step 115, the count CT of the current supply time counter is reset. At the next step 116, it is determined whether the count CASE of the current-supply counter has reached "6" meaning that the initial drive should be finished. If the count CASE has reached "6," the routine proceeds to step 118, where an initial drive end flag Xend is set to "on" meaning that the initial drive should be finished.

If the count CASE has not reached "6" yet, that is, if the initial drive should be continued, the routine proceeds to step 117, where it is determined whether a condition for terminating the initial drive halfway is satisfied. Whether the condition for terminating the initial drive halfway is satisfied is determined according to the following three criteria:

(1) The range determination flag Xnp is "0" (P-position).

(2) The count CASE of the current-supply is equal to 2 or 4, that is, two-phase current supply has finished.

(3) The position switching manipulation flag Xchg is "on," that is, a position switching manipulation has been performed during the initial drive.

If at least one of the criteria (1) to (3) is not met, the condition for terminating the initial drive halfway is not satisfied and hence the initial drive is continued. In contrast, if all the three criteria (1) to (3) are met, the condition for terminating the initial drive halfway is satisfied and the routine proceeds to step 118, where the initial drive end flag Xend is set to "on" meaning that the initial drive should be finished.

Then, the routine proceeds to step 119, where it is determined whether the range determination flag Xnp is "1" (i.e., whether the initial drive has been performed with the non-P-position). If the range determination flag Xnp is "1," the routine proceeds to step 120, where an encoder count Ncnt at the end of the initial drive is stored as an initial positional deviation learned value Gcnt. At the next step 121, the encoder count Ncnt is corrected to a value having the non-P position as a reference according to the following equation:

$$Ncnt = Ncnt + 288$$

In this embodiment, if the encoder count Ncnt is increased starting from the P-position holding position that is the zero-count position, the encoder count Ncnt becomes 288, for example, when the rotor 32 has rotated to the non-P-position holding position. Therefore, if the initial drive is performed with the non-P-position, an encoder count Ncnt at the end of the initial drive is corrected to a value having the non-P position as a reference by adding 288 to it.

On the other hand, if it is determined at step 119 that the range determination flag Xnp is "0" (the initial drive has been performed with the P-position), the routine proceeds to step 122, where an initial positional deviation learned value Gcnt is calculated according to the following equation by using the encoder count Ncnt at the end of the initial drive:

$$Gcnt = Ncnt + 2 \times (6 - CASE)$$

If the initial drive has finished without being terminated halfway, the count CASE should be equal to 6 because of the repeated execution of step 114 and an encoder count at the end of the initial drive is employed as an initial positional deviation learned value Gcnt as it is. However, where the initial drive is performed with the P-position, if a position switching manipulation is performed during the initial drive, a transition is made to an ordinary drive after completion of the next two-phase current supply (after completion of the current two-phase current supply if a position switching request occurs during the current two-phase current supply). Therefore, an encoder count Ncnt that would be obtained if the initial drive were finished without being terminated halfway is inferred and an inferred value is employed as an initial positional deviation learned value Gcnt. The term "2×(6−CASE)" is a count increase (hereinafter referred to as "Ncnt correction value") corresponding to a rotation angle of current supply attempts that were not made.

Figure 14:
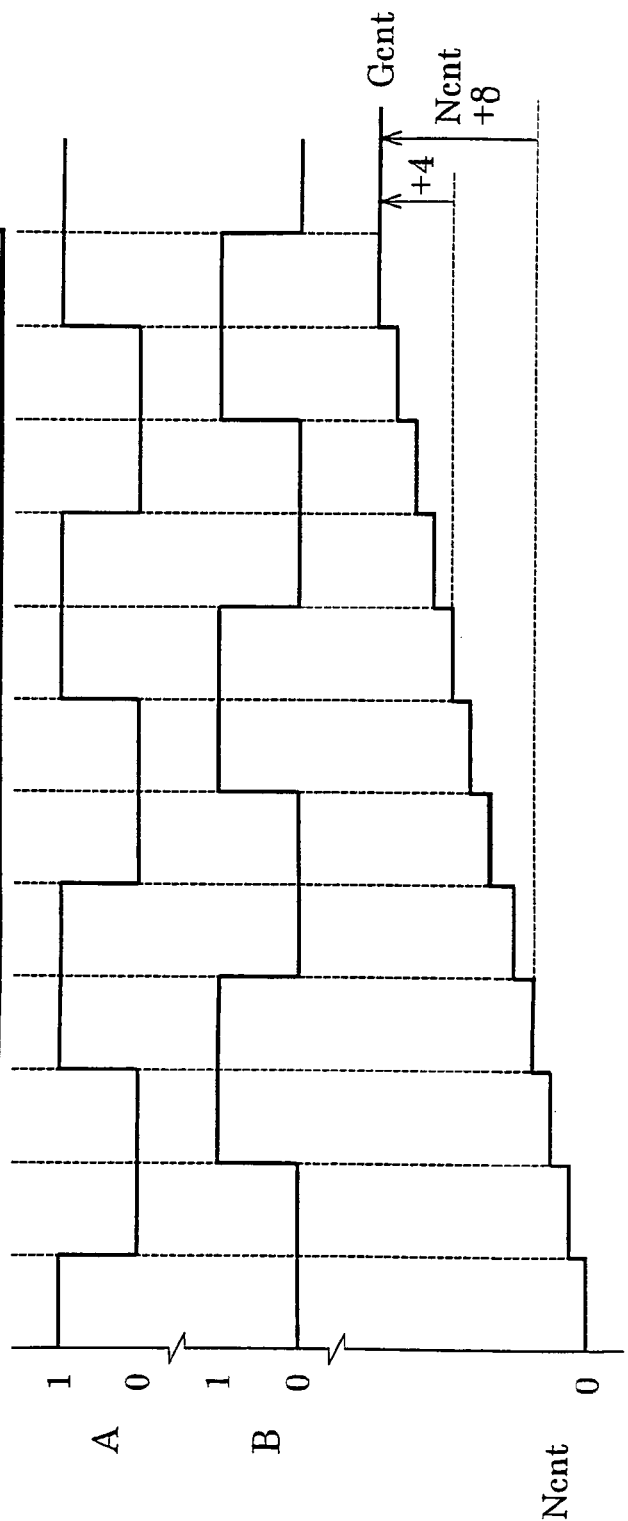
FIG. 14 is a time chart illustrating an initial positional deviation learning method in a case that a position switching manipulation is performed during an initial drive.

FIG. 14 is a time chart illustrating a relationship among the count CASE of the current-supply counter, the Ncnt correction value, the current supply phase, the A-phase signal, the B-phase signal, and the encoder count Ncnt in an initial drive. For example, when an initial drive is finished at the end of U/W-phase current supply (the count CASE of the current-supply counter changes from 1 to 2), the Ncnt correction value becomes 2×(6−CASE)=2×(6−2)=8. When an initial drive is finished at the end of U/V-phase current supply (the count CASE of the current-supply counter changes from 3 to 4), the Ncnt correction value becomes 2×(6−CASE)=2×(6−4)=4.

[Encoder Counter]

Figures 15, 16:
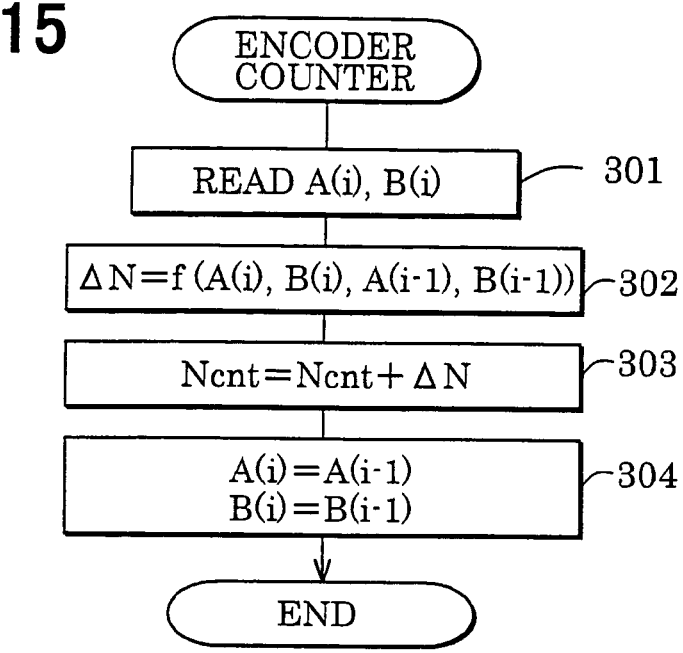
FIG. 15 is a flowchart showing an encoder counter routine.
FIG. 16 shows an exemplary count increment ΔN calculation map.

Next, the details of an encoder counter routine shown in FIG. 15 will be described. This routine is activated by A/B-phase interruption processing in synchronism with both of rising edges and trailing edges of an A-phase signal and a B-phase signal and counts both of rising edges and trailing edges in the following manner. Upon activation of this routine, at step 301, a value A(i) of the A-phase signal and a value B(i) of the B-phase signal are read. At the next step 302, a count increment ΔN corresponding to the current values A(i) and B(i) and preceding values A(i−1) and B(i−1) of the A-phase signal and the B-phase signal is calculated by searching a count increment ΔN calculation map shown in FIG. 16.

Figure 17:
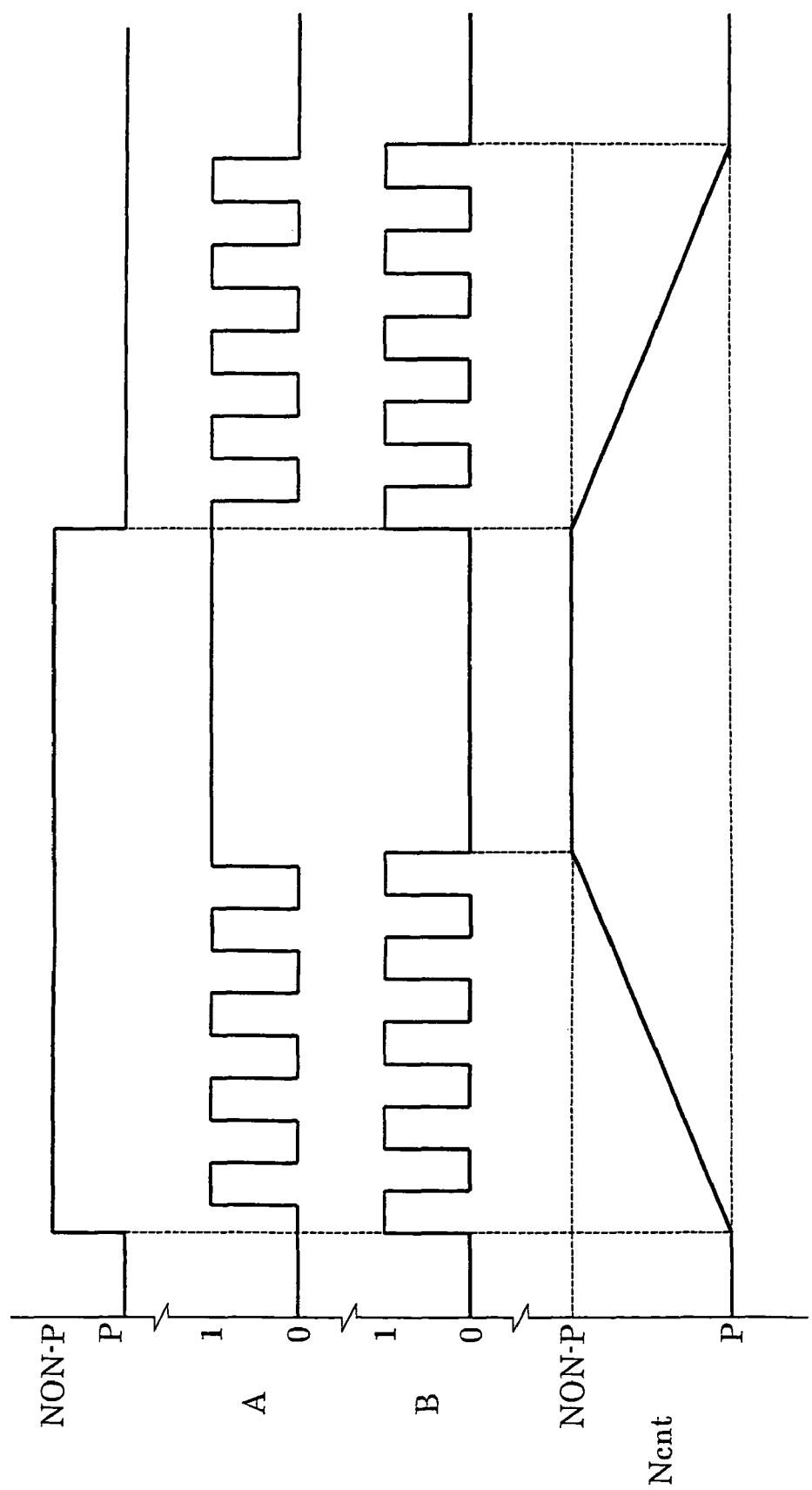
FIG. 17 is a time chart showing a relationship between an instructed shift position, an A-phase signal, a B-phase signal, and an encoder count.

The reason for using the current values A(i) and B(i) and the preceding values A(i−1) and B(i−1) of the A-phase signal and the B-phase signal is to determine a rotation direction of the rotor 32 on the basis of order of occurrence of the A-phase signal and the B-phase signal. As shown in FIG. 17, in the case of normal rotation (i.e., the rotation direction from the P-position to the non-P-position), the encoder count Ncnt is increased by giving the plus sign to the count increment ΔN.

In the case of reverse rotation (i.e., the rotation direction from the non-P-position to the P-position), the encoder count Ncnt is decreased by giving the minus sign to the count increment ΔN.

After the calculation of the count increment ΔN, the routine proceeds to step 303, where a new encoder count Ncnt is calculated by adding the count increment ΔN as calculated at step 302 to the preceding encoder count Ncnt. At the next step 304, for the next counting processing, the current values A(i) and B(i) of the A-phase signal and the B-phase signal are stored as values A(i−1) and B(i−1), respectively.

[Control Mode Setting]

A control mode setting routine shown in FIGS. 20-22, which is executed in a prescribed cycle (e.g., every 1 ms) after the end of an initial drive, specifies a control mode in the following manner by setting a control mode determination value "mode" to one of 0, 1, 3, 4, and 5.

mode=0: current supply off (standby)
mode=1: ordinary drive (feedback control start position stopping and holding process and feedback control)
mode=3: target position stopping and holding process
mode=4: reversing position stopping and holding process
mode=5: open-loop control Upon activation of the control mode setting routine, at step 401, it is determined whether a system failure flag Xfailoff is set to "on" meaning that the position switching controller 42 is in failure. If the flag Xfailoff is "on," the routine proceeds to step 402, where a process for keeping the SR motor 12 in a current supply-off state, whereupon the following settings are made: a rotation direction instruction value D=0 (stop), a current supply flag Xon=off (current supply off), a feedback permission flag Xfb=off (a feedback control prohibited), and the control mode determination value "mode"=0 (current supply off).

On the other hand, if the system failure flag Xfailoff is "off" (no failure), the routine goes from step 401 to step 403, where it is determined whether the open-loop control execution flag Xopen is "off" and the recovery process execution flag Xrcv is "off." If one or both of the open-loop control execution flag Xopen and the recovery process execution flag Xrcv are "on," the routine proceeds to step 404, where the following settings are made to execute an open-loop control: the rotation direction instruction value D=0 (stop), the control mode determination value "mode"=5 (open-loop control), and the feedback permission flag Xfb=off (a feedback control prohibited).

If both of the open-loop control execution flag Xopen and the recovery process execution flag Xrcv are "off," the routine proceeds to step 405, where it is determined whether the current supply flag Xon is "on" (current supply on). If the current supply flag Xon is "off" (current supply off), the routine proceeds to step 406, where the difference between a target count Acnt and an encoder count Ncnt (i.e., the difference between a target position and a position of the rotor 32) is calculated and it is determined on the basis of the difference Acnt−Ncnt which of normal rotation (i.e., rotation from the P-position to the non-P-position), reverse rotation (i.e., rotation from the non-P-position to the P-position), and a stop the current rotation mode is. At this time, a value as corrected by using an initial positional deviation learned value Gcnt that was learned in the initial drive routine of FIGS. 8 and 9 is used as the encoder count Ncnt:

$$Ncnt = Ncnt - Gcnt$$

The target count Acnt is set by a target count setting routine (described later) shown in FIGS. 45 and 46.

If the difference Acnt−Ncnt between the target count Acnt and the encoder count Ncnt is greater than or equal to +Kth (e.g., +10°), it is determined that the rotor 32 needs to be rotated in the normal direction (i.e., the rotation direction from the P-position to the non-P-position). The routine proceeds to step 407, where the following settings are made: the rotation direction instruction value D=1 (normal rotation), the current supply flag Xon=on (current supply on), and the control mode determination value "mode"=1 (feedback control start position stopping and holding process and feedback control).

If the difference Acnt−Ncnt between the target count Acnt and the encoder count Ncnt is smaller than or equal to −Kth (e.g., −10°), it is determined that the rotor 32 needs to be rotated in the reverse direction (i.e., the rotation direction from the non-P-position to the P-position). The routine proceeds to step 409, where the following settings are made: the rotation direction instruction value D=−1 (reverse rotation), the current supply flag Xon=on (current supply on), and the control mode determination value "mode"=1 (feedback control start position stopping and holding process and feedback control).

If the difference Acnt−Ncnt between the target count Acnt and the encoder count Ncnt is in a range of −Kth to +Kth (e.g., −10° to +10°), it is determined that the rotor 32 can be kept at the target position by spring force of the detent spring 23 (i.e., it is not necessary to energize the SR motor 12). The routine proceeds to step 408, where the following settings are made to keep the SR motor 12 in a current supply-off state: the rotation direction instruction value D=0 (stop), the current supply flag Xon=off (current supply off), and the control mode determination value "mode"=0 (current supply off).

Figure 21:
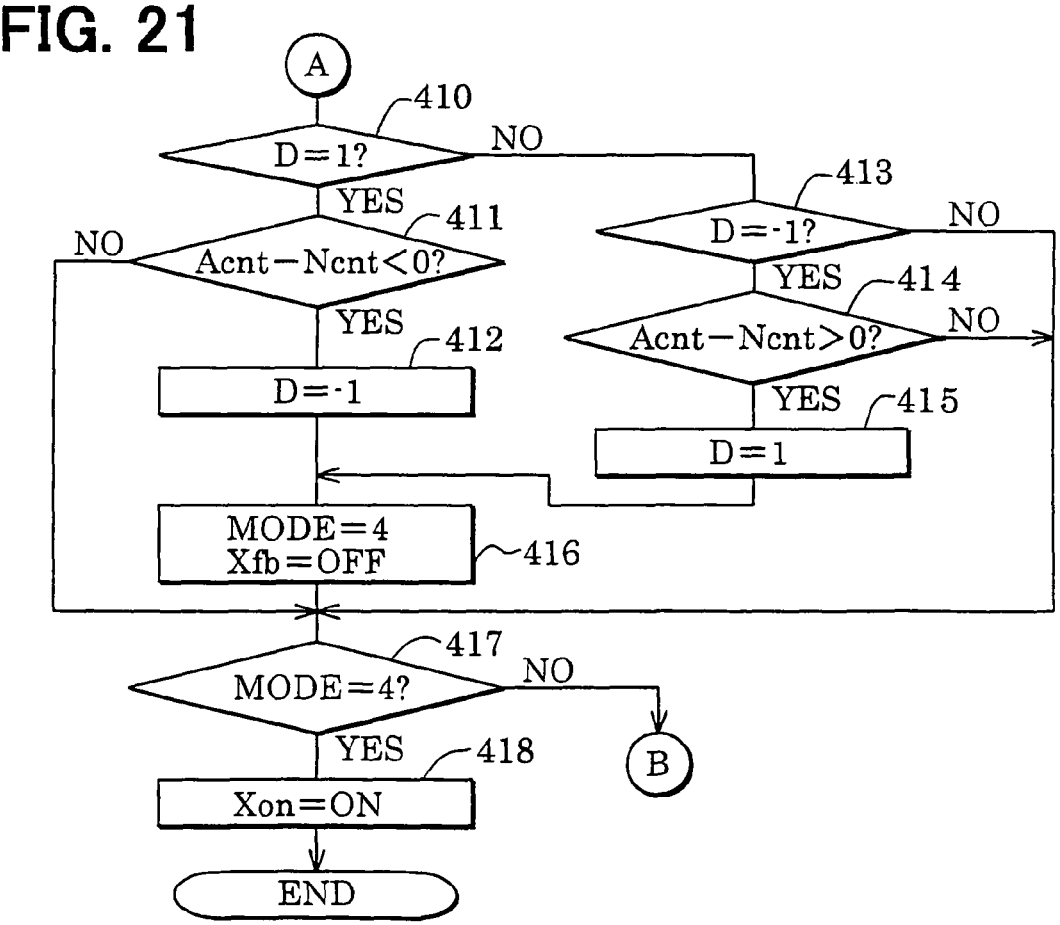
FIGS. 20-22 are flowcharts showing a control mode setting routine.

On the other hand, if it is determined at step 405 that the current supply flag Xon is "on" (current supply on), steps 410-415 shown in FIG. 21 are executed, whereby it is determined by whether the instructed shift position (target position) has been reversed and, if the instructed shift position has been reversed, the rotation direction instruction value D is reversed.

More specifically, first, it is determined at step 410 whether the rotation direction instruction value D is equal to "1" (normal rotation). If the rotation direction instruction value D is equal to "1" (normal rotation), the routine proceeds to step 411, where whether it is necessary to change the rotation direction of the rotor 32 from the normal direction to the reverse direction is determined on the basis of whether the difference Acnt−Ncnt between the target count Acnt and the encoder count Ncnt has a negative value. If it is necessary to change the rotation direction of the rotor 32 that way, the routine proceeds to step 412, where the rotation direction instruction value D is set to "−1" (reverse rotation).

In contrast, if it is determined at step 410 that the rotation direction instruction value D is not equal to "1" (normal rotation), that is, if it is determined that the value D is equal to "0" or "−1," the routine proceeds to step 413, where it is determined whether the rotation direction instruction value D is equal to "−1" (reverse rotation). If the value D is equal to "−1" (reverse rotation), the routine proceeds to step 414, where whether it is necessary to change the rotation direction of the rotor 32 from the reverse direction to the normal direction is determined on the basis of whether the difference Acnt−Ncnt between the target count Acnt and the encoder count Ncnt has a positive value. If it is necessary to change the rotation direction of the rotor 32 that way, the routine proceeds to step 415, where the rotation direction instruction value D is set to "1" (normal rotation).

If the rotation direction instruction value D has been reversed in the above manner, the routine proceeds to step 416, where the following settings are made to reverse the rotation direction of the rotor 32: the control mode determination value "mode"=4 (reversing position stopping and holding process) and the feedback permission flag Xfb=off (feedback control prohibited). Then, the routine proceeds to step 417. On the other hand, if the rotation direction instruction value D has not been reversed, the routine proceeds to step 417 skipping step 416.

At step 417, it is determined whether the control mode determination value "mode" is equal to "4" (reversing position stopping and holding process). If the determination result is "yes," the routine proceeds to step 418, where the current supply flag Xon is set to "on" (current supply on), whereupon a reversing position stopping and holding process is executed.

Figure 22:
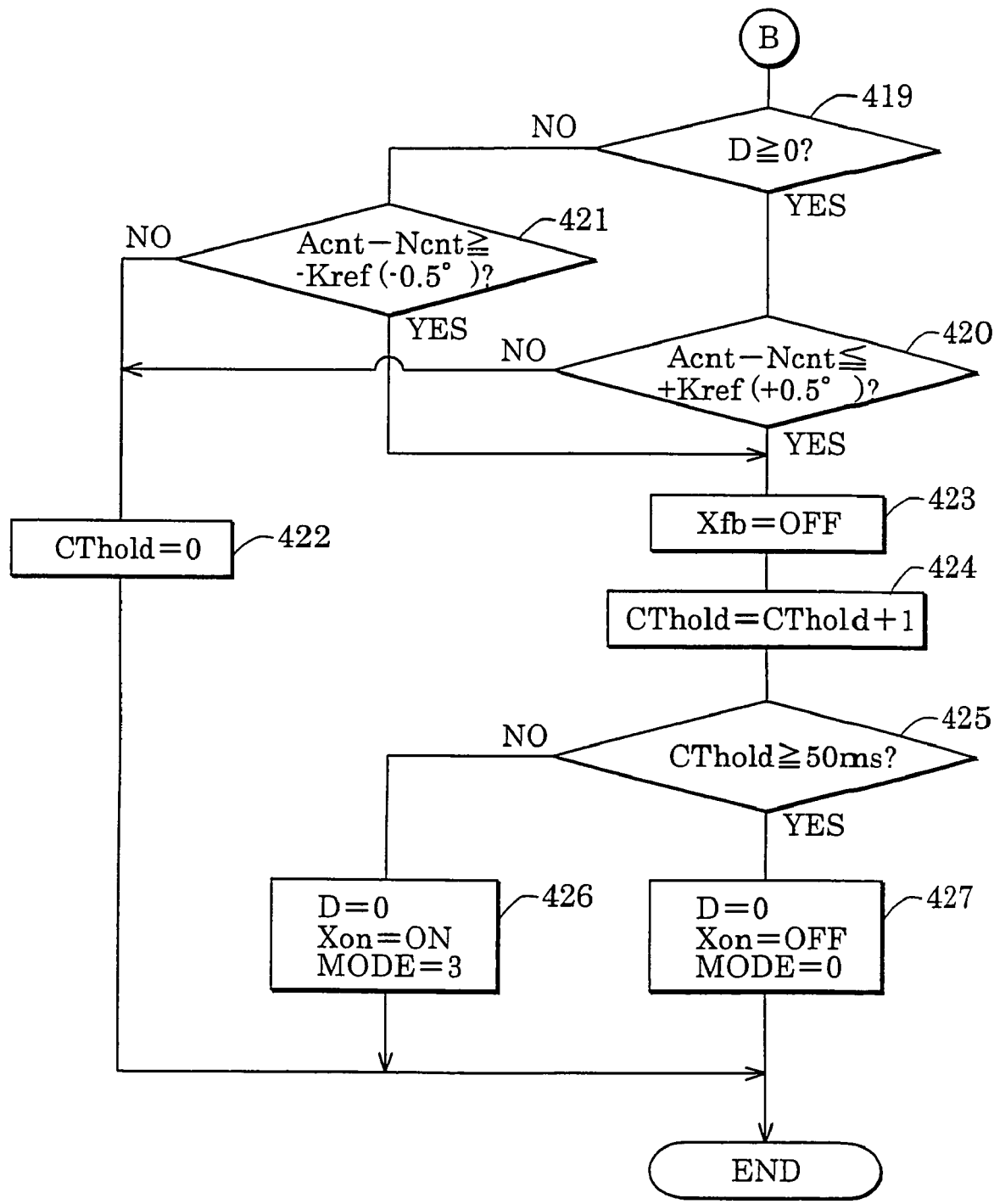

On the other hand, if the determination result at step 417 is "no" (i.e., a reversing position stopping and holding process is not to be executed), steps 419-421 shown in FIG. 22 are executed, whereby it is determined whether the feedback control should be finished. Specifically, it is determined at step 419 whether the rotation direction instruction value D is greater than or equal to "0" (normal rotation or a stop). If the value D≧0, the routine proceeds to step 420, where whether the feedback control should be finished is determined on the basis of whether the difference Acnt−Ncnt between the target count Acnt and the encoder count Ncnt is smaller than or equal to +Kref (e.g., +0.5°). If the rotation direction instruction value D is equal to "−1" (reverse rotation), the routine proceeds to step 421, where whether the feedback control should be finished is determined on the basis of whether the difference Acnt−Ncnt between the target count Acnt and the encoder count Ncnt is greater than or equal to −Kref (e.g., −0.5°).

That is, by setting the feedback control end determination value Kref to the phase lead (e.g., 2 to 4 counts) of the current supply phase, the feedback control is finished at an instant that precedes, by a time corresponding to the phase lead of the current supply phase, an instant that is determined by the target count Acnt. With this measure, the last current supply phase of the feedback control comes to coincide with a current supply phase with which the rotor 32 is to be stopped and kept at the target position (target count Acnt).

If the determination result at step 420 or 421 is "no" (i.e., the feedback control should not be finished), the routine proceeds to step 422, where the count CThold of a stopping and holding time counter for counting the time of a target position stopping and holding process is reset.

On the other hand, if the determination result at step 420 or 421 is "yes" (i.e., the feedback control should be finished), the routine proceeds to step 423, where the feedback permission flag Xfb is set to "off" (feedback control prohibited), whereupon the feedback control is finished and a transition is made to a target position stopping and holding process. At the next step 424, the count CThold of the stopping and holding time counter is incremented to count the time of the target position stopping and holding process.

Then, at step 425, it is determined whether the time CThold of the target position stopping and holding process has reached a prescribed time (e.g., 50 ms). If the time CThold has not reached the prescribed time (e.g., 50 ms) yet, the routine proceeds to step 426, where the following settings are maintained to continue the target position stopping and holding process: the rotation direction instruction value D=0 (stop), the current supply flag Xon=on (current supply on), and the control mode determination value "mode"=3 (target position stopping and holding process).

When the time CThold of the target position stopping and holding process has reached the prescribed time (e.g., 50 ms), the routine proceeds to step 427, where the following settings are made to turn off the current supply of the SR motor 12: the rotation direction instruction value D=0 (stop), the current supply flag Xon=off (current supply off), and the control mode determination value "mode"=0 (current supply off).

[Time-Synchronous Motor Control]

Figure 23:
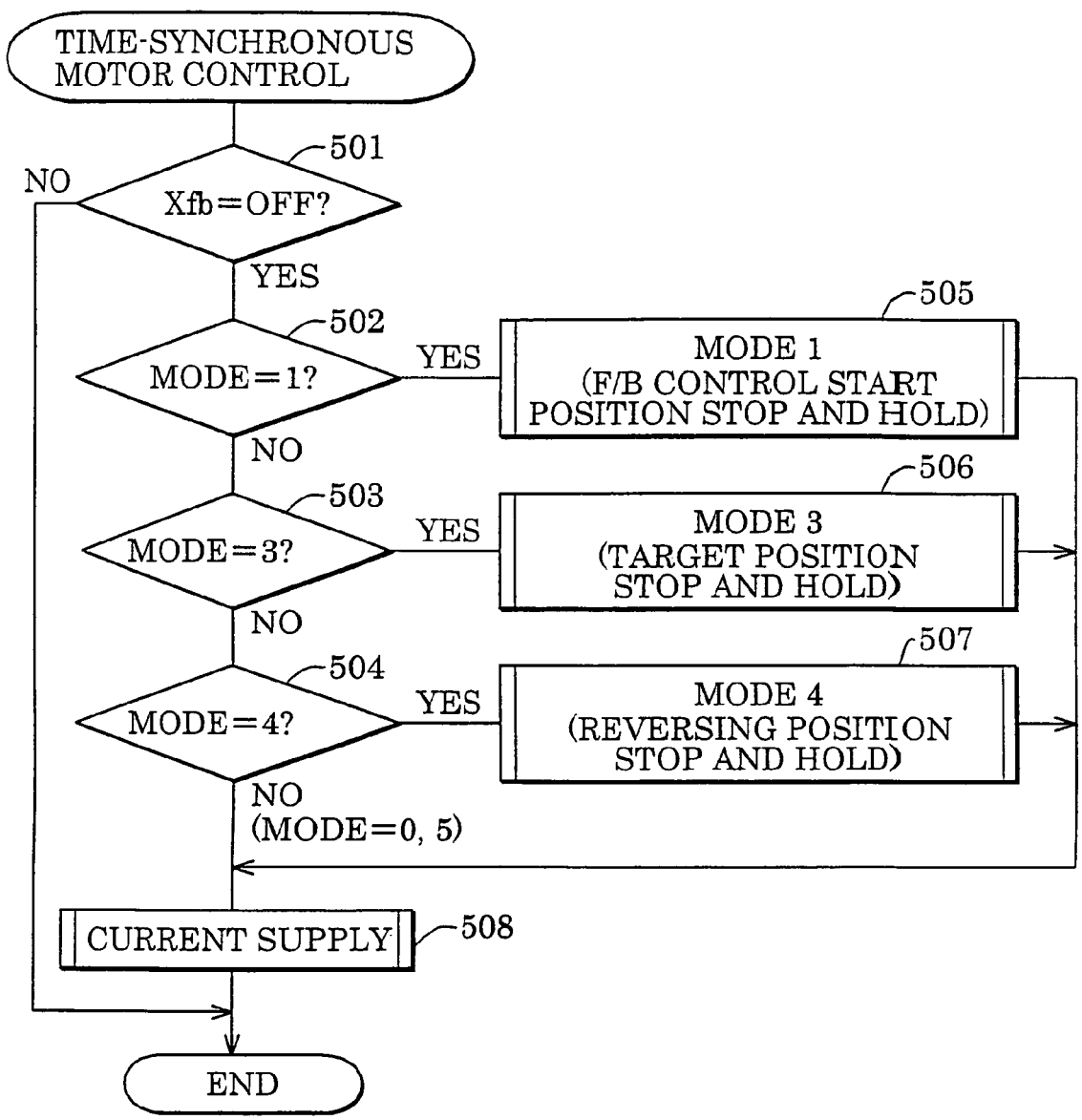
FIG. 23 is a flowchart showing a time-synchronous motor control routine.

A time-synchronous motor control routine shown in FIG. 23 is activated in a prescribed cycle (e.g., every 1 ms) after the end of an initial drive. A feedback control start position stopping and holding process, a target position stopping and holding processing, or a reversing position stopping and holding process is executed in this routine.

Upon activation of this routine, at step 501, it is determined whether the feedback permission flag Xfb is "off" (feedback control prohibited). If the feedback permission flag Xfb is "on" (feedback control permitted), the routine is finished without executing the remaining steps. In this case, current supply phase setting and current supply processing are performed by a feedback control routine (described later) shown in FIG. 30.

Figure 24:
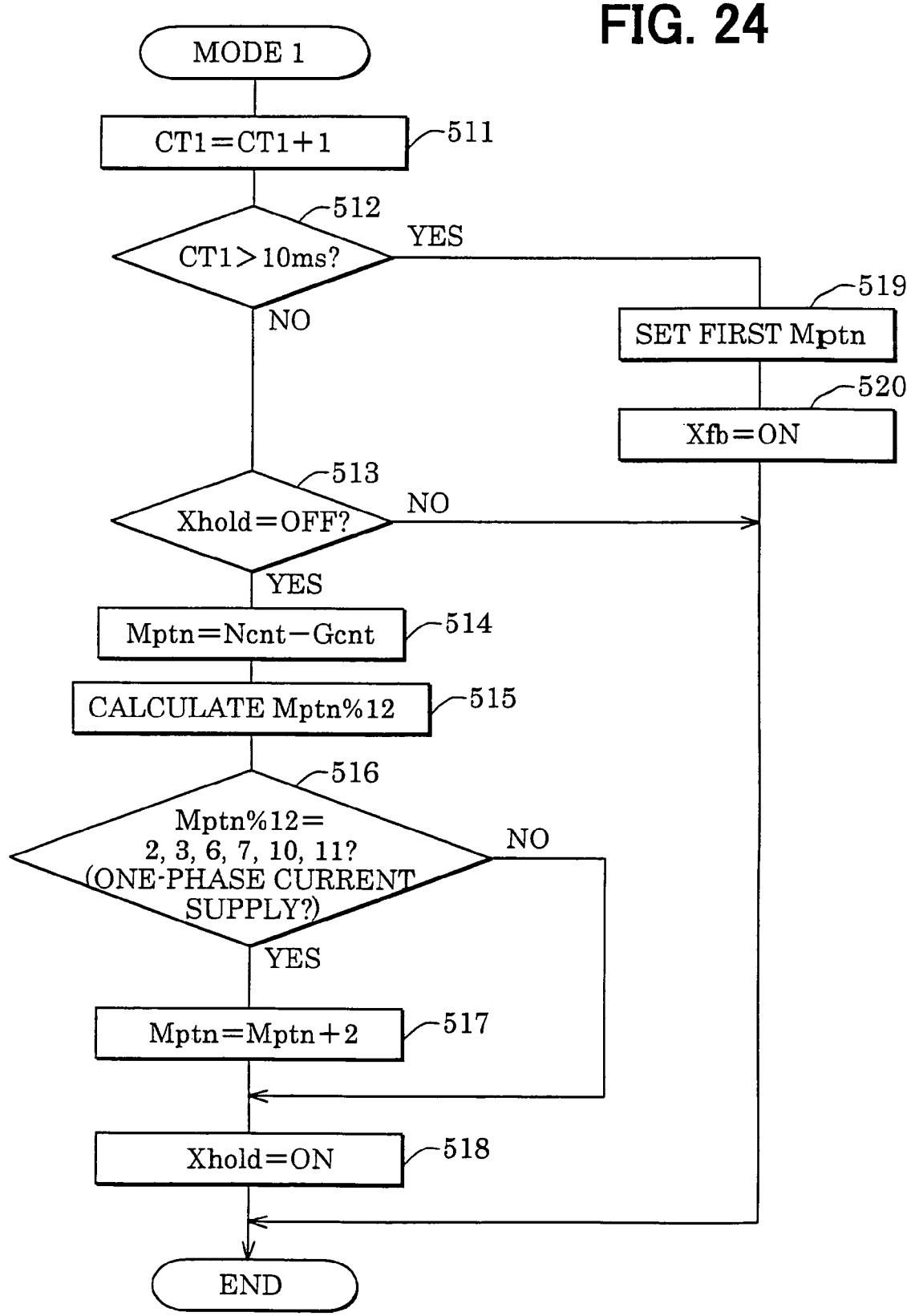
FIG. 24 is a flowchart showing a mode-1 routine.

On the other hand, if it is determined at step 501 that the feedback permission flag Xfb is "off" (feedback control prohibited), it is determined at steps 502-504 whether the control mode determination value "mode" is equal to 1, 3, or 4. If the control mode determination value "mode" is equal to "1" (feedback control start position stopping and holding process and feedback control), the routine goes from step 502 to step 505, where a mode-1 routine (described later) shown in FIG. 24 is executed, whereby a current supply phase determination value Mptn indicating a current supply phase with which to execute a feedback control start position stopping and holding process is calculated.

Figure 25:
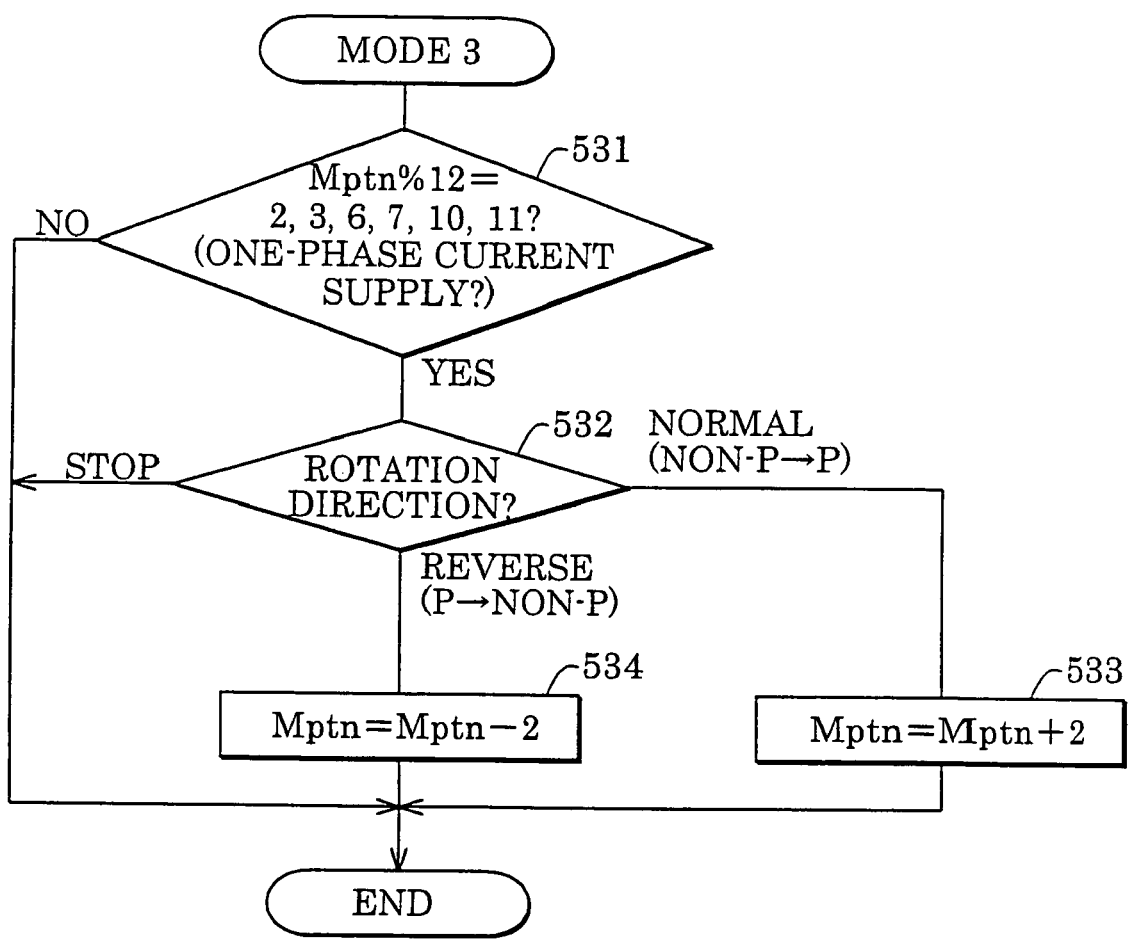
FIG. 25 is a flowchart showing a mode-3 routine.

If the control mode determination value "mode" is equal to "3" (target position stopping and holding process), the routine goes from step 503 to step 506, where a mode-3 routine (described later) shown in FIG. 25 is executed, whereby a current supply phase determination value Mptn indicating a current supply phase with which to execute a target position stopping and holding process is calculated.

Figure 26:
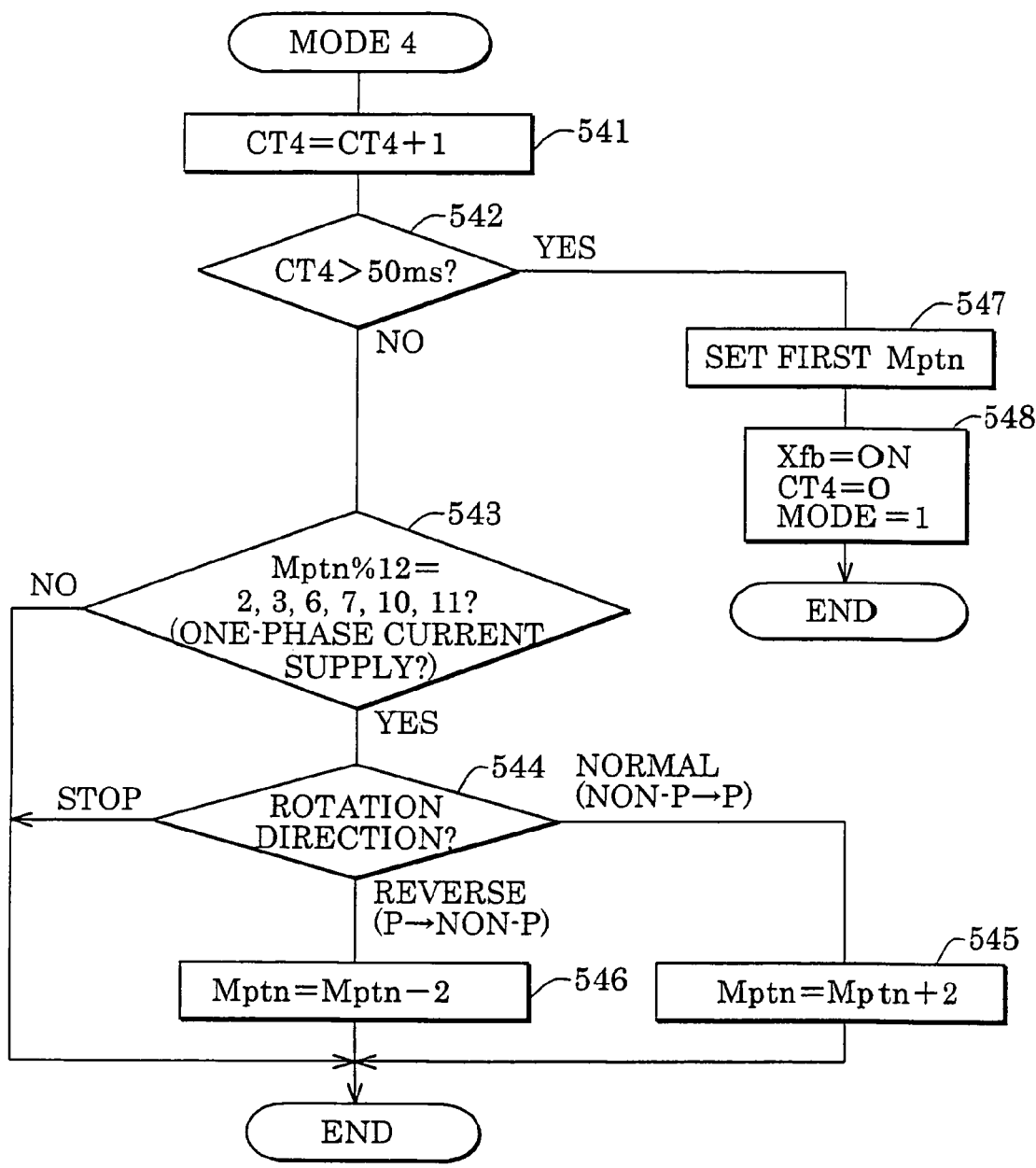
FIG. 26 is a flowchart showing a mode-4 routine.

If the control mode determination value "mode" is equal to "4" (reversing position stopping and holding process), the routine goes from step 504 to step 507, where a mode-4 routine (described later) shown in FIG. 26 is executed, whereby a current supply phase determination value Mptn indicating a current supply phase with which to execute a current supply position stopping and holding process is calculated.

Figure 27:
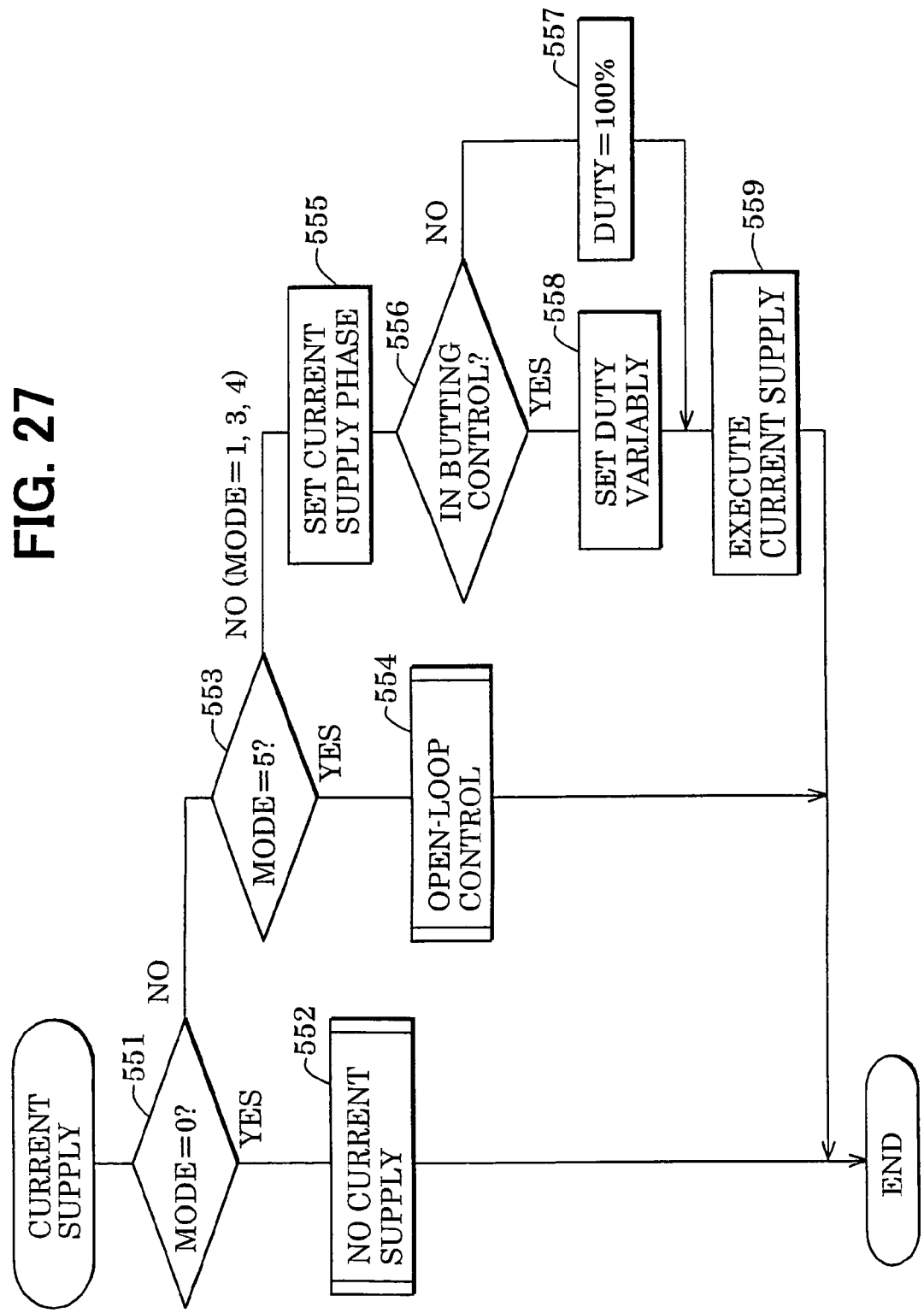
FIG. 27 is a flowchart showing a current supply processing routine.

As described above, if the control mode determination value "mode" is equal to 1, 3, or 4, a current supply phase determination value Mptn is calculated and the routine proceeds to step 508, where a current supply processing routine shown in FIG. 27 is executed, that is, a feedback control start position stopping and holding process, a target position stopping and holding processing, or a reversing position stopping and holding process is executed.

On the other hand, if the determination results at all of steps 502-504 are "no," that is, if the control mode determination value "mode" is equal to 0 or 5, the routine directly proceeds to step 508, where the current supply processing routine shown in FIG. 27 is executed, that is, the current supply is turned off or an open-loop control is performed.

[Mode-1]

The mode-1 routine shown in FIG. 24 is a subroutine that is activated at step 505 of the time-synchronous motor control routine of FIG. 23. In the mode-1 routine, a current supply phase determination value Mptn (current supply phase) for a feedback control start position stopping and holding process is set in the following manner.

Upon activation of this routine, at step 511, the count CT1 of a current supply time counter that counts the time of a feedback control start position stopping and holding process is incremented. At the next step 512, it is determined whether the time CT1 of the feedback control start position stopping and holding process has exceeded a prescribed time (e.g., 10 ms).

If the time CT1 of the feedback control start position stopping and holding process has not exceeded the prescribed time (e.g., 10 ms), the routine proceeds to step 513, where it is determined whether a stopping and holding current supply phase storage flag Xhold is "off" (not stored), that is, whether the present instant is immediately before a start of the feedback control start position stopping and holding process. If the stopping and holding current supply phase storage flag Xhold is "off," the routine proceeds to step 514, where a current position count Ncnt−Gcnt is set as a current supply phase determination value Mptn for the feedback control start position stopping and holding process:

$$Mptn = Ncnt - Gcnt$$

The current position count Ncnt−Gcnt is an encoder count Ncnt as corrected by using an initial positional deviation learned value Gcnt, and represents a current position of the rotor 32 correctly.

Then, the routine proceeds to step 515, where the current supply phase determination value Mptn is divided by 12 and a remainder Mptn%12 is obtained. The number "12" is an increase or decrease of the encoder count Ncnt (current supply phase determination value Mptn) that occurs when current supply is effected for all the phases around. A current supply phase is determined according to a conversion table shown in FIG. 28 on the basis of the value Mptn%12.

At step 516, whether one-phase current supply (U-phase, V-phase, or W-phase) is going to be performed is determined on the basis of whether the value Mptn%12 is equal to 2, 3, 6, 7, 10, or 11. If one-phase current supply is going to be performed, the routine proceeds to step 517, where the current supply phase determination value Mptn is incremented by 2 that corresponds to one step so that two-phase current supply (U and V-phases, V and W-phases, or U and W-phases) will be performed. Executing the feedback control start position stopping and holding process with two-phase current supply which produces higher torque than one-phase current supply does prevents the rotor 32 from vibrating in the vicinity of a feedback control start position and hence can reliably stop and keep the rotor 32 at the feedback control start position.

The stopping and holding current supply phase storage flag Xhold is set to "on" (stored) at the next step 518, Then this routine is finished. When this routine is activated later, the determination result at step 513 should become "no" and hence steps 514-518 are not executed. That is, the process of setting a current supply phase determination value Mptn (current supply phase) for the feedback control start position stopping and holding process is set is performed only once immediately before a start of the feedback control start position stopping and holding process.

Then, when the time CT1 of the feedback control start position stopping and holding process has exceeded the prescribed time (e.g., 10 ms), the determination result at step 512 becomes "yes," whereupon the feedback control start position stopping and holding process is finished and a transition is made to a feedback control. First, at step 519, a first current supply phase determination value Mptn with which to start the feedback control is set by adding or subtracting, in accordance with a rotation direction, a count (e.g., 4 or 3) corresponding to A-phase lead of the current supply phase to or from the current supply phase determination value Mptn for the feedback control start position stopping and holding process, whereupon driving for rotating the rotor 32 is started. Then, the routine proceeds to step 520, where the feedback permission flag Xfb is set to "on" (feedback control permitted).

Figure 32:
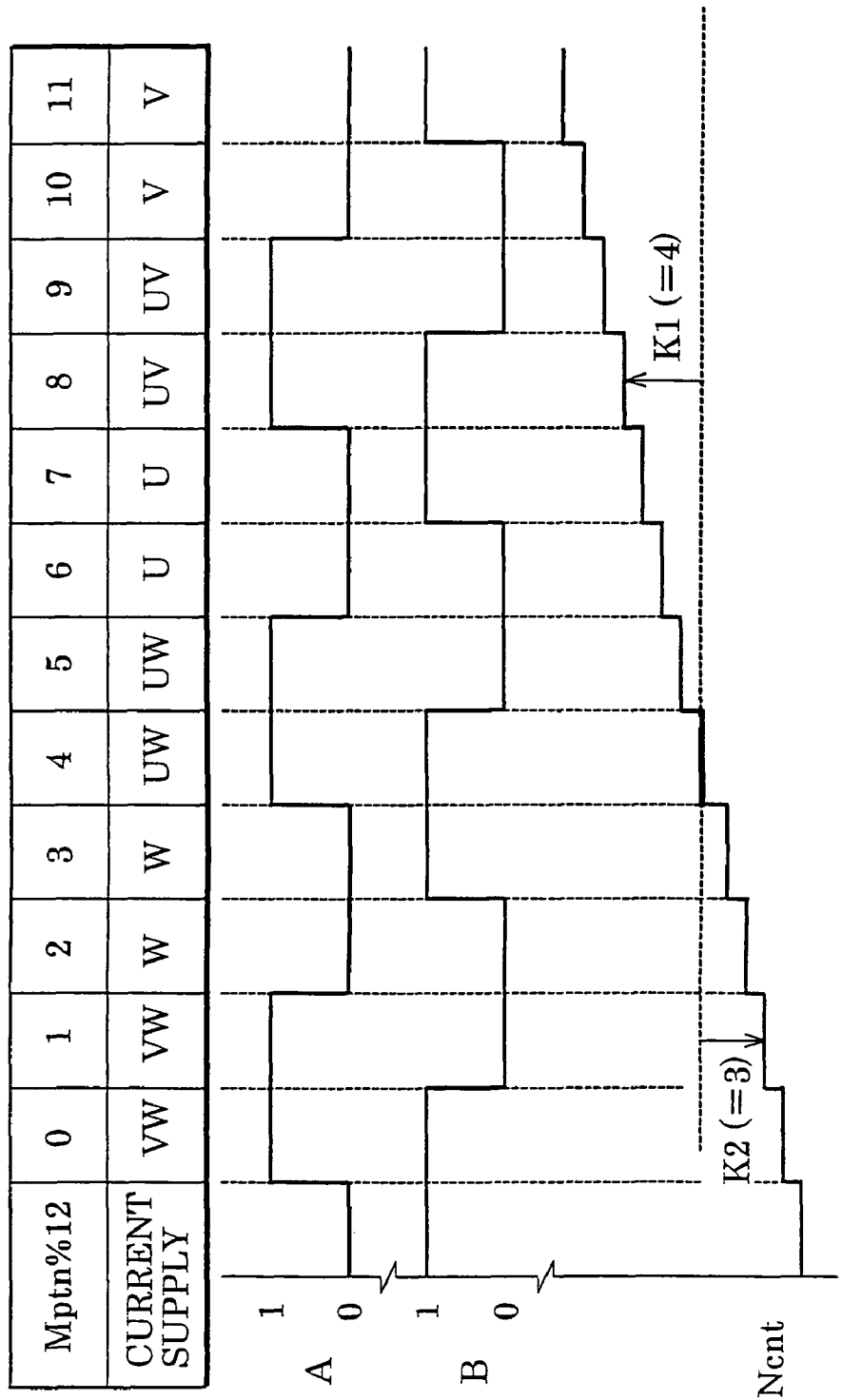
FIG. 32 is a time chart illustrating a current supply process in which rotation is started from a state corresponding to U and W-phases.

FIG. 32 is a time chart illustrating A-phase for which current supply is effected first in the case where rotation is started from a state corresponding to the U and W-phases. In this case, to start normal rotation (i.e., rotation from the P-position to the non-P-position), a current supply phase determination value Mptn is calculated according to the following equation by using an encoder count Ncnt, an initial positional deviation learned value Gcnt, and a normal rotation direction phase lead K1:

$$Mptn = Ncnt - Gcnt + K1$$

If the normal rotation direction phase lead K1 is equal to 4, for example, a current supply phase determination value Mptn is calculated according to the following equation:

$$Mptn = Ncnt - Gcnt + 4$$

To start normal rotation from a state corresponding to the U and W-phases, mod(Ncnt−Gcnt) is 4 and hence Mptn%12 is equal to 8 (=4+4). The U and V-phases are set as first current supply phases.

On the other hand, to start reverse rotation (i.e., rotation from the non-P-position to the P-position) from a state corresponding to the U and W-phases, if a reverse rotation direction phase lead K2 is equal to 3, for example, a current supply phase determination value Mptn is calculated according to the following equation:

$$Mptn = Ncnt - Gcnt - K2$$
$$= Ncnt - Gcnt - 3$$

To start reverse rotation from a state corresponding to the U and W-phases, Mptn%12 is equal to 1 (=4−3). The V and W-phases are set as first current supply phases.

In this manner, by setting the normal rotation direction phase lead K1 and the reverse rotation direction phase lead K2 to 4 and 3, respectively, current supply phase switching patterns for the normal rotation direction and the reverse rotation direction can be made symmetrical. In either of the normal rotation direction and the reverse rotation direction, rotation can be started by effecting current supply first for A-phase of a position that is two steps deviated from the current position of the rotor 32.

[Mode-3]

The mode-3 routine shown in FIG. 25 is a subroutine that is activated at step 506 of the time-synchronous motor control routine of FIG. 23. In the mode-3 routine, a current supply phase determination value Mptn (current supply phase) for a target position stopping and holding process is set in the following manner.

Upon activation of this routine, at step 531, whether the current supply phase at the end of the feedback control is one phase (U-phase, V-phase, or W-phase) is determined on the basis of whether the value Mptn%12 is equal to 2, 3, 6, 7, 10, or 11. If it is one-phase, steps 532-534 are executed, whereby the current supply phase determination value Mptn is incremented or decremented by 2 in accordance with the rotation direction of the feedback control performed so far and the current supply phase is thereby changed to two phases next to the current one phase.

In doing so, at step 532 the rotation direction is determined in the following manner. The rotation direction instruction value D is set to "0" (stop) at step 426 in FIG. 22 immediately before this routine is activated (i.e., when the feedback control has finished). Therefore, the rotation direction cannot be determined by checking the rotation direction instruction value D. In view of this, in this embodiment, with attention paid to the fact that the current supply phase determination value Mptn at the end of the feedback control and the position count Ncnt−Gcnt are different from each other by the phase lead K1 or K2 of the current supply phase, the rotation direction is determined in the following manner in accordance with a magnitude relationship between the current supply phase determination value Mptn at the end of the feedback control and the position count Ncnt−Gcnt.

If Mptn>(Ncnt−Gcnt), the rotation direction is determined to be normal rotation (i.e., the rotation direction from the P-position to the non-P-position). The routine proceeds to step 533, where the current supply phase determination value Mptn is incremented by 2 to as to effect two-phase current supply.

On the other hand, if Mptn<(Ncnt−Gcnt), the rotation direction is determined to be reverse rotation (i.e., the rotation direction from the non-P-position to the P-position). The routine proceeds to step 534, where the current supply phase determination value Mptn is decremented by 2 to as to effect two-phase current supply. If Mptn=(Ncnt−Gcnt), it is determined that the rotor 32 is stopped and hence the current supply phase is not changed.

As described above, like the feedback control start position stopping and holding process, the target position stopping and holding process is executed with two-phase current supply which produces higher torque than one-phase current supply does. This makes it possible to prevent the rotor 32 from vibrating in the vicinity of a target position and hence to reliably stop and keep the rotor 32 at the target position.

[Mode-4]

The mode-4 routine shown in FIG. 26, which is a subroutine that is activated at step 507 of the time-synchronous motor control routine of FIG. 23, sets a current supply phase determination value Mptn for a reversing position stopping and holding process in the following manner.

Upon activation of this routine, at step 541, the count CT4 of a current supply time counter that counts the time of a reversing position stopping and holding process. At the next step 542, it is determined whether the time CT4 of the reversing position stopping and holding process has exceeded a prescribed time (e.g., 50 ms).

If the time CT4 of the reversing position stopping and holding process has not exceeded the prescribed time (e.g., 50 ms), the routine proceeds to step 543, where whether the current supply phase is one phase (U-phase, V-phase, or W-phase) is determined on the basis of whether the value Mptn%12 is equal to 2, 3, 6, 7, 10, or 11. If the current supply phase is one phase, steps 544-546 are executed, whereby the current supply phase determination value Mptn is incremented or decremented by 2 in accordance with the rotation direction of the feedback control performed so far and the current supply phase is thereby changed to two phases next to the current one phase. Steps 543-546 are the same as steps 531-534 of the above mode-3 routine of FIG. 25.

As described above, like the feedback control start position stopping and holding process and the target position stopping and holding process, the reversing position stopping and holding process is executed with two-phase current supply which produces higher torque than one-phase current supply does. This makes it possible to prevent the rotor 32 from vibrating in the vicinity of a reversing position and hence to reliably stop the rotor 32 at the reversing position and keep it there.

Then, when the time CT4 of the reversing position stopping and holding process has exceeded the prescribed time (e.g., 50 ms), the determination result at step 542 becomes "yes," whereupon the reversing position stopping and holding process is finished and the feedback control is restarted. First, at step 547, a first current supply phase determination value Mptn for the new feedback control is set by adding or subtracting, in accordance with a rotation direction, a count (e.g., 4 or 3) corresponding to A-phase lead of the current supply phase to or from the current supply phase determination value Mptn for the reversing position stopping and holding process, whereupon driving for rotating the rotor 32 is started. Then, the routine proceeds to step 548, where the following settings are made: the feedback permission flag Xfb=on (feedback control permitted), the current supply time count CT4=0, and the control mode determination value "mode"=1 (ordinary drive). Then this routine is finished.

[Current Supply Process]

The current supply processing routine shown in FIG. 27 is a subroutine that is activated at step 508 of the time-synchronous motor control routine of FIG. 23. This routine is also activated at step 603 of the feedback control routine (described later) shown in FIG. 30.

Upon activation of the current supply processing routine of FIG. 27, at step 551, it is determined whether the control mode determination value "mode" is equal to "0" (current supply off). If the control mode determination value "mode" is equal to "0" (current supply off), the routine proceeds to step 552, where all the phases are rendered in a current supply-off state to establish a standby state.

On the other hand, if the determination result at step 551 is "no," the routine proceeds to step 553, where it is determined whether the control mode determination value "mode" is equal to "5" (open-loop control). If the control mode determination value "mode" is equal to "5" (open-loop control), the routine proceeds to step 554, where an open-loop control is performed. In the open-loop control, the rotor 32 is rotated to a target position by setting current supply phases by time-synchronous processing having a cycle of 1 ms, for example, when the encoder 46 has failed or an operation abnormality has occurred in the SR motor 12.

Figures 28, 29, 30:
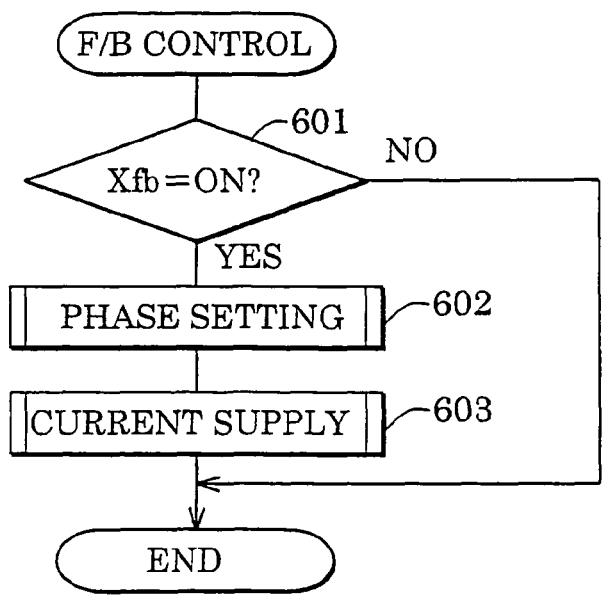
FIG. 28 shows an exemplary conversion table to be used for converting a value Mptn%12 into a current supply phase in the case of a one/two-phase current supply method.
FIG. 29 shows an exemplary table to be used for setting a current supply duty ratio in accordance with a battery voltage during a butting control.
FIG. 30 is a flowchart showing a feedback control routine.

If the determination results at both of steps 551 and 553 are "no," that is, if the control mode determination value "mode" is equal to 1 (feedback control start position stopping and holding process and feedback control), 3 (target position stopping and holding process), or 4 (reversing position stopping and holding process), the routine proceeds to step 555, where a current supply phase is set in accordance with a value Mpt%12 using the conversion table of FIG. 28.

Then, the routine proceeds to step 556, where it is determined whether a butting control is being performed (i.e., whether a P-position-side butting control flag Xexp or a non-P-position-side butting control flag Xexnp is "on"). If no butting control is being performed, the routine proceeds to step 557, where the current supply duty ratio of the SR motor 12 is set to 100%. If a butting control is being performed, the routine proceeds to step 558, where the current supply duty ratio of the SR motor 12 is set to 10% to 30%, for example, in accordance with a battery voltage as a power source voltage for the SR motor 12 by using a table of FIG. 29. As a result, during a butting control, the torque of the SR motor 12 is made much lower than in an ordinary drive.

In the exemplary table of FIG. 29, in view of the characteristic that the torque of the SR motor 12 increases as the power source voltage for the SR motor 12 (i.e., the battery voltage) increases, the current supply duty ratio is set smaller as the power source voltage for the SR motor 12 (i.e., the battery voltage) increases. This makes the torque of the SR motor 12 approximately constant irrespective of whether the power source voltage (i.e., the battery voltage) is high or low, and thereby allows the SR motor 12 to always generate minimum torque that is necessary for a butting control.

After the current supply duty ratio has been set in the above manner, the routine proceeds to step 559, where the ECU 41 outputs control signals to the motor drivers 37 and 38, whereby the windings of the current supply phase that was set at step 555 are energized with the current supply duty ratio that was set at step 557 or 558 and the SR motor 12 is thereby driven.

[Feedback Control]

Next, the details of the feedback control routine shown in FIG. 30 will be described. This routine is executed by A/B-phase interruption processing. In this routine, in a state that the feedback control execution conditions are satisfied after the end of an initial drive, the rotor 32 is rotated until its rotation position (Ncnt−Gcnt) reaches a position that is 0.5°, for example, short of a target position (target count Acnt) by switching the current supply phase on the basis of the encoder count Ncnt and an initial positional deviation learned value Gcnt.

Upon activation of the feedback control routine of FIG. 30, at step 601, it is determined whether the feedback permission flag Xfb is "on" (i.e., whether the feedback control execution conditions are satisfied). If the feedback permission flag Xfb is "off" (i.e., the feedback control execution conditions are not satisfied), this routine is finished without executing the remaining steps.

Figure 31:
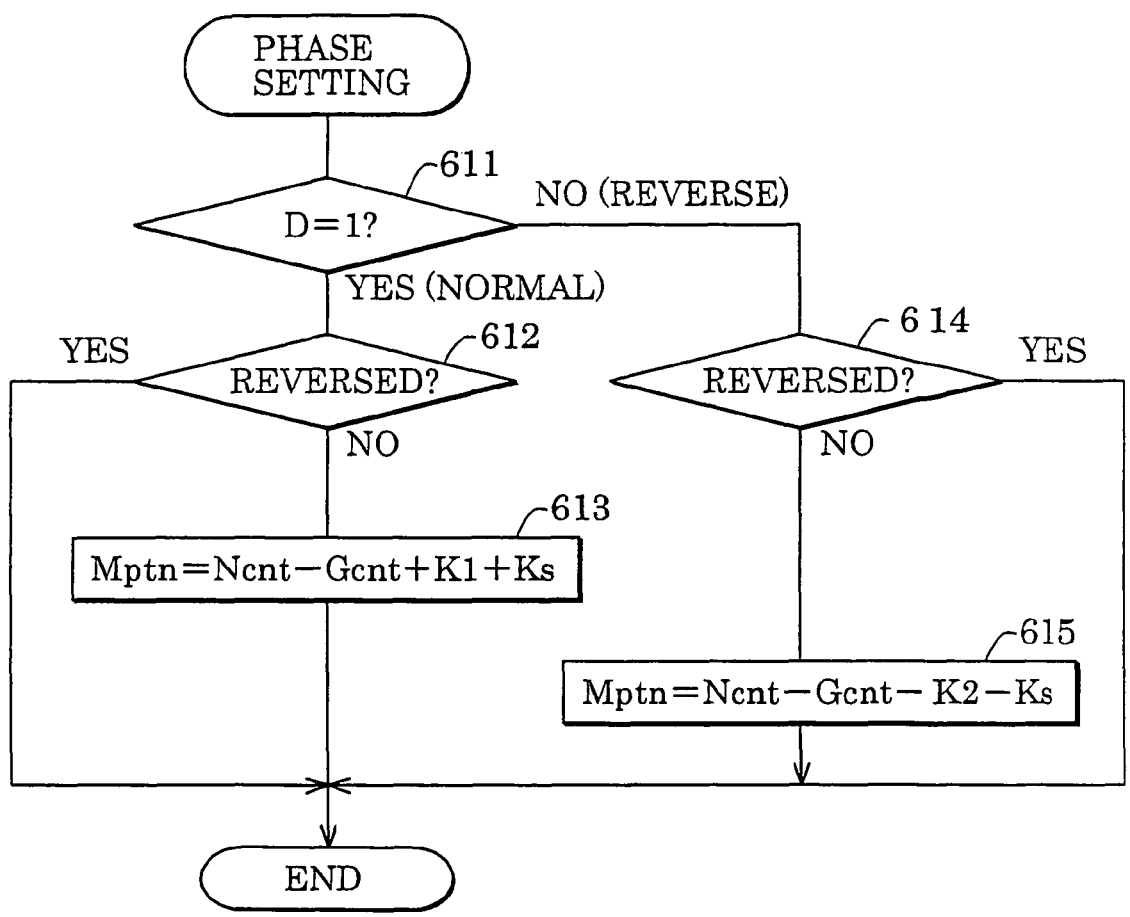
FIG. 31 is a flowchart showing a current supply phase setting routine.

On the other hand, if the feedback permission flag Xfb is "on," the routine proceeds to step 602, where a current supply phase setting routine (described later) shown in FIG. 31 is executed, whereby a current supply phase is set on the basis of a current encoder count Ncnt and an initial positional deviation learned value Gcnt. At the next step 603, the current supply processing routine of FIG. 27 is executed.

[Current Supply Phase Setting]

The current supply phase setting routine of FIG. 31 is a subroutine that is activated at step 602 of the feedback control routine of FIG. 30. Upon activation of this routine, at step 611, it is determined whether the rotation direction instruction value D indicating a rotation direction toward a target position is equal to "1" that means the normal rotation direction (i.e., the rotation direction from the P-position to the non-P-position). If it is determined that the rotation direction instruction value D is equal to "1" (normal rotation), the routine proceeds to step 612, where it is determined whether the rotation direction of the rotor 32 has reversed (i.e., whether the encoder count Ncnt has decreased) contrary to the rotation direction instruction. If the rotation direction has not reversed, the routine proceeds to step 613, where the current supply phase determination value Mptn is updated according to the following equation by using a current encoder count Ncnt, an initial positional deviation learned value Gcnt, a normal rotation direction phase lead K1, and a speed phase lead correction amount Ks:

$$Mptn=Ncnt-Gcnt+K1+Ks$$

The normal rotation direction phase lead K1 is A-phase lead of the current supply phase that is necessary to rotate the rotor 32 in the normal direction (i.e., A-phase lead of the current supply phase with respect to the current rotation phase of the rotor 32), and is set to "4," for example.

The speed phase lead correction amount Ks is A-phase lead correction amount that is set in accordance with a rotation speed of the rotor 32, and is set by a speed phase lead correction amount setting routine (described later) shown in FIG. 34. For example, the speed phase lead correction amount Ks is set to "0" in a low-speed range and is increased to "1" or "2," for example, as the rotation speed increases. As a result, the current supply phase determination value Mptn is corrected so as to indicate a current supply phase that is suitable for a rotation speed of the rotor 32.

On the other hand, if it is determined at step 612 that the rotation direction of the rotor 32 has reversed contrary to the rotation direction instruction, the current supply phase determination value Mptn is not updated to prevent progress of the reversed rotation. In this case, current supply is effected for the phase for which current supply was effected immediately before the reversing (i.e., the preceding current supply phase), whereby braking torque is generated in such a direction as to suppress the reversed rotation.

If it is determined at step 611 that the rotation direction instruction value D is equal to "−1" (the reverse rotation direction, i.e., the rotation direction from the non-P-position to the P-position), the routine proceeds to step 614, where it is determined whether the rotation direction of the rotor 32 has reversed (i.e., whether the encoder count Ncnt has increased) contrary to the rotation direction instruction. If the rotation direction has not reversed, the routine proceeds to step 615, where the current supply phase determination value Mptn is updated according to the following equation by using a current encoder count Ncnt, an initial positional deviation learned value Gcnt, a reverse rotation direction phase lead K2, and a speed phase lead correction amount Ks:

$$Mptn=Ncnt-Gcnt-K2-Ks$$

The reverse rotation direction phase lead K2 is A-phase lead of the current supply phase that is necessary to rotate the rotor 32 in the reverse direction (i.e., A-phase lead of the current supply phase with respect to the current rotation phase of the rotor 32), and is set to "3," for example. As in the case of the normal rotation, the speed phase lead correction amount Ks is set by the speed phase lead correction amount setting routine (described later) shown in FIG. 34.

On the other hand, if it is determined at step 614 that the rotation direction of the rotor 32 has reversed contrary to the rotation direction instruction, the current supply phase determination value Mptn is not updated to prevent progress of the reversed rotation (i.e., normal rotation). In this case, current supply is effected for the phase for which current supply was effected immediately before the reversing (i.e., the preceding current supply phase), whereby braking torque is generated in such a direction as to suppress the reversed rotation (i.e., normal rotation).

After the current supply phase determination value Mptn has been determined in the above manner, the current supply processing routine of FIG. 27 is executed. While the feedback control is being performed, a current supply phase corresponding to a value Mptn%12 is selected at step 555 by searching the conversion table of FIG. 28 and current supply is effected for the selected current supply phase.

[Rotor Rotation Speed Calculation]

Figure 33:
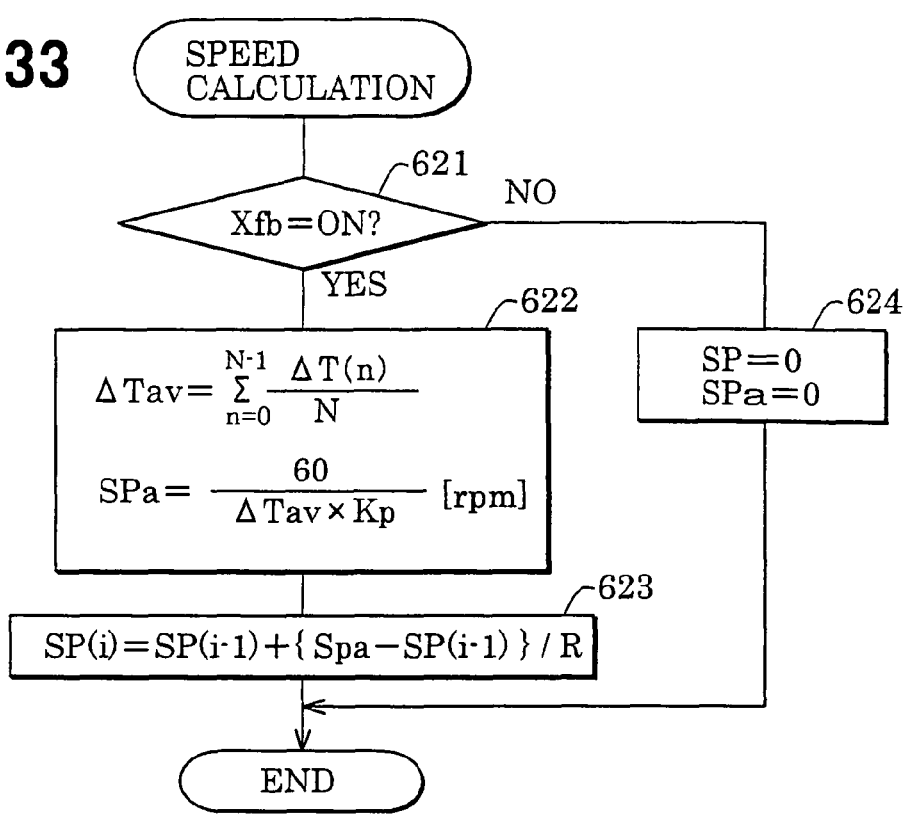
FIG. 33 is a flowchart showing a rotor rotation speed calculation routine.

A rotor rotation speed calculation routine shown in FIG. 33, which is executed by A/B-phase interruption processing, calculates a rotation speed SP of the rotor 32 in the following manner. Upon activation of this routine, at step 621, it is determined whether the feedback permission flag Xfb is "on" (a feedback control is being performed). If the feedback permission flag Xfb is "off" (feedback prohibited), no correction is performed on A-phase lead of the current supply phase in accordance with a rotation speed SP of the rotor 32 and hence the routine proceeds to step 624, where stored rotation speeds SP and SPa of the rotor 32 are reset. Then this routine is finished.

On the other hand, if the feedback permission flag Xfb is "on" (a feedback control is being performed), a rotation speed SP of the rotor 32 is calculated in the following manner. First, at step 622, time intervals ΔT(n) between rising/trailing edges of an A-phase signal and a B-phase signal of the encoder 46 (i.e., time interval at which the encoder count increases or decreases) are measured and an average of past n time intervals ΔT (n) is calculated. And a rotation speed calculation value SPa is calculated according to the following equation:

$$SPa = 60/(\Delta Tav \times Kp) [rpm]$$

In the above equation, Kp is the number of time intervals ΔT(n) per one rotation of the rotor 32 (i.e., a variation of the encoder count per one rotation of the rotor 32). In the case of the rotor 32 having the structure of FIG. 5, Kp is equal to 96. And ΔTav×Kp is a time [sec] that is required for the rotor 32 to make one rotation.

Then, the routine proceeds to step 623, where a rotation speed SP of the rotor 32 is calculated through smoothing according to the following equation by using the rotation speed calculation value SPa:

$$SP(i) = SP(i-1) + \{SPa - SP(i-1)\}/R$$

where SP(i) is a current rotation speed, SP(i−1) is a preceding rotation speed, and R is a smoothing coefficient.

[Setting of Speed Phase Lead Correction Amount]

Figure 34:
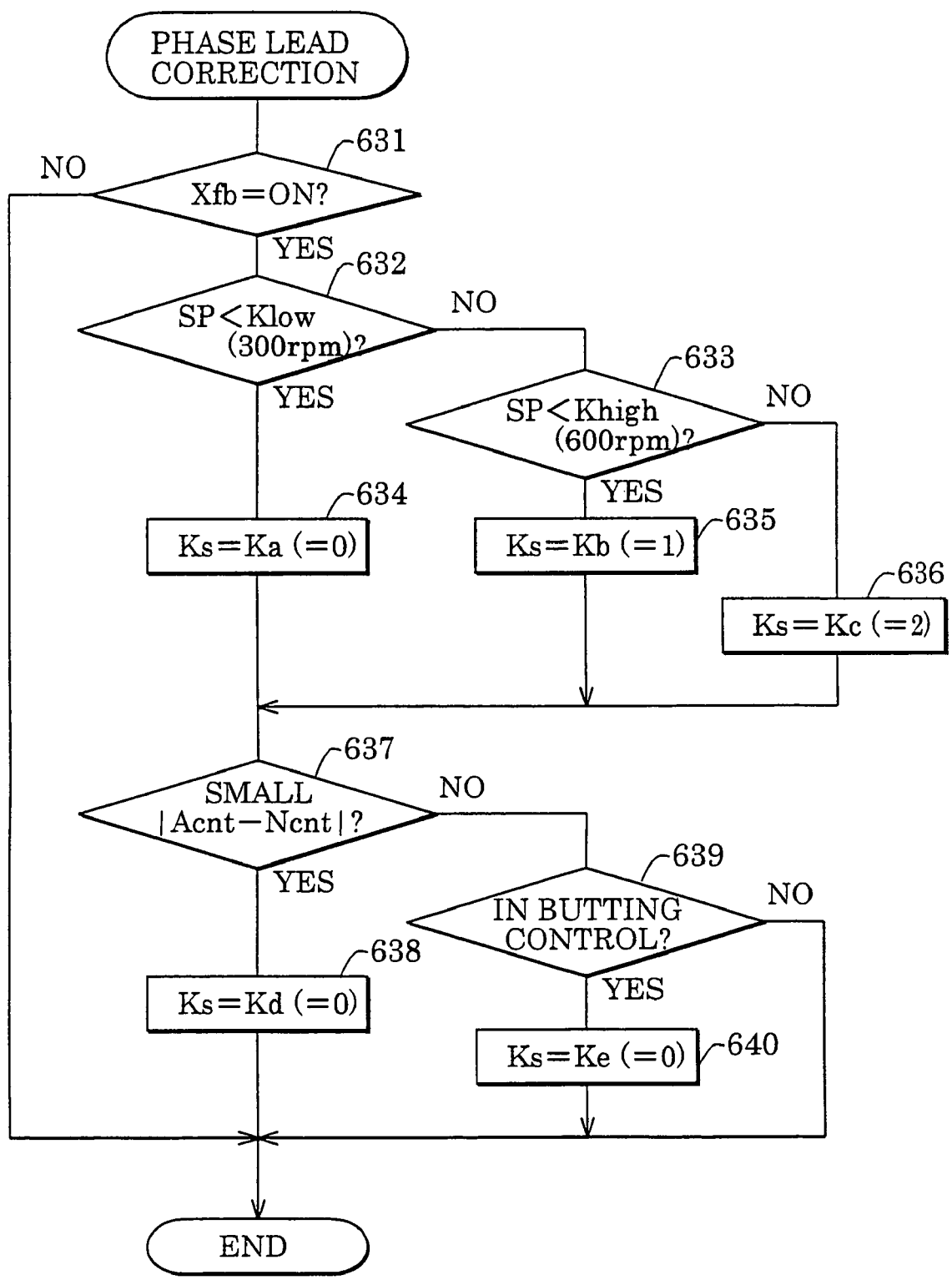
FIG. 34 a flowchart showing a speed phase lead correction amount setting routine.

The speed phase lead correction amount setting routine shown in FIG. 34, which is activated in a prescribed cycle (e.g. every 1 ms), sets a speed phase lead correction amount Ks in accordance with a rotation speed SP of the rotor 32. Upon activation of this routine, at step 631, it is determined whether the feedback permission flag Xfb is "on" (a feedback control is being performed). If the feedback permission flag Xfb is off (feedback control prohibited), no correction of A-phase lead of the current supply phase is necessary and hence this routine is finished without executing the remaining steps.

On the other hand, if the feedback permission flag Xfb is "on" (a feedback control is being performed), steps 632-636 are executed, whereby a speed phase lead correction amount Ks is set in the following manner in accordance with the rotation speed SP of the rotor 32 that was calculated by the rotor rotation speed calculation routine of FIG. 33.

If it is determined at step 632 that the rotation speed SP of the rotor 32 is lower than a prescribed value Klow (e.g., 300 rpm), the routine proceeds to step 634, where the speed phase lead correction amount Ks is set to a minimum value Ka (e.g., 0). If it is determined at step 633 that the rotation speed SP of the rotor 32 is higher than a prescribed value Khigh (e.g., 600 rpm), the routine proceeds to step 636, where the speed phase lead correction amount Ks is set to a maximum value Kc (e.g., 2). If the rotation speed SP of the rotor 32 is between Kiow and Khigh, the routine proceeds to step 635, where the speed phase lead correction amount Ks is set to an intermediate value Kb (e.g., 1). In this manner, the speed phase lead correction amount Ks is set larger as the rotation speed SP of the rotor 32 increases.

Then, the routine proceeds to step 637, where whether the rotation position of the rotor 32 has come close to a target position (i.e., has entered a deceleration range for a stop) is determined on the basis of whether the absolute value of the difference between a target count Acnt and an encoder count Ncnt, |Acnt−Ncnt|, is smaller than a prescribed value.

If |Acnt−Ncnt| is greater than or equal to the prescribed value, the routine proceeds to step 639, where it is determined whether a butting control is being performed (i.e., whether the P-position-side butting control flag Xexp or the non-P-position-side butting control flag Xexnp is "on"). If no butting control is being performed, the speed phase lead correction amount Ks that was set in one of steps 634-636 is used as it is. If a butting control is being performed, the routine proceeds to step 640, where the speed phase lead correction amount Ks is set to a small value Ke (e.g., 0 or −1) to decrease the rotation speed of the rotor 32.

On the other hand, if |Acnt−Ncnt| is smaller than the prescribed value, it is determined that the rotation position of the rotor 32 is in a deceleration range and the routine goes from step 637 to step 638, where the speed phase lead correction amount Ks is set to a small value Kd (e.g., 0 or −1).

Although in this routine the speed phase lead correction amount Ks is switched between three levels in accordance with the rotation speed SP of the rotor 32, it may be switched between two levels or four or more levels.

[Play Amount Learning]

Figure 36:
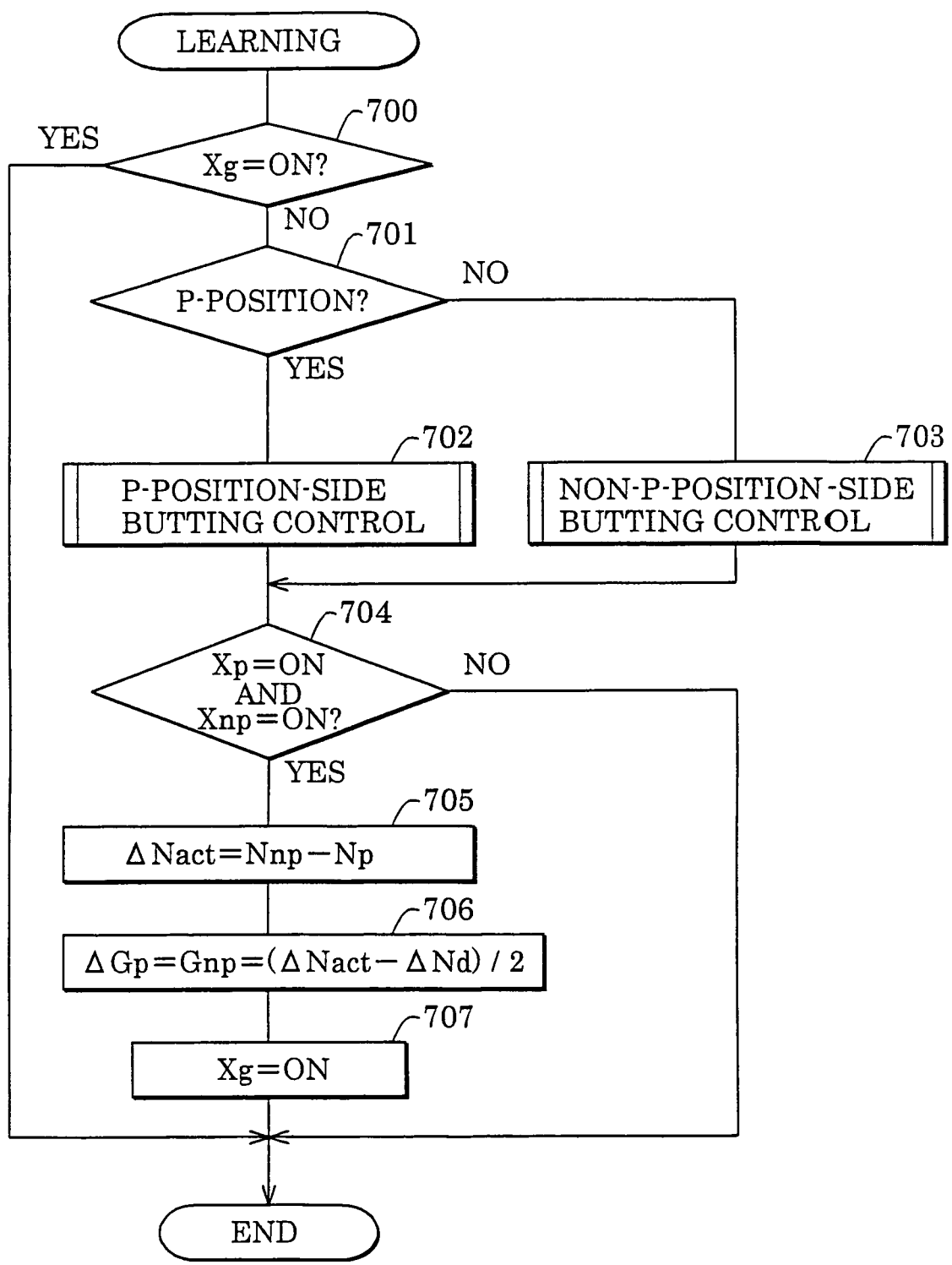
FIG. 36 is a flowchart showing a play amount learning routine.

A play amount learning routine shown in FIG. 36 is executed in a prescribed cycle (e.g., every 8 ms) after the end of an initial drive. Upon activation of this routine, at step 700, it is determined whether a play amount learning completion flag Xg is "on" (i.e., play amount learning completed). If the play amount learning completion flag Xg is "on," this routine is finished without executing the remaining steps. As a result, play amount learning is performed only once during an ignition switch on-period. The play amount learning completion flag Xg is set to "off" by an initialization processing routine (not shown) that is executed immediately after the ignition switch is turned on.

Figure 39:
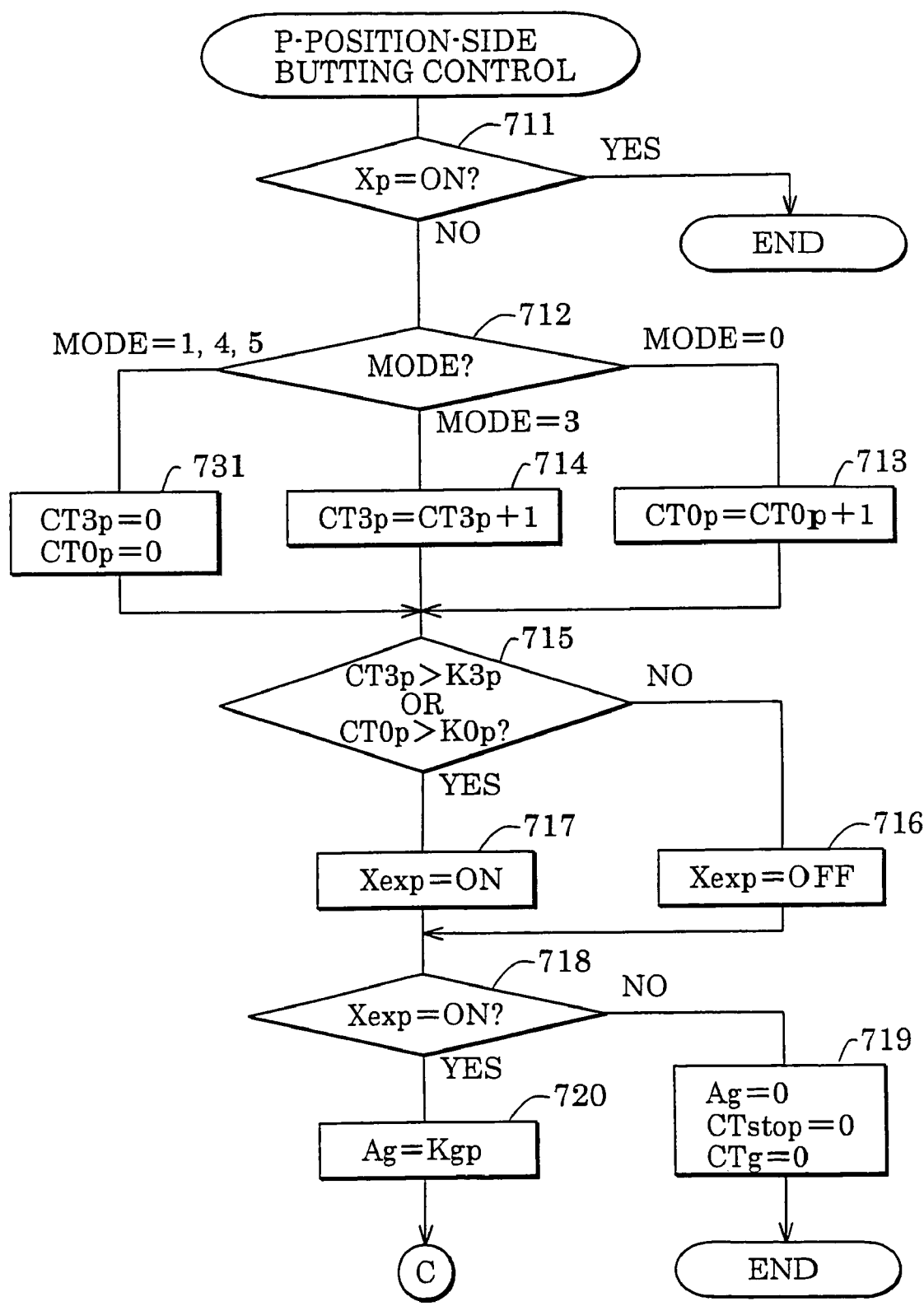
FIGS. 39 and 40 are flowcharts showing a P-position-side butting control routine.
Figure 40:
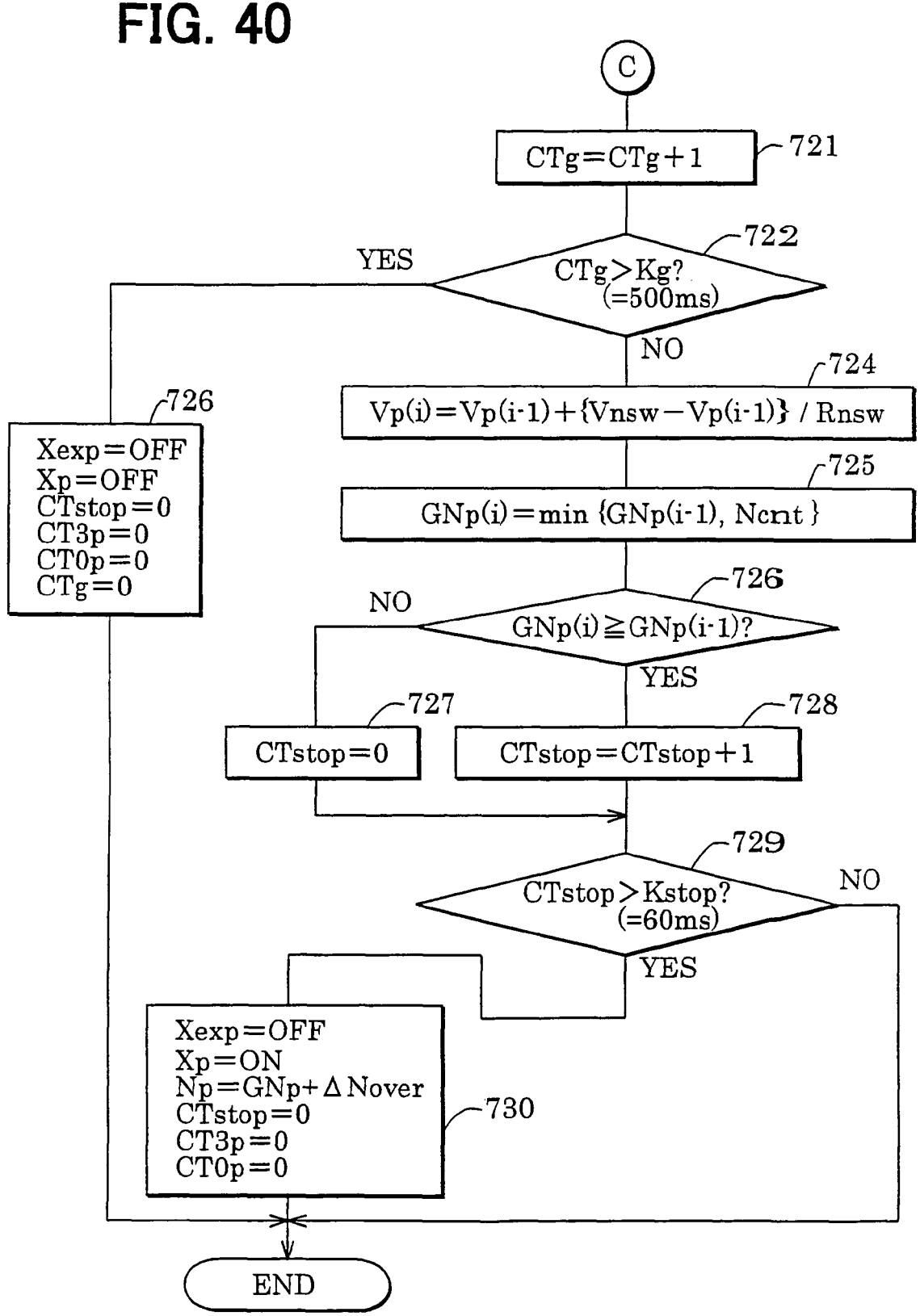
Figure 42:
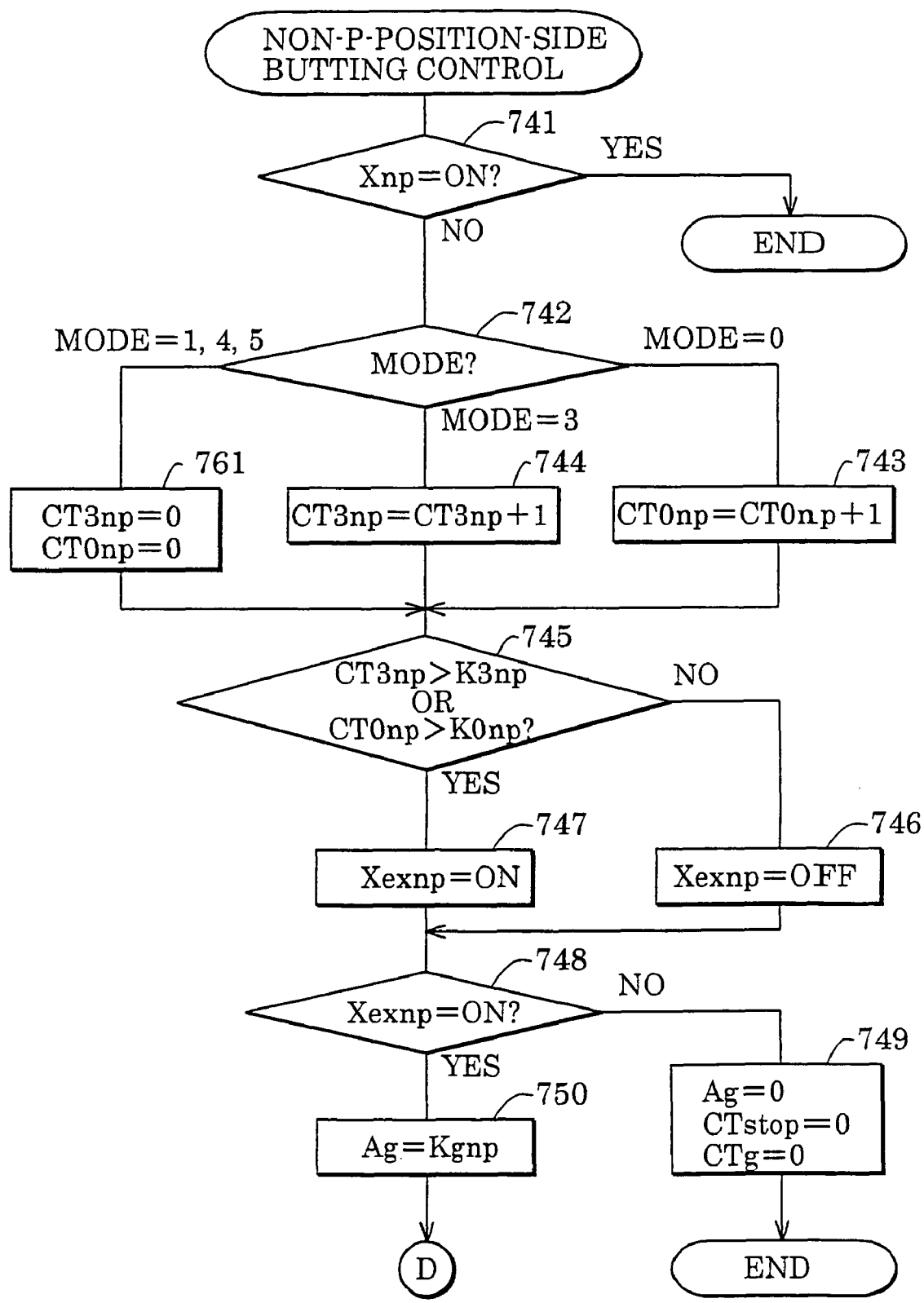
FIGS. 42 and 43 are flowcharts showing a non-P-position-side butting control routine.
Figure 43:
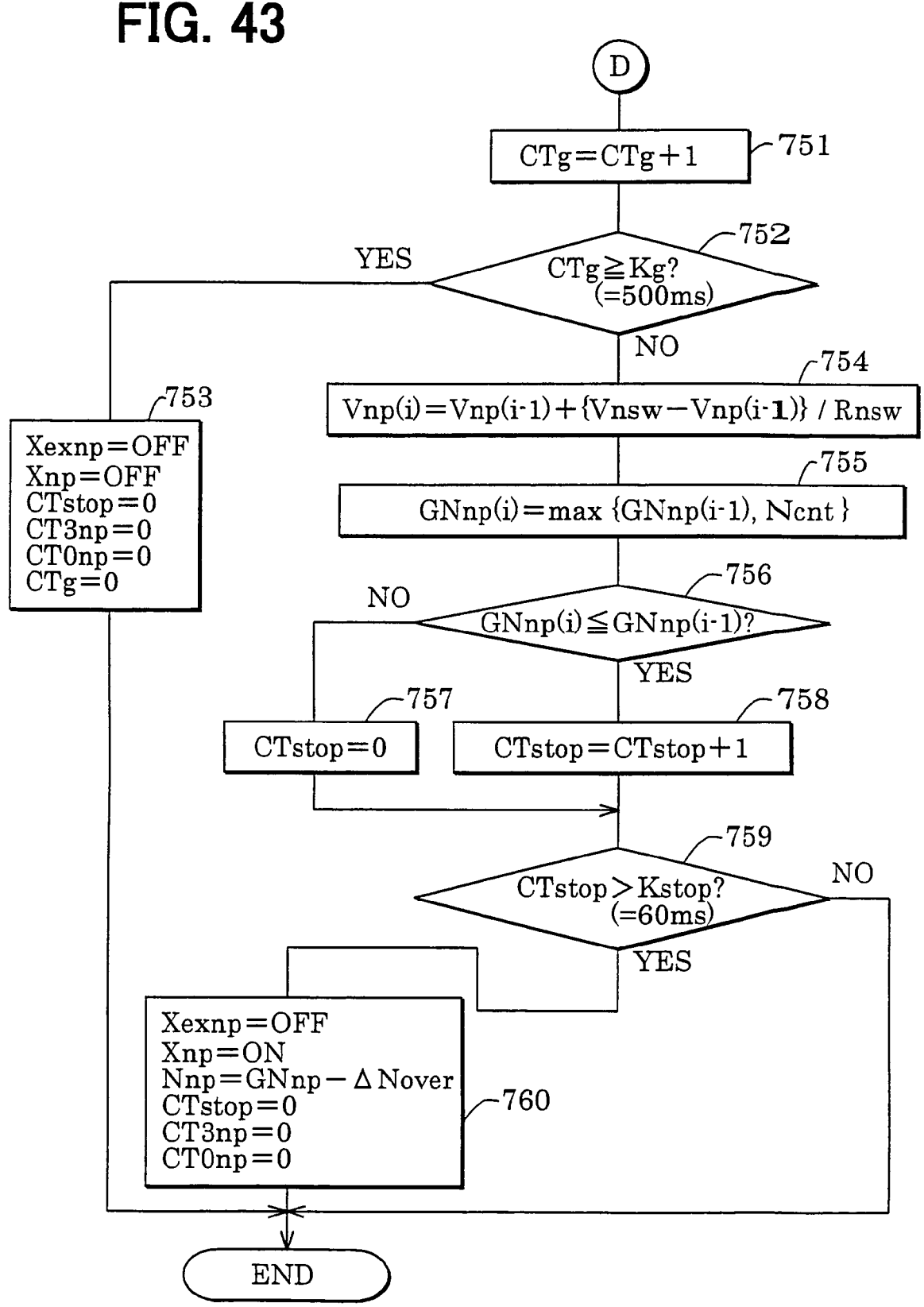

On the other hand, if it is determined at step 700 that the play amount learning completion flag Xg is "off" (i.e., play amount learning has not completed), the routine proceeds to step 701, where it is determined whether the instructed shift position is the P-position. If it is the P-position, the routine proceeds to step 702, where a P-position-side butting control routine of FIGS. 39 and 40 is executed and an encoder count Np at the time of P-position-side butting is stored in the RAM of the ECU 41. On the other hand, if the instructed shift position is the non-P-position, the routine proceeds to step 703, where a non-P-position-side butting control routine of FIGS. 42 and 43 is executed and an encoder count Nnp at the time of non-P-position-side butting is stored in the RAM of the ECU 41.

Then, the routine proceeds to step 704, where it is determined whether both of P-position-side and non-P-position-side butting controls have completed (i.e., both of a P-position-side butting control completion flag Xp and a non-P-position-side butting control completion flag Xnp are "on"). If at least one of P-position-side and non-P-position-side butting controls has not completed yet, this routine is finished without executing the remaining steps.

On the other hand, if both of P-position-side and non-P-position-side butting controls have completed the routine proceeds to step 705, where an actual measurement value ΔNact of the movable range of the rotor 32 (i.e., the movable range of the detent lever 15) from the P-position-side limit position (i.e., the side wall of the P-position holding recess 24) to the non-P-position-side limit position (i.e., the side wall of the non-P-position holding recess 25) is calculated according to the following equation:

$$\Delta Nact = Nnp - Np$$

In the above equation, Nnp is an encoder count at the time of non-P-position-side butting and is set to a value GNnp that is learned by the non-P-position-side butting control routine (described later) of FIGS. 42 and 43. And Np is an encoder count at the time of P-position-side butting and is set to a value GNp that is learned by the P-position-side butting control routine (described later) of FIGS. 39 and 40.

Figures 37, 38:
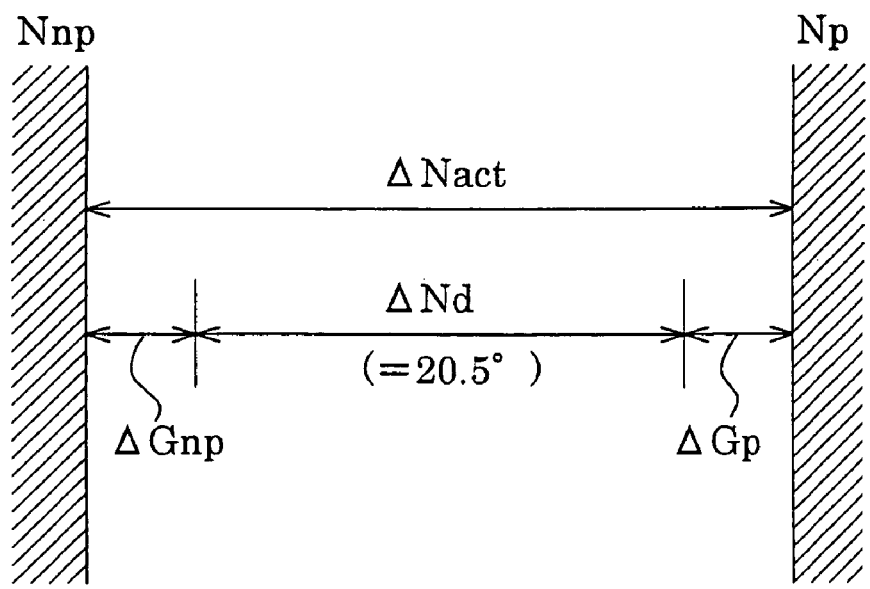
FIG. 37 is an exemplary table to be used for setting a ride correction value ΔVover in accordance with a battery voltage.
FIG. 38 illustrates a relationship between an actual measurement value ΔNact and a design value ΔNd of the movable range of the rotor and play amounts ΔGp and ΔGpn.

After the calculation of the actual measurement value ΔNact of the movable range, the routine proceeds to step 706, where a P-position-side play amount ΔGp and a non-P-position-side play amount ΔGnp are calculated according to the following equation using the actual measurement value ΔNact and a design value ΔNd of the movable range taking a relationship of FIG. 38 into consideration:

$$\Delta Gp = \Delta Gnp = (\Delta Nact - \Delta Nd)/2$$

The design value ΔNd of the movable range may be calculated in advance on the basis of design data or set to a center value of varied movable ranges in manufacture of mass-production devices (i.e., an actual measurement value of the movable range of a standard device).

As shown in FIG. 38, the difference ΔNact−ΔNd between the actual measurement value ΔNact and the design value ΔNd corresponds to the sum ΔGp+ΔGnp of the P-position-side play amount ΔGp and the non-P-position-side play amount ΔGnp. Since the P-position-side play amount ΔGp and the non-P-position-side play amount ΔGnp generally coincide with each other, each of them can be calculated according to the above equation.

After the calculation of the play amounts ΔGp and ΔGnp, the routine proceeds to step 707, where the play amount learning completion flag Xg is set to "on" that means completion of play amount learning. Then, this routine is finished.

The actual measurement value ΔNact and the play amounts ΔGp and ΔGnp that have been calculated at steps 705 and 706 are stored, with updating, in a nonvolatile memory (not shown) such as an SRAM of the ECU 41 and the stored values are held even after turning-off of the ignition switch. After the ignition switch is turned on next time, a target count Acnt is set by a target count setting routine (described later) shown in FIGS. 45 and 46 by using the actual measurement value ΔNact of the movable range and the play amounts ΔGp and ΔGnp that are stored in the nonvolatile memory of the ECU 41.

[P-Position-Side Butting Control]

The P-position-side butting control routine shown in FIGS. 39 and 40 is a subroutine that is executed at step 702 of the play amount learning routine of FIG. 36 when the instructed shift position is the P-position. Upon activation of this routine, at step 711, it is determined whether the P-position-side butting completion flag Xp is "on" (i.e., a P-position-side butting control has finished). If a P-position-side butting control has already finished, this routine is finished without executing the remaining steps. As a result, a P-position-side butting control is performed only once during an ignition switch on-period.

On the other hand, if it is determined at step 711 that the P-position-side butting completion flag Xp is "off" (a P-position-side butting control has not finished), the routine proceeds to step 712, where it is determined whether the control mode determination value "mode" is equal to 0 or 3. The control mode determination value "mode" being "0" means "current supply off" (standby), and the control mode determination value "mode" being "3" means "target position stopping and holding process."

In this routine, a P-position-side butting control is performed when the control mode determination value "mode" is equal to 0 or 3 so that it is performed in a state that the rotor 32 is stopped at the P-position.

If the control mode determination value "mode" is equal to "0" (current supply off), the routine proceeds to step 713, where the count CT0p of a mode-0 time counter that counts the time during which the value "mode" is kept at "0" with the P-position is incremented. If the control mode determination value "mode" is equal to "3" (target position stopping and holding process), the routine proceeds to step 714, where the count CT3p of a mode-3 time counter that counts the time during which the value "mode" is kept at "3" with the P-position is incremented. The above two time counters are used for waiting until vibration of the rotor 32 settles and the rotor 32 is stopped at the P-position.

If the control mode determination value "mode" is equal to "1" (ordinary drive), "4" (reversing position stopping and holding process), or "5" (open-loop control), the rotor 32 is not stopped at the P-position and hence the routine proceeds to step 731, where the counts CT0p and CT3p of the respective time counters are cleared.

Then, at step 715, it is determined whether the count CT0p of the mode-0 time counter has exceeded a stop determination value KOp or the count CT3p of the mode-3 time counter has exceeded a stop determination value K3p. The stop determination value KOp corresponds to a time that is necessary for settlement of vibration of the rotor 32 in a state that the shift position is the P-position and the control mode determination value "mode" is equal to "0" (current supply off). The stop determination value K3p corresponds to a time that is necessary for settlement of vibration of the rotor 32 in a state that the shift position is the P-position and the control mode determination value "mode" is equal to "3" (target position stopping and holding process).

If the determination result at step 715 is "no," it is determined that vibration of the rotor 32 has not settled yet. The routine proceeds to step 716, where the P-position-side butting control flag Xexp is set to "off." In this c ase, a P-position-side butting control is not started.

On the other hand, if the determination result at step 715 is "yes," it is determined that vibration of the rotor 32 has settled at the P-position. The routine proceeds to step 717, where the P-position-side butting control flag Xexp is set to "on."

Then, the routine proceeds to step 718, where it is determined whether the P-position-side butting control flag Xexp is "on." If the flag Xexp is "off," the routine proceeds to step 719, where all of a butting target count Ag, the count CTstop of a stop time counter, and the count CTg of a butting control time counter are set to "0." Then this routine is finished.

On the other hand, if the P-position-side butting control flag Xexp is "on," the routine proceeds to step 720, where the butting target count Ag is set to a prescribed value Kgp. The butting target count Ag (Kgp) is set to such a value that a P-position-side butting control can cause the engaging portion 23a of the detent spring 23 to reliably butt against the side wall of the P-position holding recess 24 of the detent lever 15.

Figure 41:
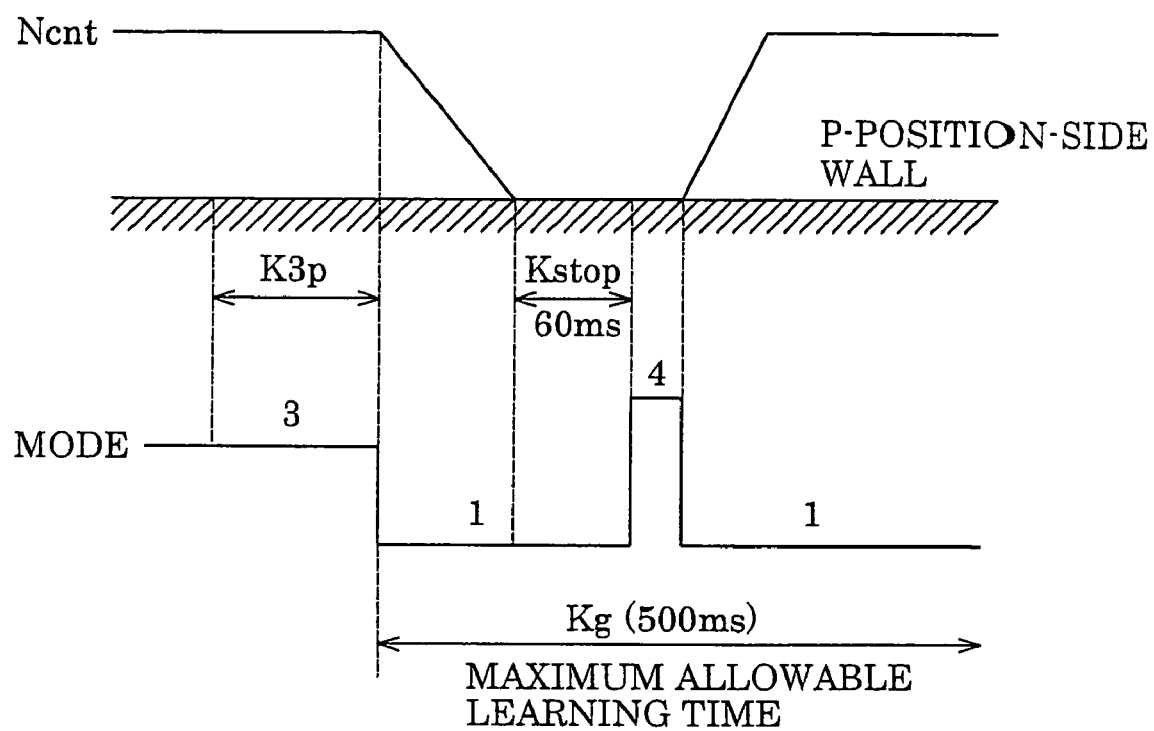
FIG. 41 is a time chart showing an exemplary P-position-side butting control.

If the P-position-side butting control flag Xexp is "on," the target count Acnt is set to the target count Ag (i.e., Kgp) by a target count setting routine (described later) shown in FIG. 45. Therefore, a P-position-side butting control is performed as shown in FIG. 41, whereby the engaging portion 23a of the detent spring 23 butts against the side wall of the P-position holding recess 24 of the detent lever 15.

During the P-position-side butting control, the count CTg of the butting control time counter is incremented at step 721 in FIG. 40 to measure the execution time of the P-position-side butting control. At the next step 722, it is determined whether the execution time CTg of the P-position-side butting control has exceeded a maximum allowable learning time Kg (e.g., 500 ms). If the P-position-side butting control is performed normally, the engaging portion 23a of the detent spring 23 should butt against the side wall of the P-position holding recess 24 of the detent lever 15 in a time that is shorter than the maximum allowable learning time Kg, whereupon learning of an encoder count Np at the time of P-position-side butting (i.e., the P-position-side butting control) is finished.

Therefore, if the P-position-side butting control is not finished even after a lapse of the maximum allowable learning time Kg, some system abnormality such as a failure in the SR motor 12 or the encoder 46 should have happened. Therefore, in such a case, to finish the P-position-side butting control forcibly, the routine proceeds to step 723, where the following settings are made: the P-position-side butting control flag Xexp=off, the P-position-side butting completion flag Xp=off, the stop time count CTstop=0, the mode-3 time count CT3$p$=0, the mode-0 time count CT0$p$=0, and the butting control time count CTg=0. Then, this routine is finished.

On the other hand, if the execution time CTg of the P-position-side butting control has not exceeded the maximum allowable learning time Kg, the routine proceeds to step 724, where a learned value Vp of the P-position output of the output shaft sensor 14 is updated according to the following equation:

$$Vp(i)=Vp(i-1)+\{Vnsw-Vp(i-1)\}/Rnsw$$

where Vp (i) is a current P-position output learned value, Vp(i−1) is a preceding P-position output learned value, Vnsw is a current output of the output shaft sensor 14, and Rnsw is a smoothing coefficient.

At the next step 725, a learned value of the encoder count at the time of P-position-side butting (hereinafter referred to as "P-position-side butting learned value") GNp is updated according to the following equation:

$$GNp(i)=\min\{GNp(i-1),Ncnt\}$$

In the above equation, GNp(i) is a current P-position-side butting learned value, GNp(i−1) is a preceding P-position-side butting learned value, and Ncnt is a current encoder count. The function "min" is a function of choosing a smaller one of GNp(i−1) and Ncnt. The encoder count Ncnt is set to a value that has been corrected by using an initial positional deviation learned value Gcnt that was learned by the initial drive routine of FIGS. 8 and 9.

Then, the routine proceeds to step 726, where whether a state that the engaging portion 23a of the detent spring 23 is in contact with the side wall of the P-position holding recess 24 of the detent lever 15 has been established is determined on the basis of whether the current P-position-side butting learned value GNp(i) is the same as the preceding P-position-side butting learned value GNp(i−1).

As shown in FIG. 41, until a state that the engaging portion 23a of the detent spring 23 is in contact with the side wall of the P-position holding recess 24 of the detent lever 15 is established, the rotor 32 rotates and the encoder count Ncnt decreases gradually and hence the current P-position-side butting learned value GNp(i) should be smaller than the preceding P-position-side butting learned value GNp(i−1). Once a state that the engaging portion 23a of the detent spring 23 is in contact with the side wall of the P-position holding recess 24 of the detent lever 15 is established afterwards, the rotor 32 stops rotating and the encoder count Ncnt oscillates or no longer varies. Since the learned value GNp(i) is no longer updated, the current P-position-side butting learned value GNp(i) should be greater than or equal to the preceding P-position-side butting learned value GNp(i−1).

If the determination result at step 726 in FIG. 40 is "no," a state that the engaging portion 23a of the detent spring 23 is in contact with the side wall of the P-position holding recess 24 of the detent lever 15 is not established and hence the routine proceeds to step 727, where the count CTstop of the stop time counter is reset.

On the other hand, if the determination result at step 726 in FIG. 40 is "yes," it is determined that the engaging portion 23a of the detent spring 23 may have butted against the side wall of the P-position holding recess 24 of the detent lever 15 and the routine proceeds to step 728, where the count CTstop of the stop time counter that counts the time of a contact state is incremented.

Then, the routine proceeds to step 729. The P-position-side butting control is continued until the count CTstop of the stop time counter exceeds a prescribed time Kstop (e.g., 60 ms) at step 729. At an instant when the state that the determination result at step 726 is "yes" has continued for the prescribed time Kstop or more, it is determined that occurrence of a contact state has been confirmed and the routine proceeds to step 730. At step 730, the following settings are made to finish the P-position-side butting control: the P-position-side butting control flag Xexp=off, the P-position-side butting completion flag Xp=on, the P-position-side butting encoder count Np=GNp+ΔNover (ΔNover is a ride correction value), the stop time count CTstop=0, the mode-3 time count CT3$p$=0, and the mode-0 time count CT0$p$=0. Then, this routine is finished.

The ride correction value ΔNover is an angle by which the engaging portion 23a of the detent spring 23 slightly rides the side wall of the holding recess 24 or 25 of the detent lever 15 in a state that the engaging portion 23a is in contact with the side wall during a butting control. The ride correction value ΔNover is set in accordance with a battery voltage as a power source voltage for the SR motor 12 by using the table of FIG. 37.

The angle (i.e., ride correction value ΔNover) by which the engaging portion 23a of the detent spring 23 rides the side wall of the holding recess 24 or 25 of the detent lever 15 during a butting control increases as the torque of the SR motor 12 increases. In general, the torque of the SR motor 12 varies with the power source voltage therefor (i.e., battery voltage) and hence a correlation exists between the power source voltage and the torque of the SR motor 12. The power source voltage can be used as replacement information for the torque of the SR motor 12. Therefore, an actual measurement value of the movable range of the rotor 32 can be determined accurately by calculating an angle (i.e., a ride correction value ΔNover) by which the engaging portion 23a of the detent spring 23 rides the side wall of the holding recess 24 or 25 of the detent lever 15 during a butting control on the basis of the power source voltage (i.e., battery voltage) as replacement information for the torque of the SR motor 12 and correcting an actual measurement value of the movable range of the rotor 32 by the ride correction value ΔNover.

If the side wall of each of the holding recesses 24 and 25 of the detent lever 15 is formed so as not to be rideed by the engaging portion 23a of the detent spring 23, it is not necessary to use the ride correction value ΔNover and hence a relationship ΔNact=Nnp−Np holds.

[Non-P-Position-Side Butting Control]

The non-P-position-side butting control routine shown in FIGS. 42 and 43 is a subroutine that is executed at step 703 of the play amount learning routine of FIG. 36 when the instructed shift position is the non-P-position. Upon activation of this routine, at step 741, it is determined whether the non-P-position-side butting completion flag Xnp is "on" (i.e., a non-P-position-side butting control has finished). If a P-position-side butting control has already finished, this routine is finished without executing the remaining steps. As a result, a non-P-position-side butting control is performed only once during an ignition switch on-period.

On the other hand, if it is determined at step 741 that the non-P-position-side butting completion flag Xnp is "off" (a non-P-position-side butting control has not finished), the routine proceeds to step 742, where it is determined whether the control mode determination value "mode" is equal to 0 (current supply off) or 3 (target position stopping and holding process). In this routine, a non-P-position-side butting control is performed when the control mode determination value "mode" is equal to 0 or 3 so that it is performed in a state that the rotor 32 is stopped at the non-P-position.

If the control mode determination value "mode" is equal to "0" (current supply off), the routine proceeds to step 743, where the count CT0np of a mode-0 time counter that counts the time during which the value "mode" is kept at "0" with the non-P-position is incremented. If the control mode determination value "mode" is equal to "3" (target position stopping and holding process), the routine proceeds to step 744, where the count CT3np of a mode-3 time counter that counts the time during which the value "mode" is kept at "3" with the non-P-position is incremented. The above two time counters are used for waiting until vibration of the rotor 32 settles and the rotor 32 is stopped at the P-position.

If the control mode determination value "mode" is equal to "1" (ordinary drive), "4" (reversing position stopping and holding process), or "5" (open-loop control), the rotor 32 is not stopped at the non-P-position and hence the routine proceeds to step 761, where the counts CT0np and CT3np of the respective time counters are cleared.

Then, at step 745, it is determined whether the count CT0np of the mode-0 time counter has exceeded a stop determination value K0np or the count CT3np of the mode-3 time counter has exceeded a stop determination value K3np. The stop determination value K0np corresponds to a time that is necessary for settlement of vibration of the rotor 32 in a state that the shift position is the non-P-position and the control mode determination value "mode" is equal to "0" (current supply off). The stop determination value K3np corresponds to a time that is necessary for settlement of vibration of the rotor 32 in a state that the shift position is the non-P-position and the control mode determination value "mode" is equal to "3" (target position stopping and holding process).

If the determination result at step 745 is "no," it is determined that vibration of the rotor 32 has not settled yet and the routine proceeds to step 746, where the non-P-position-side butting control flag Xexnp is set to "off." In this case, a non-P-position-side butting control is not started.

On the other hand, if the determination result at step 745 is "yes," it is determined that vibration of the rotor 32 has settled at the non-P-position and the routine proceeds to step 747, where the non-P-position-side butting control flag Xexnp is set to "on."

Then, the routine proceeds to step 748, where it is determined whether the non-P-position-side butting control flag Xexnp is "on." If the flag Xexnp is "off," the routine proceeds to step 749, where all of the butting target count Ag, the count CTstop of the stop time counter, and the count CTg of the butting control time counter are set to "0." Then this routine is finished.

On the other hand, if the non-P-position-side butting control flag Xexnp is "on," the routine proceeds to step 750, where the butting target count Ag is set to a prescribed value Kgnp. The butting target count Ag (Kgnp) is set to such a value that a non-P-position-side butting control can cause the engaging portion 23a of the detent spring 23 to reliably butt against the side wall of the non-P-position holding recess 25 of the detent lever 15.

If the non-P-position-side butting control flag Xexnp is "on," the target count Acnt is set to the target count Ag (i.e., Kgnp) by a target count setting routine (described later) shown in FIG. 45. Therefore, a non-P-position-side butting control is performed, whereby the engaging portion 23a of the detent spring 23 butts against the side wall of the non-P-position holding recess 25 of the detent lever 15.

During the non-P-position-side butting control, the count CTg of the butting control time counter is incremented at step 751 in FIG. 43 to measure the execution time of the non-P-position-side butting control. At the next step 752, it is determined whether the execution time CTg of the non-P-position-side butting control has exceeded the maximum allowable learning time Kg (e.g., 500 ms). If the non-P-position-side butting control is performed normally, the engaging portion 23a of the detent spring 23 should butt against the side wall of the P-position holding recess 24 of the detent lever 15 in a time that is shorter than the maximum allowable learning time Kg, whereupon learning of an encoder count Nnp at the time of non-P-position-side butting (i.e., the non-P-position-side butting control) is finished.

Therefore, if the non-P-position-side butting control is not finished even after a lapse of the maximum allowable learning time Kg, some system abnormality such as a failure in the SR motor 12 or the encoder 46 should have happened. Therefore, in such a case, to finish the non-P-position-side butting control forcibly, the routine proceeds to step 753, where the following settings are made: the non-P-position-side butting control flag Xexnp=off, the non-P-position-side butting completion flag Xnp=off, the stop time count CTstop=0, the mode-3 time count CT3$np$=0, the mode-0 time count CT0$np$=0, and the butting control time count CTg=0. Then, this routine is finished.

On the other hand, if the execution time CTg of the non-P-position-side butting control has not exceeded the maximum allowable learning time Kg, the routine proceeds to step 754, where a learned value Vnp of the non-P-position output of the output shaft sensor 14 is updated according to the following equation:

$$Vnp(i)=Vnp(i-1)+\{Vnsw-Vnp(i-1)\}/Rnsw$$

where Vnp(i) is a current non-P-position output learned value, Vnp(i−1) is a preceding non-P-position output learned value, Vnsw is a current output of the output shaft sensor 14, and Rnsw is a smoothing coefficient.

At the next step 755, a learned value of the encoder count at the time of non-P-position-side butting (hereinafter referred to as "non-P-position-side butting learned value") GNnp is updated according to the following equation:

$$GNnp(i)=\max\{GNnp(i-1),Ncnt\}$$

In the above equation, GNnp(i) is a current non-P-position-side butting learned value, GNnp(i−1) is a preceding non-P-position-side butting learned value, and Ncnt is a current encoder count. The function "max" is a function of choosing a larger one of GNnp(i−1) and Ncnt. The encoder count Ncnt is set to a value that has been corrected by using an initial positional deviation learned value Gcnt that was learned by the initial drive routine of FIGS. 8 and 9.

Then, the routine proceeds to step 756, where whether a state that the engaging portion 23*a* of the detent spring 23 is in contact with the side wall of the non-P-posit ion holding recess 25 of the detent lever 15 has been established is determined on the basis of whether the current non-P-position-side butting learned value GNnp(i) is the same as the preceding non-P-position-side butting learned value GNnp(i−1).

Until a state that the engaging portion 23*a* of the detent spring 23 is in contact with the side wall of the non-P-position holding recess 25 of the detent lever 15 is established, the rotor 32 rotates and the encoder count Ncnt increases gradually and hence the current non-P-position-side butting learned value GNnp(i) should be greater than the preceding non-P-position-side butting learned value GNnp(i−1). Once a state that the engaging portion 23*a* of the detent spring 23 is in contact with the side wall of the non-P-position holding recess 25 of the detent lever 15 is established afterwards, the rotor 32 stops rotating and the encoder count Ncnt oscillates or no longer varies. Since the learned value GNnp(i) is no longer updated, the current non-P-position-side butting learned value GNnp(i) should be greater than or equal to the preceding non-P-position-side butting learned value GNnp(i−1).

If the determination result at step 756 in FIG. 43 is "no," a state that the engaging portion 23*a* of the detent spring 23 is in contact with the side wall of the non-P-position holding recess 25 of the detent lever 15 is not established and hence the routine proceeds to step 757, where the count CTstop of the stop time counter is reset.

On the other hand, if the determination result at step 756 is "yes," it is determined that the engaging portion 23*a* of the detent spring 23 may have butted against the side wall of the non-P-position holding recess 25 of the detent lever 15 and the routine proceeds to step 758, where the count CTstop of the stop time counter that counts the time of a contact state is incremented.

Then, the routine proceeds to step 759. The non-P-position-side butting control is continued until the count CTstop of the stop time counter exceeds the prescribed time Kstop (e.g., 60 ms) at step 759. At an instant when the state that the determination result at step 756 is "yes" has continued for the prescribed time Kstop or more, it is determined that occurrence of a contact state has been confirmed and the routine proceeds to step 760. At step 760, the following settings are made to finish the non-P-position-side butting control: the non-P-position-side butting control flag Xexnp=off, the non-P-position-side butting completion flag Xnp=on, the non-P-position-side butting encoder count Nnp=GNnp−ΔNover (ΔNover is the ride correction value), the stop time count CTstop=0, the mode-3 time count CT3$np$=0, and the mode-0 time count CT0$np$=0. Then, this routine is finished.

Figure 44:
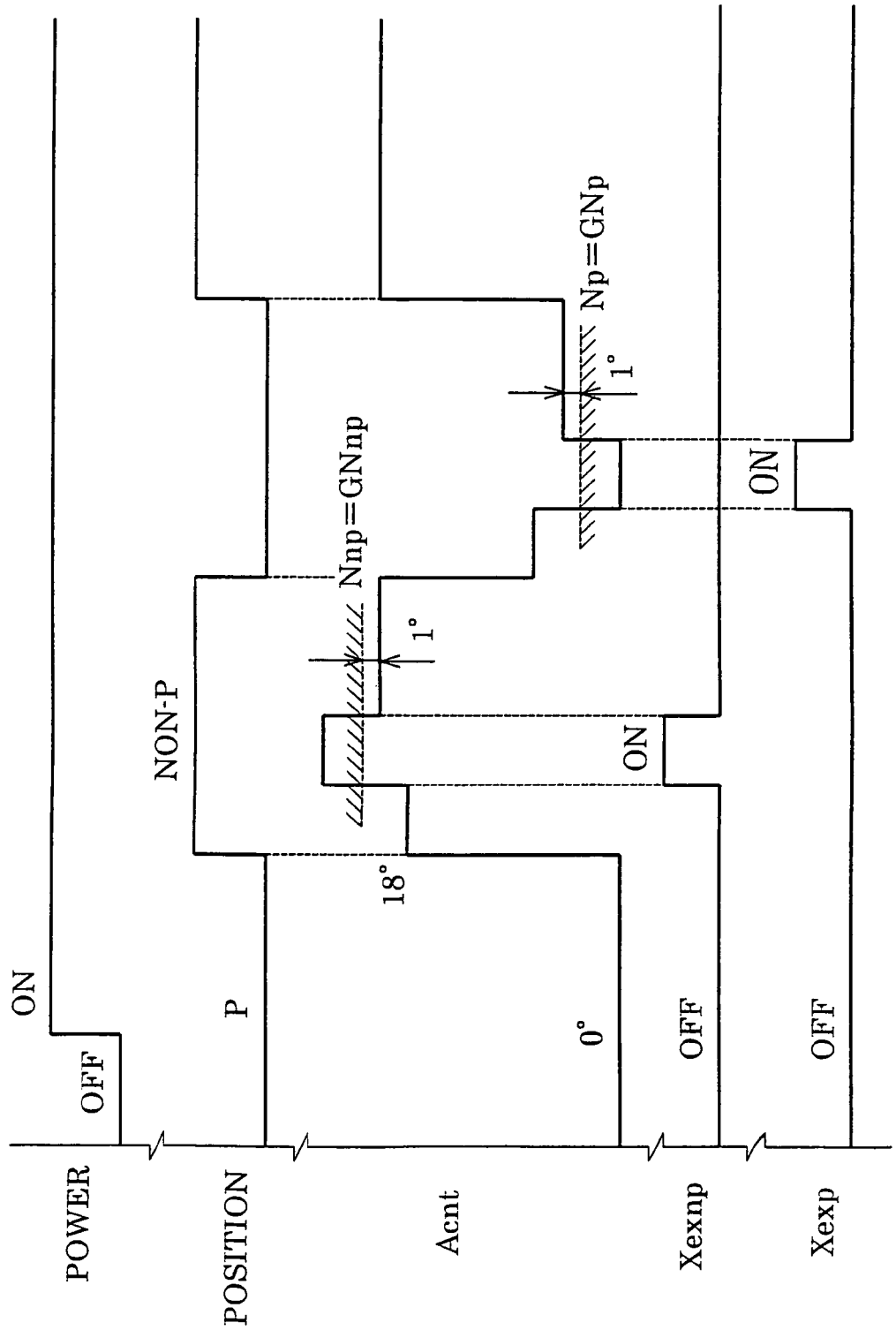
FIG. 44 is a time chart illustrating exemplary execution timing of a P-position-side butting control and a non-P-position-side butting control.

FIG. 44 is a time chart showing exemplary execution timing of a P-position-side butting control and a non-P-position-side butting control. In the example of FIG. 44, when the instructed shift position is switched from the P-position to the non-P-position some time after an on-manipulation on the ignition switch (i.e., application of power), the target count Acnt is set to a temporary target count (e.g., 18°) for the non-P-position. The temporary target count (e.g., 18°) corresponds to a rotation angle at which the engaging portion 23*a* of the detent spring 23 has reliably gone over the projection between the holding recesses 24 and 25 of the detent lever 15.

Therefore, after being rotated to a position corresponding to the temporary target count (e.g., 18°) by a feedback control, the rotor 32 is rotated to the non-P-position target position (i.e., the bottom of the non-P-position holding recess 25) by utilizing momentum of the engaging portion 23*a* of the detent spring 23 being dropped toward the bottom along the inclined side wall of the non-P-position holding recess 25 of the detent lever 15 by elastic force of the detent spring 23.

Then, when the non-P-position-side butting control flag Xexnp is set to "on," the target count Acnt is set to a non-P-position-side butting target count Ag (i.e., Kgnp) and a non-P-position-side butting control is started. An encoder count Nnp (i.e., GNnp) is learned when the engaging portion 23*a* of the detent spring 23 butts against the side wall of the non-P-position holding recess 25 of the detent lever 15. After the learning of the encoder count Nnp, the non-P-position-side butting control flag Xexnp is set to "off" and the non-P-position-side butting control is finished.

Then, when the instructed shift position is switched from the non-P-position to the P-position, the target count Acnt is set to a temporary target count (e.g., 0°) for the P-position. After being rotated to a position corresponding to the temporary target count (e.g., 0°) by a feedback control, the rotor 32 is rotated to the P-position target position (i.e., the bottom of the P-position holding recess 24) by utilizing momentum of the engaging portion 23*a* of the detent spring 23 being dropped toward the bottom along the inclined side wall of the P-position holding recess 24 of the detent lever 15 by elastic force of the detent spring 23.

Then, when the P-position-side butting control flag Xexp is set to "on," the target count Acnt is set to a non-P-position-side butting target count Ag (i.e., Kgp) and a P-position-side butting control is started. An encoder count Np (i.e., GNp) is learned when the engaging portion 23*a* of the detent spring 23 butts against the side wall of the P-position holding recess 24 of the detent lever 15. After the learning of the encoder count Np, the P-position-side butting control flag Xexp is set to "off" and the P-position-side butting control is finished.

[Target Count Setting]

Figure 45:
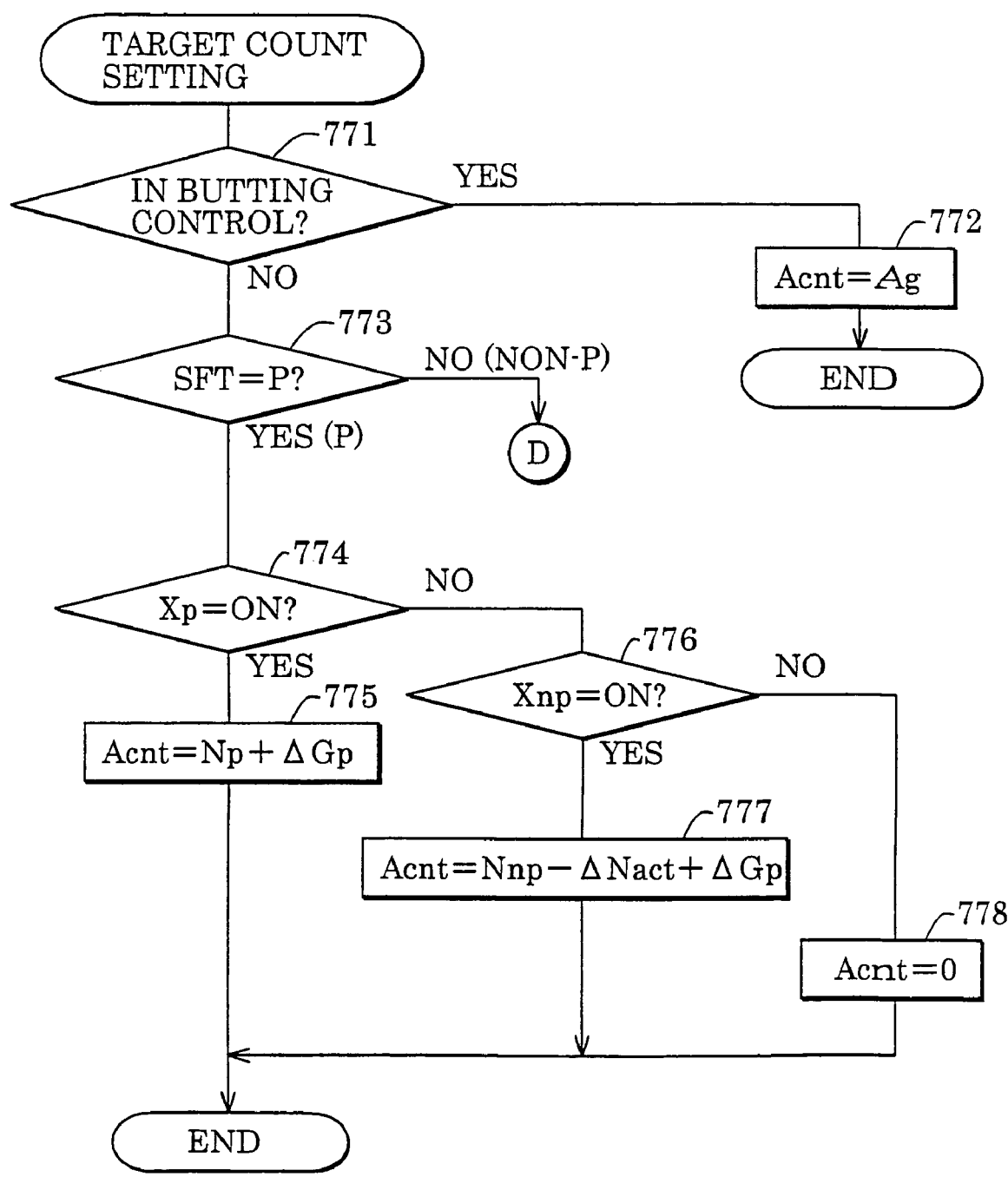
FIGS. 45 and 46 are flowcharts showing a target count setting routine.
Figure 46:
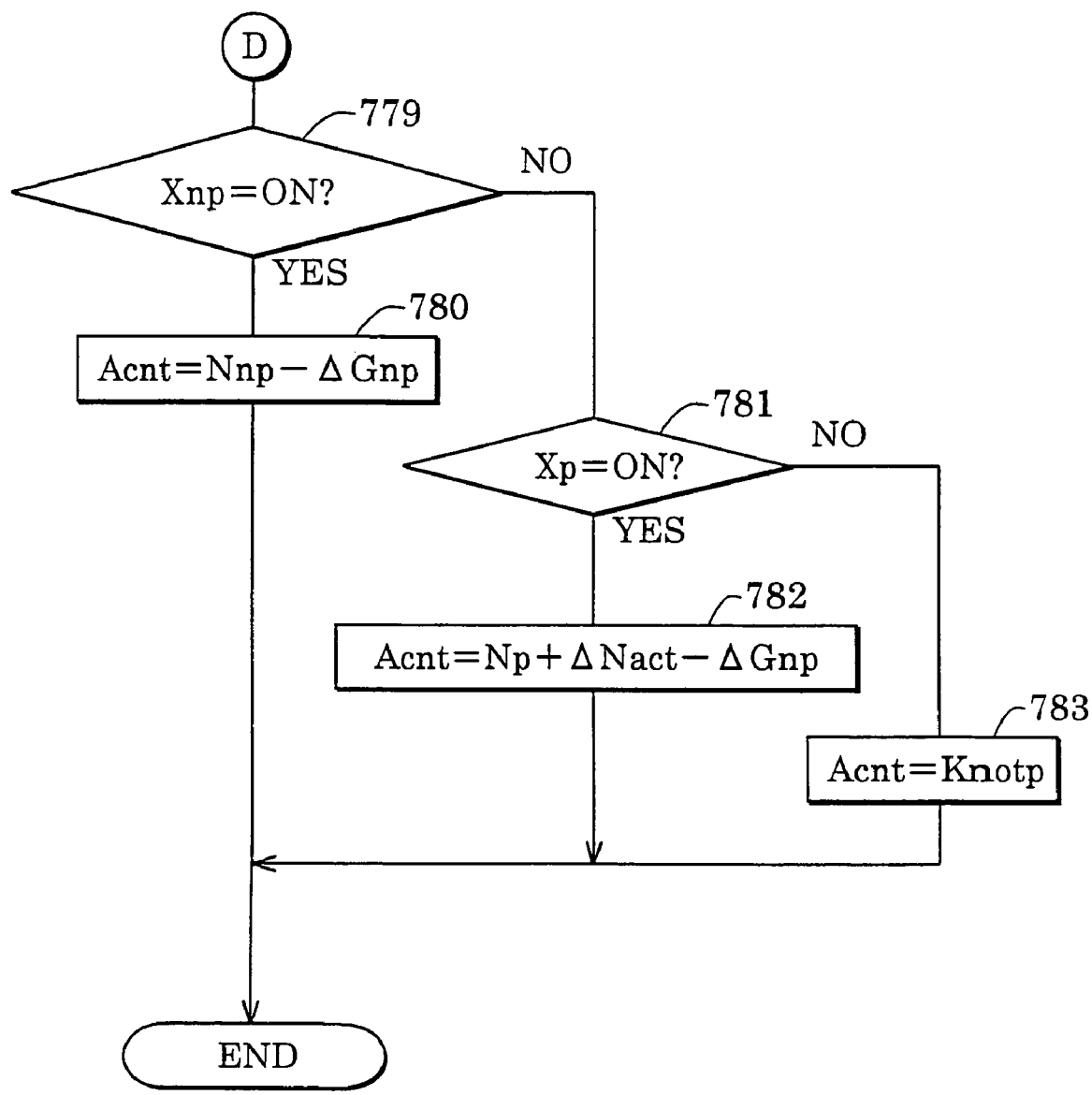

The target count setting routine shown in FIGS. 45 and 46 is executed in a prescribed cycle (e.g., every 8 ms) after the end of an initial drive. Upon activation of this routine, at step 771, it is determined whether a butting control is being performed (i.e., whether the P-position-side butting control flag Xexp or the non-P-position-side butting control flag Xexnp is "on"). If a butting control is being performed, the routine proceeds to step 772, where the target count Acnt is set to a butting target count Ag. The butting target count Ag is set at step 720 in FIG. 39 or step 750 in FIG. 42.

On the other hand, if no butting control is being performed, the routine proceeds to step 773, where it is determined whether an instructed shift position sft that is stored in the RAM of the ECU 41 is the P-position. If it is the P-position, the routine proceeds to step 774, where it is determined whether a P-position-side butting control has completed (i.e., whether the P-position-side butting completion flag Xp is "on"). If a P-position-side butting control has completed, the routine proceeds to step 775, a P-position target count Acnt is calculated according to the following equation:

$$Acnt=Np+\Delta Gp$$

In the above equation, Np is an encoder count at the time of P-position-side butting and is a value GNp that was learned by the P-position-side butting control routine of FIGS. 39 and 40. And $\Delta Gp$ is a learned value of the P-position-side play amount, and is a preceding value that is stored in the nonvolatile memory of the ECU 41 until it is updated by a current (i.e., newly calculated) learned value $\Delta Gp$ of the play amount at step 706 of the play amount learning routine of FIG. 36.

On the other hand, if a P-position-side butting control has not completed, the determination result at step 774 is "no" and hence the routine proceeds to step 776, where it is determined whether a non-P-position-side butting control has completed (i.e., whether the non-P-position-side butting completion flag Xnp is "on"). If a non-P-position-side butting control has completed, the routine proceeds to step 777, where a P-position target count Acnt is calculated according to the following equation:

$$Acnt=Nnp-\Delta Nact+\Delta Gp$$

In the above equation, Nnp is an encoder count at the time of non-P-position-side butting and is a value GNnp that was learned by the non-P-position-side butting control routine of FIGS. 42 and 43. And $\Delta Nact$ is an actual measurement value of the movable range of the rotor 32, and is a preceding value that is stored in the nonvolatile memory of the ECU 41 until it is updated by a current (i.e., newly calculated) actual measurement value $\Delta Nact$ of the movable range at step 705 of the play amount learning routine of FIG. 36.

If neither a P-position-side butting control nor a non-P-position-side one has completed (i.e., both of the P-position-side and non-P-position-side butting completion flags Xp and Xnp are "off"), the target count Acnt cannot be corrected by using a play amount $\Delta Gp$ or $\Delta Gnp$ because neither an encoder count Np at the time of P-position side butting nor an encoder count Nnp at the time of non-P-position side butting has been learned. Therefore, in this case, the routine proceeds to step 778, where the P-position target count Acnt is set to a temporary P-position target count "0."

On the other hand, if it is determined at step 773 that the instructed shift position sft is the non-P-position, the routine proceeds to step 779 in FIG. 46, where it is determined whether a non-P-position-side butting control has completed (i.e., whether the non-P-position-side butting completion flag Xnp is "on"). If a non-P-position-side butting control has completed the routine proceeds to step 780, where a non-P-position target count Acnt is calculated according to the following equation:

$$Acnt=Nnp-\Delta Gnp$$

In the above equation, $\Delta Gnp$ is a learned value of the non-P-position-side play amount, and is a preceding value that is stored in the nonvolatile memory of the ECU 41 until it is updated by a current (i.e., newly calculated) learned value $\Delta Gnp$ of the play amount at step 706 of the play amount learning routine of FIG. 36.

On the other hand, if a non-P-position-side butting control has not completed, the determination result at step 779 is "no" and hence the routine proceeds to step 781, where it is determined whether a P-position-side butting control has completed (i.e., whether the P-position-side butting completion flag Xp is "on"). If a P-position-side butting control has completed, the routine proceeds to step 782, where a non-P-position target count Acnt is calculated according to the following equation:

$$Acnt=Np+\Delta Nact-\Delta Gnp$$

If neither a P-position-side butting control nor a non-P-position-side one has completed (i.e., both of the P-position-side and non-P-position-side butting completion flags Xp and Xnp are "off"), the routine proceeds to step 783, where the non-P-position target count Acnt is set to a temporary non-P-position target count Knotp "e.g., 18.5°."

In setting a target count Acnt in this routine, preceding values stored in the nonvolatile memory of the ECU 41 are used as play amount learned values $\Delta Gp$ and $\Delta Gnp$ and a movable range actual measurement value $\Delta Nact$ until the former are updated. Alternatively, the target count Acnt may be set to a temporary target count (0 or Knotp) until values stored in the nonvolatile memory are updated.

[Setting of Instructed Shift Position]

Figure 47:
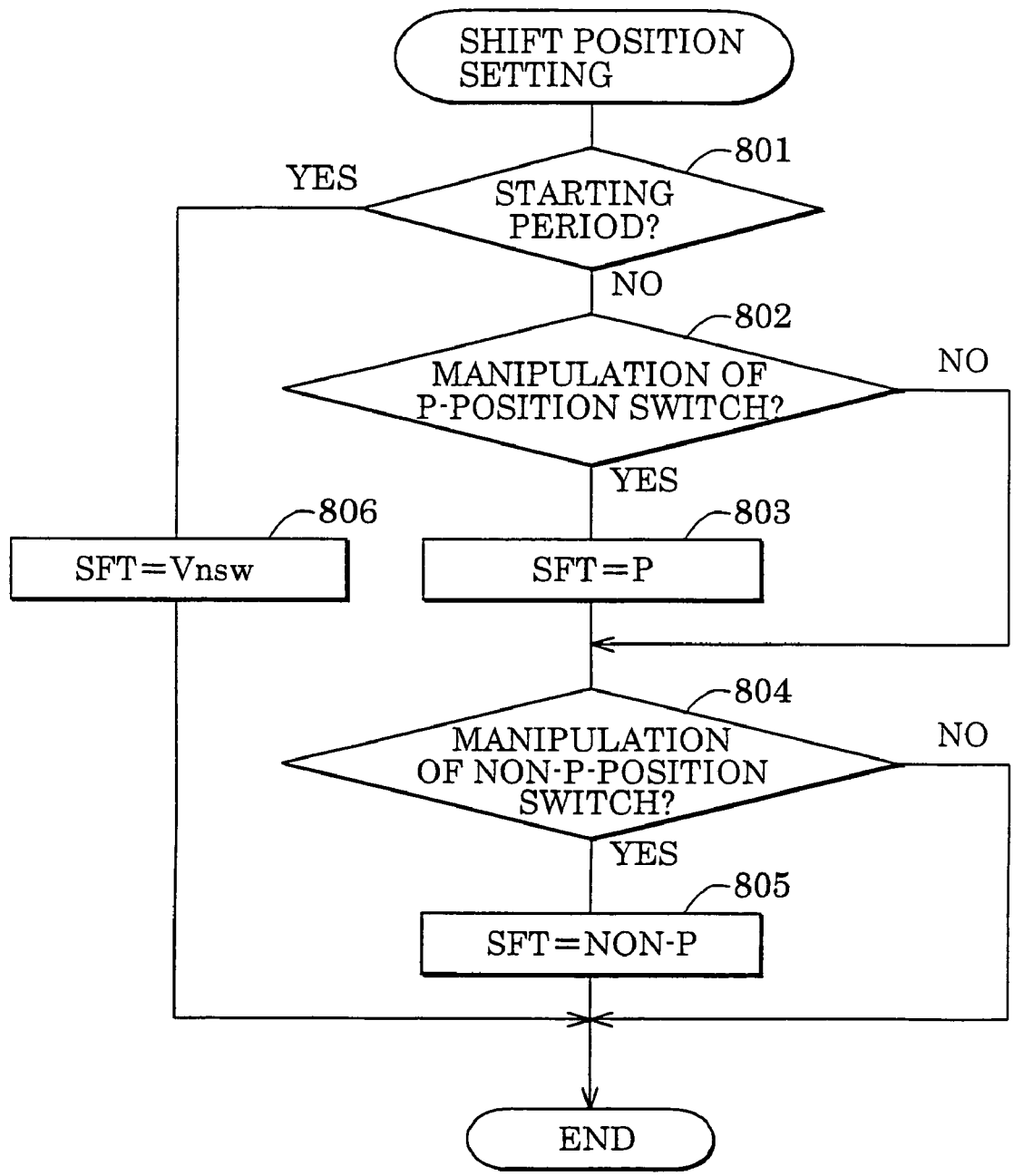
FIG. 47 is a flowchart showing an instructed shift position setting routine according to the first embodiment.

An instructed shift position setting routine shown in FIG. 47 is activated in a prescribed cycle (e.g., every 8 ms). Upon activation of this routine, at step 801, it is determined whether the present instant belongs to a starting period (i.e., the present instant is immediately after resetting of the CPU of the ECU 41 or application of power to it). If the present instant belongs to a starting period, the routine proceeds to step 806, where an actual shift position that is detected from an output Vnsw of the output shaft sensor 14 is set as an instructed shift position of starting. Then this routine is finished.

On the other hand, if it is determined at step 801 that present instant does not belong to a starting period, the routine proceeds to step 802, where it is determined whether the P-position switch 43 has been manipulated. If the P-position switch 43 has been manipulated, the routine proceeds to step 803, where the instructed shift position sft is set to the P-position.

If the P-position switch 43 has not been manipulated, the routine proceeds to step 804, where it is determined whether the non-P-position switch 44 has been manipulated. If the non-P-position switch 44 has been manipulated, the routine proceeds to step 805, where the instructed shift position sft is set to the non-P-position.

Figure 48:
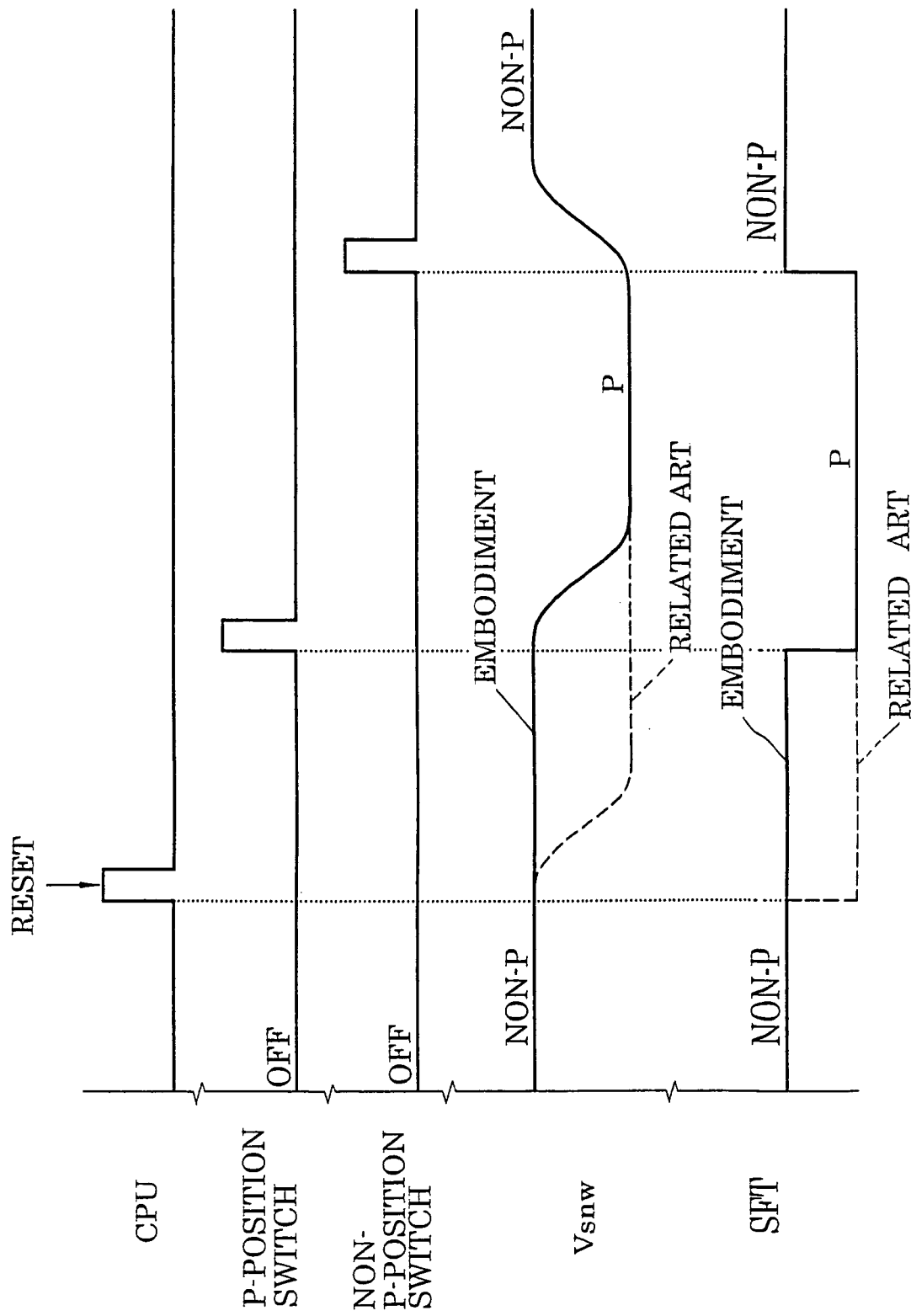
FIG. 48 is a time chart showing an exemplary control that is performed when the CPU is reset in a state that the vehicle is being driven with an instructed shift position sft set to the non-P-position.

Next, a method for setting an instructed shift position sft will be described by using a time chart of FIG. 48. FIG. 48 shows an exemplary control that is performed when the CPU of the ECU 41 is reset for a certain reason in a state that the vehicle is being driven with the instructed shift position sft set to the non-P-position. If the CPU of the ECU 41 is reset for a certain reason while the vehicle is running, it is determined immediately thereafter that the present instant belongs to a starting period and an actual shift position detected from an output Vnsw of the output shaft sensor 14 is set as an instructed shift position sft. Since the actual shift position is the non-P-position while the vehicle is running, the instructed shift position sft is set to the non-P-position on the basis of an output Vnsw of the output shaft sensor 14 in a starting period after the CPU of the ECU 41 has been reset for a certain reason.

As described above, even if the CPU of the ECU 41 is reset for a certain reason while the vehicle is running, the instructed shift position sft is not changed in association with the resetting and remains the non-P-position. This prevents an undesirable event that the shift position is switched to the P-position contrary to the intention of a driver.

Except during a starting period, the instructed shift position sft is switched to the P-position or the non-P-position in response to a manipulation on the P-position switch 43 or the non-P-position switch 44.

In the above embodiment, in an initial drive that is performed after application of power to the ECU 41, current supply is effected for all the phases of the SR motor 12 around according to a prescribed time schedule. Therefore, a rotation position of the rotor 32 necessarily coincides with one of the current supply phases. From this time onward, the rotor 32 rotates in synchronism with the current supply phase switching and an A-phase signal and a B-phase signal are output from the encoder 46 in synchronism with the rotation of the rotor 32. Both of rising edges and trailing edges of the A-phase signal and the B-phase signal of the encoder 46 are counted during the initial drive. Therefore, an angle (i.e., a rotation amount) by which the rotor 32 has rotated actually in synchronism with the current supply phase switching until the end of the initial drive is recognized by checking an encoder count at the end of the initial drive, whereby a corresponding relationship between the encoder count, a rotation position of the rotor 32, and a current supply phase at the end of the initial drive can be recognized.

Therefore, in this embodiment, an encoder count at the end of an initial drive is learned as an initial positional deviation learned value and each encoder count is corrected by using the initial positional deviation learned value in a subsequent ordinary drive. Therefore, a deviation between an encoder count and a current supply phase (i.e., a rotation position of the rotor 32) at the end of an initial drive can be corrected for and correct current supply phases can be selected during an ordinary drive.

Further, in this embodiment, one-phase current supply and two-phase current supply are performed alternately in an initial drive. Therefore, the rotor rotation angle per step (i.e., per current supply) is made a half of that of the one-phase current supply method in which current supply is always effected for only one phase and the two-phase current supply method in which current supply is always effected for two phases, whereby the rotation position of the rotor 32 and the current supply can reliably be synchronized with each other during an initial drive. Further, output signals of the encoder 46 can be stabilized by stopping vibration of the rotor 32 by two-phase current supply which produces high torque.

Even after the rotation position of the rotor 32 and the current supply have been synchronized with each other during an initial drive, the rotor 32 still vibrates with one-phase current supply which produces low torque. In view of this, in this embodiment, during an initial drive, the one-phase current supply time is set shorter than the two-phase current supply time. Shortening the time of one-phase current supply which causes vibration of the rotor 32 and making switching to the next two-phase current supply as soon as possible makes it possible to stabilize output signals of the encoder 46 by stopping vibration of the rotor 32 quickly and to shorten the initial drive time.

However, in the invention, the one-phase current supply time is set the same as the two-phase current supply time. The intended object of the invention can be attained even in such a case.

Although in this embodiment an initial drive is started with one-phase current supply, it may be started with two-phase current supply. In the latter case, even if a position of the rotor 32 at a start of an initial drive does not correctly coincide with a position corresponding to first two-phase current supply, the rotation position of the rotor 32 and the current supply phase can be synchronized with each other from the start of the initial drive as long as the rotor 32 is located in such a range as to be moved by high torque of the two-phase current supply.

The invention is not limited to the configuration that one-phase current supply and two-phase current supply are performed alternately in an initial drive; an initial drive may be performed by the one-phase current supply method in which current supply is always effected for only one phase or the two-phase current supply method in which current supply is always effected for two phases.

As described above, producing high torque, two-phase current supply can rotate the rotor 32 to a position corresponding to the two-phase current supply even if the rotor 32 is deviated from the position corresponding to the two-phase current supply. Therefore, the probability that effecting two-phase current supply only once or twice during an initial drive synchronizes the rotation position of the rotor 32 and the current supply phase with each other would be high.

In view of the above, in this embodiment, if a manipulation of switching the range from the P-position to the non-P-position is performed during a P-position initial drive, a transition to an ordinary drive after completion of the next two-phase current supply (after completion of two-phase current supply itself if a position switching manipulation is performed during the two-phase current supply) and a corresponding relationship between an encoder count, a rotation position of the rotor 32, and a current supply phase at the end of the two-phase current supply is learned. Therefore, when a manipulation of switching the range from the P-position to the non-P-position is performed during an initial drive, switching from the P-position to the non-P-position can be made quickly in such a manner that a corresponding relationship between an encoder count, a rotation position of the rotor 32, and a current supply phase is learned and then a transition to an ordinary drive is made quickly. This prevents the driver from feeling incongruous.

Usually, the SR motor 12 is not started with the non-P-position (because the ignition switch cannot be turned off with a range other than the P-position). However, under a special condition, there may occur a case that the SR motor 12 is started with the non-P-position. For example, the SR motor 12 may be started with the non-P-position in a case that the power to the ECU 41 is shut off instantaneously while the vehicle is running or the vehicle is maintained or inspected in a service station.

A logic for starting the SR motor 12 with the non-P-position may be omitted to simplify the control specification. However, in this embodiment, to accommodate the case that an initial drive is performed with the non-P-position, if a manipulation of switching the range from the P-position to the non-P-position during a P-position initial drive, switching from the P-position to the non-P-position is made in such a manner a transition to an ordinary drive is made after the initial drive is completed as scheduled.

Naturally, in the invention, even in the case that an initial drive is performed with the non-P-position, a procedure may be followed that is like the one employed in the case that an initial drive is performed with the P-position. That is, when a position switching manipulation is performed, a transition is made to an ordinary drive after completion of the next two-phase current supply (after completion of two-phase current supply itself if a position switching manipulation is performed during the two-phase current supply) and a corresponding relationship between an encoder count, a rotation position of the rotor 32, and a current supply phase at the end of the two-phase current supply is learned.

As a further alternative, even if a manipulation of switching the range from the P-position to the non-P-position is performed during a P-position initial drive, switching from the P-position to the non-P-position may be made in such a manner that a transition is made to an ordinary drive after the initial drive is completed as scheduled (priority is given to learning of an initial positional deviation).

In the above embodiment, in a feedback control, the variation direction of the encoder count is monitored and it is determined whether the rotation direction of the rotor 32 has reversed contrary to a rotation direction instruction (i.e., an instruction of a rotation direction toward a target position). If reversing of the rotation direction is detected, current supply for phases with which the rotor 32 is driven in the reverse direction is prohibited and current supply is effected for A-phase for which current supply was effected immediately before the reversing. This makes it possible to generate, upon detection of rotation reversing, braking torque that suppresses the reverse rotation of the rotor 32. The braking torque can suppress the reverse rotation quickly, whereby the rotation direction of the rotor 32 can quickly be returned from the reverse direction to the normal direction. A stable position switching control is enabled.

In this embodiment, upon detection of rotation reversing, current supply is effected for A-phase for which current supply was effected immediately before the reversing. Alternatively, current supply for any phase may be prohibited upon detection of rotation reversing. Also in this case, generation of torque in the reverse rotation direction can be prevented and hence the intended object of the invention can be attained.

In the above embodiment, as shown in FIG. 18, to start a feedback control from a state that the SR motor 12 is not energized, a feedback control start position stopping and holding process in which a current supply phase is selected on the basis of a current encoder count and current supply is effected for that phase is executed for a prescribed time (e.g., 10 ms) and the rotor 32 is thereafter rotated to a target position by performing a feedback control. Therefore, even if the position of the rotor 32 deviated in a period when the rotor 32 should be stopped, the rotor 32 can be positioned at a proper position at the start of a feedback control.

As a result, at the start of the feedback control, the position of the rotor 32 and the current supply phase (i.e., encoder count) can reliably be synchronized with each other from the first current supply phase. It becomes possible to prevent a loss of synchronization and prevent the rotor 32 from rotating away from a target position at the start of the feedback control, to allow the rotor 32 to reliably rotate to the target position with a stable feedback control, and to perform a position switching control (positioning control) that is highly stable and reliable.

Further, in this embodiment, after the end of a feedback control, current supply of the SR motor 12 is turned off after a target position stopping and holding process in which current supply phase is selected so that the rotor 32 is stopped and kept at a position where the rotor 32 existed at the end of the feedback control and current supply is effected for that phase is executed for a prescribed time (e.g. 50 ms). This prevents the rotor 32 from passing a target position due to inertia at the end of a feedback control (occurrence of an overshoot). The requirement of increase in the response speed of the position switching control can be satisfied while high stability and reliability of the position switching control are maintained.

In this embodiment, when the instructed shift position (target position) is changed during a feedback control to necessitate reversing the rotation direction of the rotor 32, a reversing position stopping and holding process in which current supply phase with which to stop and hold the rotor 32 is selected and current supply is effected for that phase is executed for a prescribed time (e.g., 50 ms). Then, a feedback control is restarted to rotate the rotor 32 to a new target position. Therefore, when the instructed shift position (target position) is changed during a feedback control, a reversing operation can be performed stably by determining a reversing position of the rotor 32. This prevents a loss of synchronization (i.e., deviation of current supply phases) due to deviation of the reversing position and thereby makes it possible to reliably rotate the rotor 32 to a new target position.

In this embodiment, a feedback control is finished and a transition is made to a target position stopping and holding process when the difference between the encoder count and a target count corresponding to a target position has become smaller than or equal to a prescribed value (e.g., a count corresponding to A-phase lead of the current supply phase) during the feedback control. Therefore, the last current supply phase of the feedback control coincides with a current supply phase with which to stop and keep the rotor 32 at the target position. This makes it possible to continue to effect current supply for the last current supply phase of the feedback control even after the transition to the target position stopping and holding process. The transition to the target position stopping and holding process from the feedback control can be made smoothly.

In this embodiment, the current supply method by which a feedback control start position stopping and holding process, a target position stopping and holding process, or a reversing position stopping and holding process is going to be executed is one-phase current supply, it is corrected to two-phase current supply. Therefore, each of the above stopping and holding processes can be executed by two-phase current supply which produces high torque. This provides an advantage that vibration of the rotor 32 can be prevented and the rotor 32 can reliably be stopped and kept at an intended position.

However, in the invention, each of the above stopping and holding processes may be executed by one-phase current supply. Even in this case, the effect of preventing position deviation of the rotor 32 can be obtained.

In this embodiment, the rotor 32 is driven by the one/two-phase current supply method in which one-phase current supply and two-phase current supply are performed alternately. Alternatively, the one-phase current supply method in which the rotor 32 is driven by only one-phase current supply or the two-phase current supply method in which the rotor 32 is driven by only two-phase current supply may be employed.

In the above embodiment, a play amount of the transmission system of the position switching mechanism 11 is learned. Therefore, even if the rotation transmission system has play amount, a target position (i.e., target count) can be set with the play amount taken into consideration. This makes it possible to accurately control the manipulated variable for the position switching mechanism 11.

Further, in this embodiment, in a state that the rotor 32 is stopped at the P-position after a control on the position switching mechanism 11 was started without performing play amount learning, a P-position-side butting control is performed and an encoder count at the time of P-position-side butting is stored in the RAM of the ECU 41. In a state that the rotor 32 is stopped at the non-P-position, a non-P-position-side butting control is performed and an encoder count at the time of non-P-position-side butting is stored in the RAM of the ECU 41. The difference between the encoder count at the time of P-position-side butting and the encoder count at the time of non-P-position-side butting is calculated as an actual measurement value of the movable range of the position switching mechanism 11. The difference between the actual measurement value of the movable range and its design value is learned as a play amount of the rotation transmission system.

Therefore, even if there was sufficient time to learn a play amount of the rotation transmission system from application of power to the ECU 41 to a start of a control on the position switching mechanism 11 and the control on the position switching mechanism 11 was started without performing play amount learning, a play amount of the rotation transmission system can be learned afterwards by performing each butting control when the rotor 32 is stopped at the P-position or the non-P-position.

In this embodiment, during a butting control, the current supply duty ratio (i.e., current supply factor) of the SR motor 12 is set smaller than in an ordinary drive, whereby the torque of the SR motor 12 is made lower than in an ordinary drive. This makes it possible to weaken the force of causing the engaging portion 23a of the detent spring 23 to butt against the side wall of the holding recess 24 or 25 of the detent lever 15 during a butting control. As a result, the parts of the rotation transmission system such as the engaging portion 23a of the detent spring 23 are prevented from being deformed or damaged due to butting controls, whereby high durability and reliability can be secured.

In this embodiment, the rotation speed of the rotor 32 is lowered during a butting control. This decreases the speed at which the engaging portion 23a of the detent spring 23 collides with the side wall of the holding recess 24 or 25 of the detent lever 15 during butting controls, and hence can weaken resulting impact. With the above effect of the reduction in the torque of the SR motor 12, this measure makes it possible to more reliably prevent the parts of the rotation transmission system such as the engaging portion 23a of the detent spring 23 from being deformed or damaged, to thereby increase the durability and reliability.

In this embodiment, during a butting control, an angle (i.e., a ride correction value) by which the engaging portion 23a of the detent spring 23 slightly rides the side wall of the holding recess 24 or 25 of the detent lever 15 in a state that the engaging portion 23a is in contact with the side wall is inferred on the basis of the battery voltage as a power source voltage for the SR motor 12. And an actual measurement value of the movable range of the position switching mechanism 11 is corrected by the inferred value. Therefore, even if the position switching mechanism 11 is configured in such a manner that the engaging portion 23a of the detent spring 23 rides the side wall of the holding recess 24 or 25 of the detent lever 15 during a butting control, an actual measurement value of the movable range of the position switching mechanism 11 can be determined accurately.

In this embodiment, when the butting learned value has come not to be updated during a butting control, it is determined that a state that the engaging portion 23a of the detent spring 23 is in contact with the side wall of the holding recess 24 or 25 of the detent lever 15 has been established, whereupon the butting control is finished. Therefore, an encoder count corresponding to a state that the engaging portion 23a of the detent spring 23 is in contact with the side wall of the holding recess 24 or 25 of the detent lever 15 has been established can be determined correctly, and hence an actual measurement value of the movable range of the position switching mechanism 11 can be determined accurately. Further, the period during which the engaging portion 23a of the detent spring 23 is kept in contact with the side wall of the holding recess 24 or 25 of the detent lever 15 can be shortened, whereby the degree of deterioration of the parts of the rotation transmission system such as the engaging portion 23a of the detent spring 23 due to butting controls can further be reduced.

However, in the invention, the butting control may always be performed for a constant time. Even in this case, the degree of deterioration of the parts of the rotation transmission system can be reduced by weakening the torque of the SR motor 12 during butting controls.

In this embodiment, a butting control is finished when it is determined that the engaging portion 23a of the detent spring 23 does not butt against the side wall of the holding recess 24 or 25 of the detent lever 15 even if the butting control has been performed for a prescribed time or more. This makes it possible to finish a butting control forcibly when a certain abnormality such as a failure in the SR motor 12 or the encoder 46 has occurred, which is a fail-safe measure.

In the above embodiment, during a feedback control, the phase lead of the current supply phase is corrected in accordance with the rotation speed of the rotor 32. Therefore, the starting torque can be increased by decreasing the phase lead of the current supply phase at a start of a feedback control, whereby the rotation speed of the rotor 32 can be raised quickly after the feedback control is started. Since the phase lead of the current supply phase is corrected so as to increase as the rotation speed of the rotor 12 increases, a synchronized relationship between the generation of torque of the current supply phase and the actual rotation phase of the rotor 32 can be maintained even during high-speed rotation, which makes it possible to rotate the rotor 32 stably at high speed.

When the rotor 32 has come close to a target position afterwards, the phase lead of the current supply phase is corrected in the decreasing direction. This establishes a state that the generation of torque of the current supply phase delays from the actual rotation phase of the rotor 32, which makes it possible to decrease the driving torque or generate torque (braking torque) in the direction opposite to the rotation direction of the rotor 32, whereby the rotation speed of the rotor 32 can be decreased reliably and the rotor 32 can be stopped at the target position correctly. This makes it possible to perform a feedback control that is superior in starting performance, high-speed rotation performance, and stop performance (deceleration performance).

In this embodiment, as shown in FIG. 18, to start a feedback control from a state that the SR motor 12 is not energized, a feedback control start position stopping and holding process in which current supply phases are selected on the basis of a current encoder count and the rotor 32 is stopped and kept at a stop position by two-phase current supply is executed for a prescribed time (e.g., 10 ms). The feedback control is then performed to rotate the rotor 32 to a target position. With this measure, even if the rotor 32 deviated in a period when it should be stopped, the rotor 32 can be positioned at a proper position at the start of a feedback control.

As a result, at the start of a feedback control, the position of the rotor 32 and the current supply phase (i.e., encoder count) can reliably be synchronized with each other from the first current supply phase. It becomes possible to prevent a loss of synchronization and prevent the rotor 32 from rotating away from a target position at the start of a feedback control, to allow the rotor 32 to reliably rotate to a target position with a stable feedback control, and to perform a position switching control (positioning control) that is highly stable and reliable.

Further, in this embodiment, after the end of a feedback control, current supply of the SR motor 12 is turned off after a target position stopping and holding process in which the rotor 32 is stopped and kept, by two-phase current supply, at a position where the rotor 32 existed at the end of the feedback control is executed for a prescribed time (e.g., 50 ms). This prevents the rotor 32 from passing a target position due to inertia at the end of a feedback control (occurrence of an overshoot). The requirement of increase in the response speed of the position switching control can be satisfied while high stability and reliability of the position switching control are maintained.

In this embodiment, when the instructed shift position (target position) is changed during a feedback control to necessitate reversing the rotation direction of the rotor 32, a reversing position stopping and holding process in which the rotor 32 is stopped and kept at a reversing position by two-phase current supply is executed for a prescribed time (e.g., 50 ms). Then, a feedback control is restarted to rotate the rotor 32 to a new target position. Therefore, when the instructed shift position (target position) is changed during a feedback control, a reversing operation can be performed stably by determining a reversing position of the rotor 32. This prevents a loss of synchronization (i.e., deviation of current supply phases) due to deviation of the reversing position and thereby makes possible to reliably rotate the rotor 32 to a new target position.

In this embodiment, the current supply method by which a feedback control start position stopping and holding process, a target position stopping and holding process, or a reversing position stopping and holding process is going to be executed is one-phase current supply, it is corrected to two-phase current supply (U and V-phases, V and W-phases, or U and W-phases). Therefore, each of the above stopping and holding processes can be executed by two-phase current supply which produces high torque. This provides an advantage that vibration of the rotor 32 can be prevented and the rotor 32 can reliably be stopped and kept at an intended position.

In this embodiment, the rotor 32 is driven by the one/two-phase current supply method in which one-phase current supply and two-phase current supply are performed alternately. Alternatively, the one-phase current supply method in which the rotor 32 is driven by only one-phase current supply or the two-phase current supply method in which the rotor 32 is driven by only two-phase current supply may be employed.

In an open-loop control, processing of stopping and holding the rotor 32 at a start of driving, at an end of driving, or in changing the target position (i.e., in reversing the rotation direction) may be performed by two-phase current supply which produces higher torque than one-phase current supply does. With this measure, also in an open-loop control, the rotor 32 can be stopped and held stably at a start of driving, at an end of driving, or in changing the target position (i.e., in reversing the rotation direction). The stability of an open-loop control can thus be increased.

Second Embodiment

In the above first embodiment, with attention paid to the fact that the output shaft sensor 14 for detecting a rotation position of the output shaft 13 of the SR motor 12 (i.e., an actual shift position) is provided, an actual shift position that is detected by the output shaft sensor 14 at starting (e.g., after resetting of the CPU of the ECU 41 or after power application to it) is set as an instructed shift position sft of starting. Where the output shaft sensor 14 is not provided, it is appropriate to set an instructed shift position sft of starting as in a second embodiment of the invention shown in FIGS. 49 and 50. It goes without saying that the instructed shift position setting method according to the second embodiment may be applied to a system that is provided with the output shaft sensor 14.

In the second embodiment, a latest instructed shift position sft is stored in the nonvolatile memory such as an SRAM of the ECU 41 while the vehicle is driven. At starting (e.g., after resetting of the CPU of the ECU 41 or power application to it), an instructed shift position storage value SRAMsft of the nonvolatile memory is set as an instructed shift position sft of starting.

If the battery is removed, the instructed shift position storage value SRAMsft disappears from the nonvolatile memory such as an SRAM which needs to be backed up by the battery while the power is off. In view of this, in the second embodiment, when removal of the battery is detected, the instructed shift position sft of starting is set to the P-position, for example, that is a shift position with which work of removing the battery is performed.

If the battery is removed, a butting learned values GNp etc. that are stored in the nonvolatile memory also disappear. Therefore, when removal of the battery is detected, not only is the instructed shift position sft of starting set to the P-position but also a P-position-side butting control is performed forcibly, whereby a P-position-side butting learned value GNp is determined.

Further, in the second embodiment, the instructed shift position SRAMsft that is stored in the nonvolatile memory is made a value that is different from an initial value "0" that is set when power is applied to the nonvolatile memory. More specifically, a value (e.g., 10) representing the P-position and a value (e.g., 20) representing the non-P-position are stored in the nonvolatile memory. With this measure, at starting, whether the battery was removed can be determined on the basis of whether the instructed shift position SRAMsft that is stored in the nonvolatile memory is equal to the initial value "0." Only routines that are different than in the first embodiment will be described.

[Setting of Instructed Shift Position]

Figure 49:
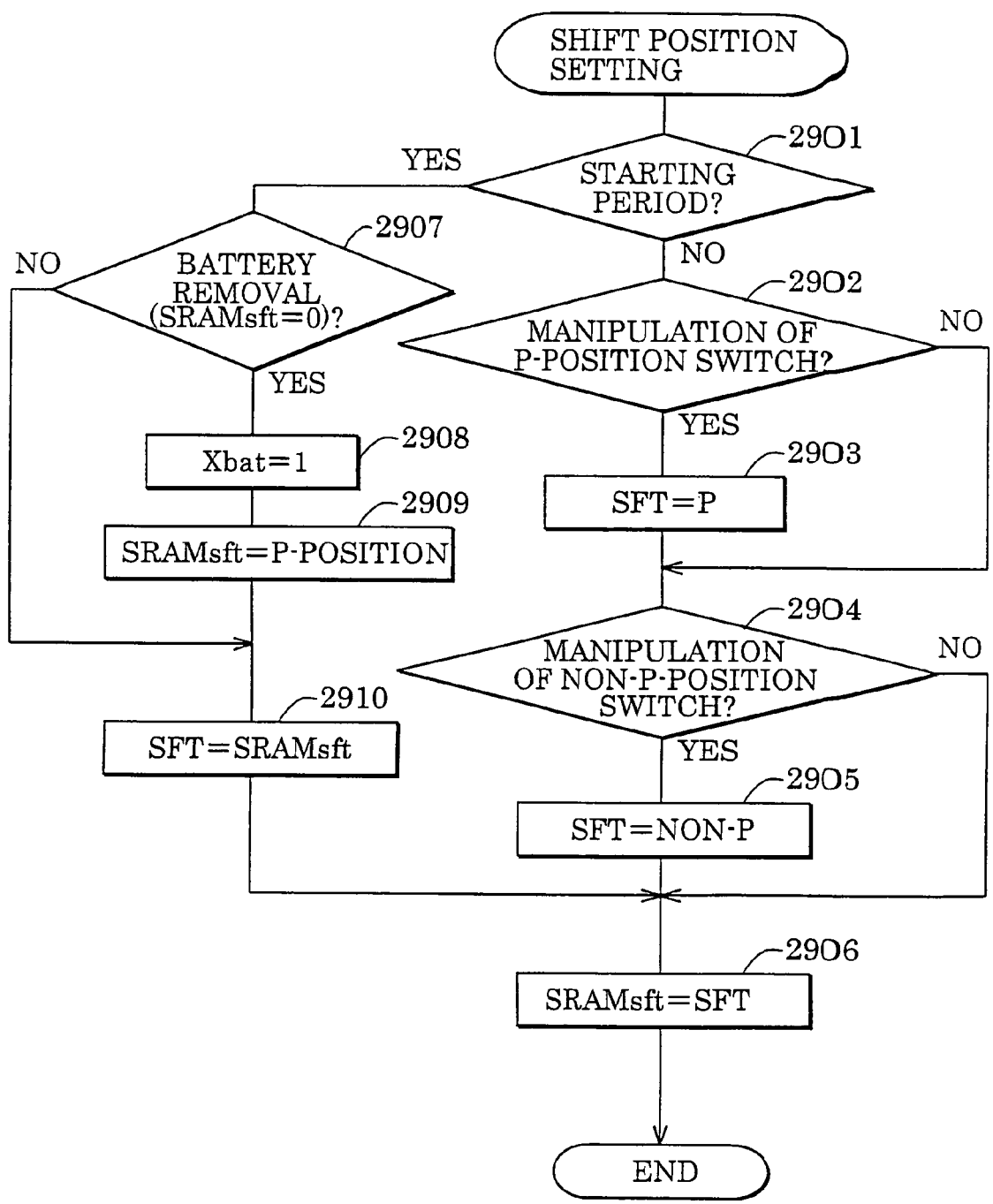
FIG. 49 is a flowchart showing an instructed shift position setting routine according to a second embodiment of the invention.

An instructed shift position setting routine shown in FIG. 49 is activated in a prescribed cycle (e.g., every 8 ms). Upon activation of this routine, at step 2901, it is determined whether the present instant belongs to a starting period (i.e., the present instant is immediately after resetting of the CPU of the ECU 41 or application of power to it). If it is determined that present instant does not belong to a starting period, the routine proceeds to step 2902, where it is determined whether the P-position switch 43 has been manipulated. If the P-position switch 43 has been manipulated, the routine proceeds to step 2903, where the instructed shift position sft is set to the P-position.

If the P-position switch 43 has not been manipulated, the routine proceeds to step 2904, where it is determined whether the non-P-position switch 44 has been manipulated. If the non-P-position switch 44 has been manipulated, the routine proceeds to step 2905, where the instructed shift position sft is set to the non-P-position. Then, the routine proceeds to step 2906, where the latest instructed shift position sft is stored in the nonvolatile memory of the ECU 41. Then this routine is finished.

On the other hand, if it is determined at step 2901 that the present instant belongs to a starting period, the routine proceeds to step 2907, where whether the battery was removed is determined on the basis of whether the instructed shift position SRAMsft that is stored in the nonvolatile memory is equal to the initial value "0." If it is determined that the battery was not removed, the routine proceeds to step 2910, where the instructed shift position storage value SRAMsft of the nonvolatile memory is set as an instructed shift position sft of starting. Then this routine is finished.

If it is determined at step 2907 that the battery was removed, the routine proceeds to step 2908, where a battery removal flag Xbat is set to "1" to perform a P-position-side butting control. At the next step 2909, the instructed shift position storage value SRAMsft of the nonvolatile memory is set to the P-position. Then, the routine proceeds to step 2910, where the instructed shift position storage value SRAMsft of the nonvolatile memory is set as an instructed shift position sft of starting. Then this routine is finished.

[P-Position-Side Butting Control]

Figure 50:
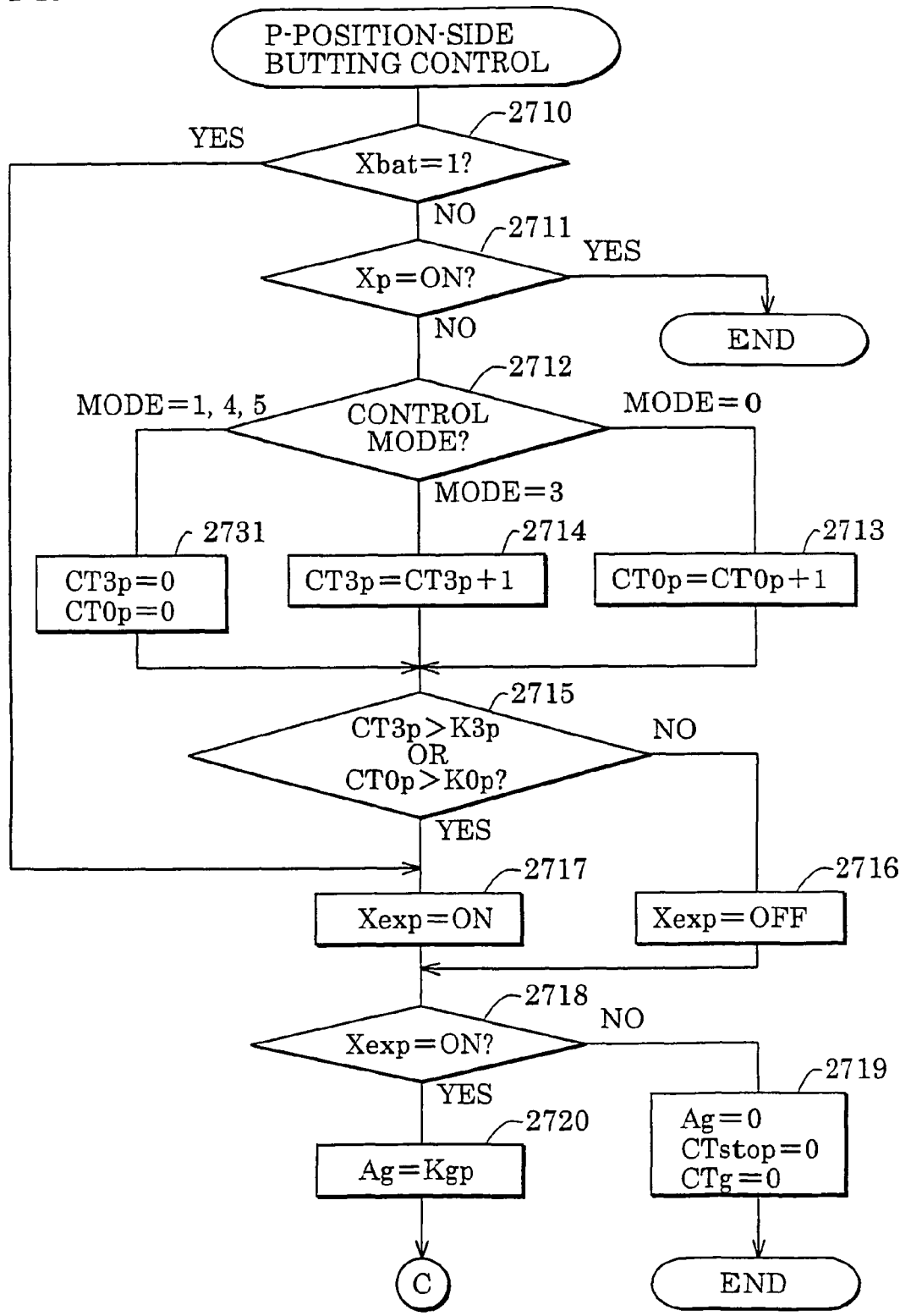
FIG. 50 is a flowchart showing the first half of a P-position-side butting control routine.

A P-position-side butting control routine shown in FIG. 50 is the same as the first half (FIG. 39) of the P-position-side butting control routine of FIGS. 39 and 40 according to the first embodiment except that step 2711 is added to step 711 of the P-position-side butting control routine of FIGS. 39 and 40.

Upon activation of the P-position-side butting control routine of FIG. 50, at step 2701, whether the battery was removed is determined on the basis of whether the battery removal flag Xbat is "1." If the battery was not removed, step 2711 and the following steps are executed in the same manner as in the first embodiment.

On the other hand, if it is determined that the battery removal flag Xbat is "1" (i.e., the battery was removed), the routine proceeds to step 2717, where the P-position-side butting control flag Xexp is set to "on." A P-position-side butting control is performed thereafter in the same manner as in the first embodiment, whereby a P-position-side butting learned value GNp is determined.

In the second embodiment described above, a latest instructed shift position sft is stored in the nonvolatile memory of the ECU 41 while the vehicle is driven. At starting, an instructed shift position storage value SRAMsft of the nonvolatile memory is set as an instructed shift position sft of starting. Therefore, even if the CPU of the ECU 41 is reset for a certain reason while the vehicle is driven, the instructed shaft range sft is not changed in association with the resetting, which prevents trouble that the shift position is switched contrary to the intention of the driver.

Further, in the second embodiment, in view of the fact that an instructed shift position storage value SRAMsft stored in the nonvolatile memory disappears upon removal of the battery, when removal of the battery is detected, the instructed shift position sft of starting is set to the P-position that is a shift position with which work of removing the battery is performed. This secures safety at starting.

The nonvolatile memory may be a device such as an EEPROM that does not require a backup power source. In this case, an instructed shift position storage value can be held even if the battery is removed. Therefore, at starting it is appropriate to set an instructed shift position storage value of the nonvolatile memory as an instructed shift position of starting irrespective of whether the battery was removed. It is not necessary to perform a P-position-side butting control again even if the battery is removed.

Third Embodiment

Figure 52:
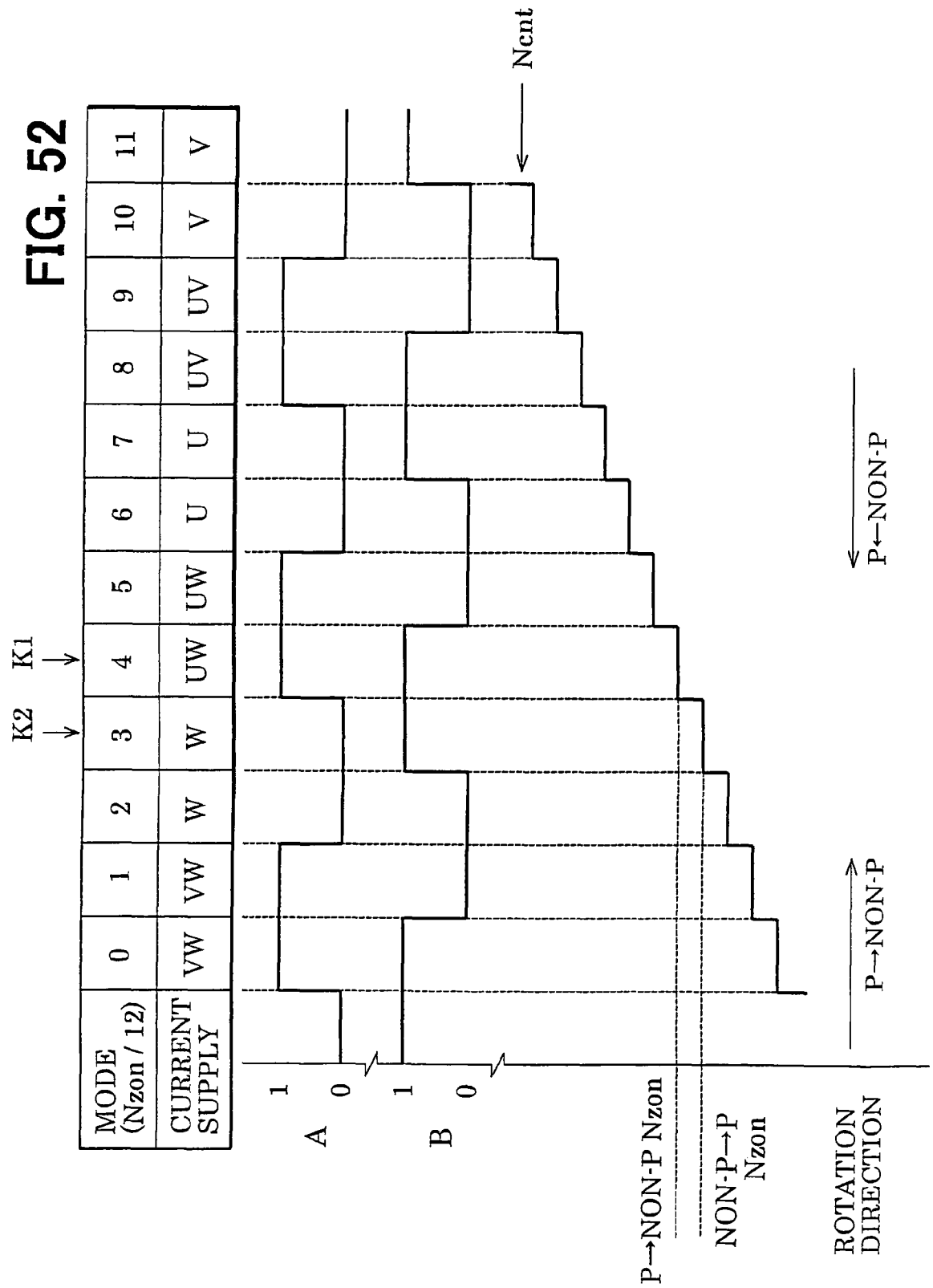
FIG. 52 is a time chart illustrating a Z-phase correction.

During rotation of the SR motor 12, as shown in FIG. 52, the encoder 46 outputs an A-phase signal pulse and a B-phase signal pulse alternately in synchronism with the rotation of the rotor 32 and also outputs a Z-phase signal pulse every time current supply is effected for all the phases around and the rotor 32 is rotated by 45°. Since reference rotation positions of the rotor 32 can be detected correctly by using the Z-phase signal, whether the corresponding relationship between the rotation position of the rotor 32 and the current supply phase (i.e., encoder count) is not deviated from a correct one can be checked by determining whether a current supply phase (i.e., encoder count) with which a Z-phase signal pulse is output corresponds to a reference rotation position of the rotor 32. A highly reliable motor control can be performed by performing, if a deviation from the correct relationship is found, a Z-phase correction for correcting for the deviation.

Figure 51:
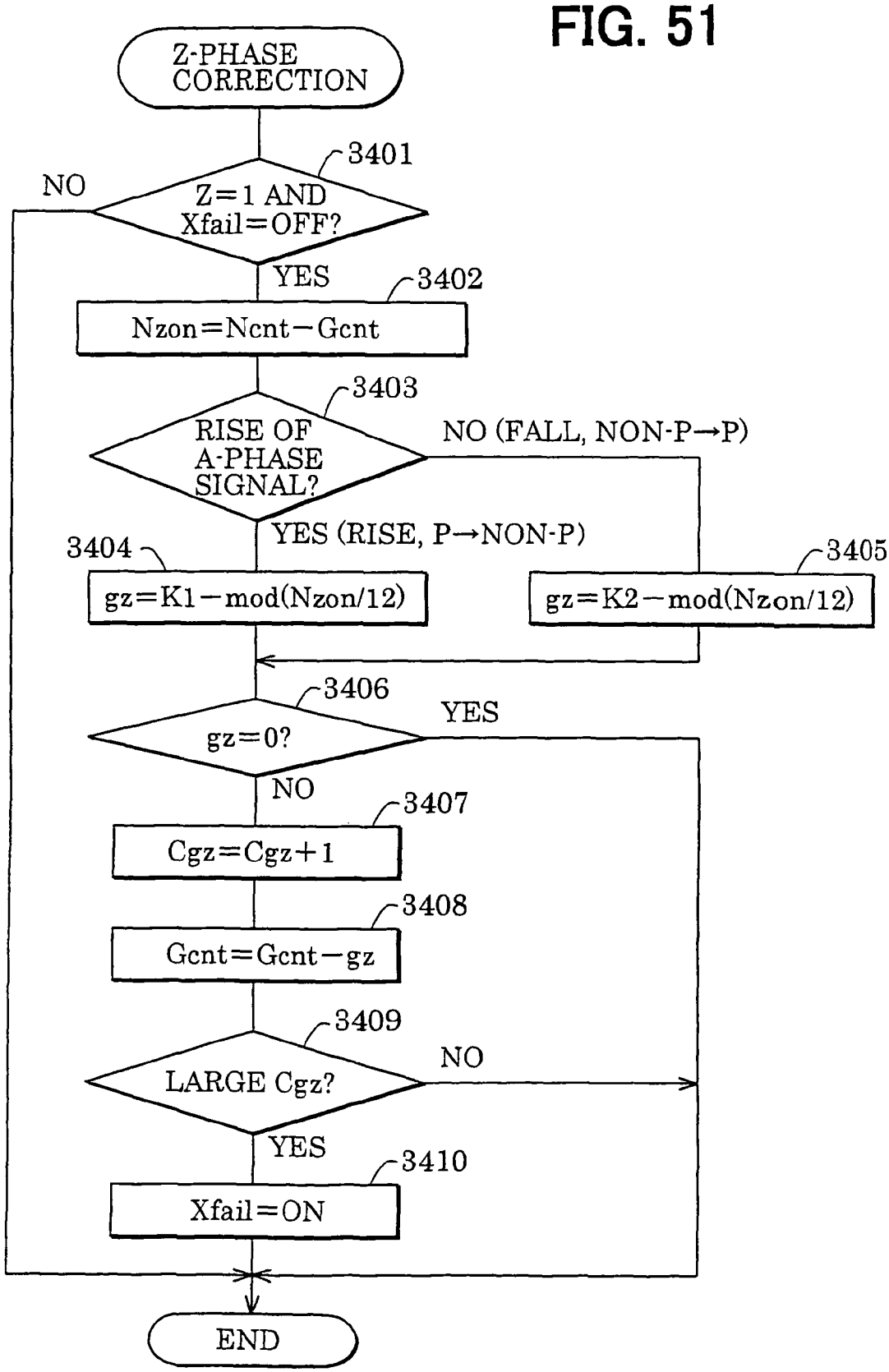
FIG. 51 is a flowchart showing a Z-phase correction routine according to a third embodiment of the invention.

The Z-phase correction is performed by a Z-phase correction routine shown in FIG. 51. This routine is activated by A-phase interruption processing in synchronism with both of rising edges and trailing edges of an A-phase signal. Upon activation of this routine, at step 3401, it is determined whether a Z-phase signal value Z is equal to "1" (high level) and an encoder failure flag Xfail is "off" meaning that the encoder 46 is not in failure. If the Z-phase signal value Z is equal to "0" (low level) or the encoder failure flag Xfail is "on" meaning that the encoder 46 is in failure, the determination result at step 3401 is "no," whereupon this routine is finished without executing the remaining steps.

On the other hand, if the determination result at step 3401 is "yes," the routine proceeds to step 3402, where a position detection count Nzon at the time of output of a Z-phase signal pulse (i.e., when the Z-phase signal value Z has been inverted to "1") is stored. The position detection count Nzon is an encoder count Ncnt at the time of output of a Z-phase signal pulse as corrected by using an initial positional deviation learned value Gcnt, and a reference rotation position (i.e., a position where the Z-phase signal pulse is output) of the rotor 32 is detected on the basis of the position detection count Nzon:

$$Nzon = Ncnt - Gcnt$$

Then, the routine proceeds to step 4303, where whether the rotation direction of the rotor 32 is the normal direction (i.e., the rotation direction from the P-position to the non-P-position) on the basis of whether the instant of activation of this routine coincides with a rise of the A-phase signal.

As shown in FIG. 52, an A-phase signal pulse and a Z-phase signal pulse are output with A-phase difference of 90° (electrical angle). Therefore, in the case of the normal rotation direction (i.e., the rotation direction from the P-position to the non-P-position), the A-phase signal rises during output of a Z-phase signal pulse. In case of the reverse rotation direction (i.e., the rotation direction from the non-P-position to the P-position), the A-phase signal falls during output of a Z-phase signal pulse. Therefore, whether the current rotation direction is the normal direction or the reverse direction can be determined on the basis of whether the A-phase signal rises or falls.

If it is determined at step 3403 that the instant of activation of this routine coincides with a rise of the A-phase signal, that is, the rotation direction of the rotor 32 is the normal direction (i.e., the rotation direction from the P-position to the non-P-position), the routine proceeds to step 3404, where a deviation gz between an actual value and a design value of the current supply phase at the time of output of the Z-phase signal pulse.

$$gz = K1 - \mathrm{mod}(Nzon/12)$$

In the above equation, K1 is A-phase lead of the current supply phase in the normal rotation direction that is necessary to rotate the rotor 32 in the normal direction and is set to "4," for example. And mod(Nzon/12) is a remainder obtained by dividing a position detection count Nzon with which the Z-phase signal pulse is output by 12.

In this embodiment, as shown in FIG. 52, the system is designed in such a manner that mod(Nzon/12) becomes "4" in the case of the normal rotation direction (i.e., the rotation direction from the P-position to the non-P-position). Therefore, as long as the control system operates normally, gz=K1−mod(Nzon/12) becomes "0."

On the other hand, if it is determined at step 3403 that the instant of activation of this routine coincides with a fall of the A-phase signal, that is, the rotation direction of the rotor 32 is the reverse direction (i.e., the rotation direction from the non-P-position to the P-position), the routine proceeds to step 3405, where a deviation gz between an actual value and a design value of the current supply phase at the time of output of the Z-phase signal pulse.

$$gz=K2-\text{mod}(Nzon/12)$$

where K2 is A-phase lead of the current supply phase in the reverse rotation direction that is necessary to rotate the rotor 32 in the reverse direction and is set to "3," for example.

In this embodiment, as shown in FIG. 52, the system is designed in such a manner that mod(Nzon/12) becomes "3" in the case of the reverse rotation direction (i.e., the rotation direction from the non-P-position to the P-position). Therefore, as long as the control system operates normally, gz=K2−mod(Nzon/12) becomes "0."

After the calculation of the deviation gz between the actual value and the design value of the current supply phase, the routine proceeds to step 3406, where the deviation gz between the actual value and the design value is equal to "0." If the deviation gz is equal to "0," which means that the control system is operating normally, thus routine is finished without executing the remaining steps such as a Z-phase correction step.

On the other hand, if the deviation gz between the actual value and the design value of the current supply phase is not equal to "0," it is determined that a Z-phase correction is necessary and the routine proceeds to step 3407. At step 3407, the count Cgz of a number-of-Z-phase-corrections counter that counts the number of times of Z-phase correction is incremented. The routine then proceeds to step 3408, where a deviation of the initial positional deviation learned value Gcnt is corrected for by the deviation gz between the actual value and the design value.

$$Gcnt=Gcnt-gz$$

Then, the routine proceeds to step 3409, where it is determined whether the count Cgz (i.e., the number of times of Z-phase correction) of the number-of-Z-phase-corrections counter has exceeded a determination value. If the count Cgz is smaller than or equal to the determination value, it is not determined yet that the encoder 46 is in failure. On the other hand, if the count Cgz is greater than the determination value, it is determined that the encoder 46 is in failure and the routine proceeds to step 3410. At step 3410, the encoder failure flag Xfail is set to "on" meaning that the encoder 46 is in failure. The routine is then finished.

Once the encoder failure flag Xfail is set to "on," the determination result at step 3401 is always "no" even if this routine is activated by A-phase interruption processing. Therefore, this routine is finished forcibly and hence a Z-phase correction is not performed.

In this embodiment, whether the corresponding relationship between the rotation position of the rotor 32 and the current supply phase (i.e., encoder count) is not deviated from a correct one can be checked by determining whether a current supply phase (i.e., encoder count) with which a Z-phase signal pulse is output from the encoder 46 corresponds to A-phase corresponding to a reference rotation position of the rotor 32, and, if a deviation from the correct relationship is found, a Z-phase correction is performed to correct for the deviation. A highly reliable motor control can thus be performed.

If Z-phase corrections are performed repeatedly, there is a possibility that erroneous Z-phase corrections are being performed. In view of this, in this embodiment, if Z-phase corrections are performed a prescribed number of times during an ordinary drive, further Z-phase corrections are prohibited. This makes it possible to prevent the SR motor 12 from being stopped or operating erroneously due to repetition of erroneous Z-phase corrections.

In the Z-phase correction routine of FIG. 51, it is determined whether a corresponding relationship between a current supply phase (i.e., encoder count) and a rotation position of the rotor 32 when a Z-phase signal pulse is output from the encoder 46 is not deviated from a correct one. For example, whether a corresponding relationship between a current supply phase (i.e., encoder count) and a rotation position of the rotor 32 is not deviated from a correct one may be determined on the basis of whether an increase or decrease of the encoder count from output of a preceding Z-phase signal pulse to output of a current Z-phase signal pulse is equal to "12."

In the invention, an encoder that does not output a Z-phase signal (i.e., an encoder that outputs only an A-phase signal and a B-phase signal may be employed. In this case, the Z-phase correcting function is emitted.

Fourth Embodiment

In the above embodiments, the phase lead of the current supply phase is corrected in accordance with the rotation speed of the rotor 32 or presence/absence of a deceleration request. However, almost the same advantages can be obtained by switching the current supply method in accordance with the rotation speed (i.e., whether the present instant belongs to an initial drive period) of the rotor 32 or presence/absence of a deceleration request.

For example, if the one/two-phase current supply method is employed in an initial drive period, the rotor rotation angle per step (i.e., per current supply) is made a half of that of the one-phase current supply method in which current supply is always effected for only one phase and the two-phase current supply method in which current supply is always effected for two phases, whereby rotation of the rotor 32 can be started quickly by virtue of high torque. If the rotor 32 is thereafter driven by the one-phase current supply method in which current supply is always effected for only one phase, the rotor rotation angle per step (i.e., per current supply) is made two times that in the initial drive period (one/two-phase current supply method), whereby the rotor 32 can be rotated stably at high speed.

In this case, when it becomes necessary to decelerate the rotation speed of the rotor 32 (e.g., when the rotor 32 comes close to a target position) in a period when the rotor 32 is being driven by the one-phase current supply method, switching may be made from the one-phase current supply method to the one/two-phase current supply method. That is, if switching is made to the one/two-phase current supply method in a state that the rotor 32 is being rotated by the one-phase current supply method, the phase of the current supply phase delays from the actual rotation phase of the rotor 32, whereby torque (braking torque) for rotating the rotor 32 in the direction opposite to the current rotation direction is generated. The rotation speed of the rotor 32 can be decreased reliably. In addition, in the one/two-phase current supply method, the rotor rotation speed per step (i.e., per current supply) is a half of that of the one-phase current supply method. Therefore, the rotor 32 can accurately be stopped at a target position.

Figures 53, 54:
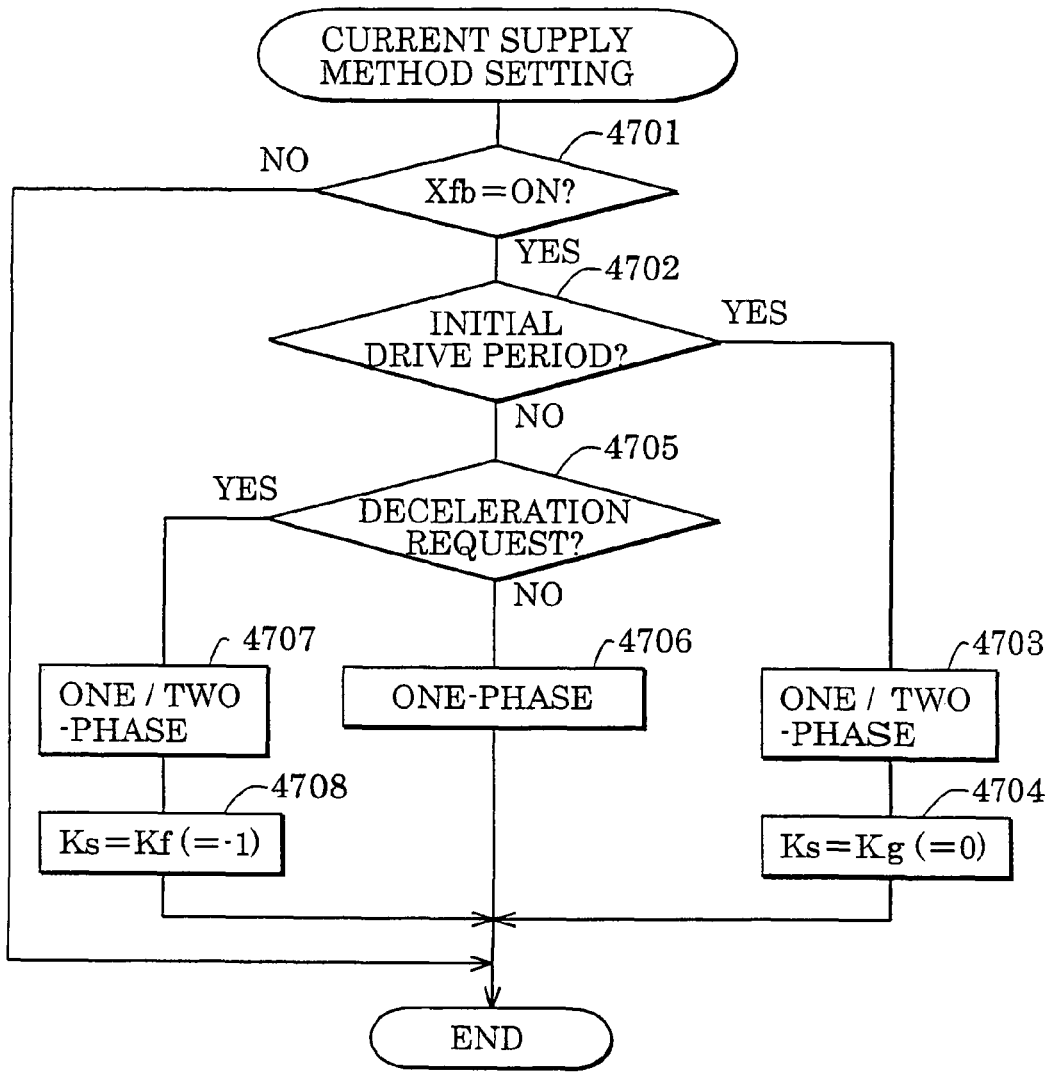
FIG. 53 is a flowchart showing a current supply method setting routine according to a fourth embodiment of the invention.
FIG. 54 shows an exemplary table to be used for converting a value Mptn%12 into a current supply phase in the case of a one-phase current supply method.

The fourth embodiment of the invention which is an implementation of the above concept will be described with reference to FIGS. 53 and 54.

A current supply method setting routine shown in FIG. 53, which is activated in a prescribed cycle (e.g., every 1 ms), sets a current supply method in the following manner in accordance with a rotation speed of the rotor 32 (i.e., whether the present instant belongs to an initial drive period) or presence/absence of a deceleration request. Upon activation of this routine, at step 4701, it is determined whether the feedback permission flag Xfb is "on" (a feedback control is being performed). If the feedback permission flag Xfb is "off" (feedback control prohibited), this routine is finished without executing the remaining steps.

On the other hand, if the feedback permission flag Xfb is "on" (a feedback control is being performed), the routine proceeds to step 4702, where it is determined whether the present instant belongs to an initial drive period is determined by using at least one of the following three criteria:

(1) Whether the rotation speed SP of the rotor 32 is lower than or equal to a prescribed value.

(2) Whether the variation of the encoder count (i.e., rotor rotation amount) from the start of the drive is smaller than or equal to a prescribed value.

(3) Whether the elapsed time from the start of the drive is shorter than or equal to a prescribed value.

Whether the present instant belongs to an initial drive period may be determined on the basis of whether two or more of the above criteria (1)-(3) are met. Naturally, a criterion other than the above criteria (1)-(3) may be used. For example, whether the present instant belongs to an initial drive period may be determined on the basis of whether the motor load torque is higher than or equal to a prescribed value.

If it is determined at step 4702 that the present instant belongs to an initial drive period, the routine proceeds to step 4703, where the current supply method is set to the one/two-phase current supply method. At the next step 4704, the speed phase lead correction amount Ks is set to "0," for example. As a result, in the initial drive period, the rotor 32 is driven by the one/two-phase current supply method as in the case of the above embodiments.

On the other hand, if it is determined at step 4702 that the present instant does not belong to an initial drive period, the routine proceeds to step 4705, where it is determined whether a deceleration request has occurred. For example, whether the rotation position of the rotor 32 has come close to a target position (i.e., whether the rotation position of the rotor 32 has entered a deceleration range for a stop) is determined on the basis of whether the absolute value |Acnt−Ncnt| of the difference between the target count Acnt and the encoder count Ncnt is smaller than a prescribed value. Or whether the rotation position of the rotor 32 has entered a deceleration range that is set in a feedback control.

If no deceleration request has occurred, the routine proceeds to step 4706, where the current supply method is set to the one-phase current supply method. In the one-phase current supply method, a current supply phase is determined on the basis of a value Mptn%12 by using a conversion table shown in FIG. 54.

When a deceleration request occurs afterward, the determination result at step 4705 becomes "yes" and the routine proceeds to step 4707. At step 4707, the current supply method is set to the one/two-phase current supply method. At the next step 4708, the speed phase lead correction amount Ks is set to "−1," for example. As a result, torque (braking torque) for rotating the rotor 32 in the direction opposite to the current rotation direction is generated. The rotation speed of the rotor 32 can be decreased reliably.

Combining the switching of the current supply method and the correction of the phase lead of the current supply phase in the above manner makes it possible to increase the starting performance, high-speed rotation performance, and the stop performance (deceleration performance) effectively. However, in the invention, only the switching of the current supply method may be employed (the correction of the phase lead of the current supply phase) is omitted.

Further, the rotation speed of the rotor 32 may be controlled in accordance with a request rotation speed (i.e., a target rotation speed) by setting a request rotation speed (i.e., a target rotation speed) during a feedback control and correcting the phase lead of the current supply phase or switching the current supply method in accordance with the thus-set request rotation speed (i.e., target rotation speed). For example, when it is intended to increase the rotation speed of the rotor 32, it is appropriate to correct the phase lead of the current supply phase so that it is increased or to switch the current supply method from the one/two-phase current supply method to the one-phase current supply method (or two-phase current supply method). Conversely, when it is intended to decrease the rotation speed of the rotor 32, it is appropriate to correct the phase lead of the current supply phase so that it is decreased or to switch the current supply method from the one-phase current supply method (or two-phase current supply method) to the one/two-phase current supply method. In this manner, the rotation speed of the rotor 32 can be controlled while a feedback control is performed on the basis of the encoder count so that the rotor 32 is rotated to a target position.

The position switching device according to this embodiment is such that switching is made between the two ranges, that is, the P-position and the non-P-position. However, for example, the invention can also be applied to a position switching device that switches between ranges of P, R, N, D, etc. of an automatic transmission by switching between a position switching valve and a manual valve of the automatic transmission in link with a rotation operation of the detent lever 15.

Fifth Embodiment

Where a position switching control is performed with the SR motor 12 having the encoder 46, a feedback control for rotating the rotor 32 to a target position is performed every time the instructed shift position (target position) is switched from the P-position to the non-P-position or in the opposite direction by rotating the rotor 32 by sequentially switching the current supply phase of the rotor 12 on the basis of the encoder count. When the encoder count has reached a target count that is set in accordance with the target position, it is determined that the rotor 32 has reached the target position and the feedback control is finished, whereby the rotor 32 is stopped at the target position.

In a feedback control on the SR motor 12, the current supply phase is switched in synchronism with output of A-phase signal pulses and B-phase signal pulses from the encoder 46. Therefore, if rotation of the rotor 32 is stopped for a certain reason during a feedback control the encoder 46 stops outputting the A-phase signal and the B-phase signal, the current supply phase cannot be switched in the feedback control and hence the rotor 32 cannot be rotated to a target position.

In view of the above, in a fifth embodiment of the invention, the ECU 41 of the position switching controller 42 executes, parallel with a feedback control on the SR motor 12, in the following manner, a time-synchronous current supply phase setting process that sets the current supply phase on the basis of the encoder count in a prescribed cycle (e.g., every 1 ms) from a start of the feedback control until the rotor 32 is rotated to a rotation position.

With this configuration, even if the rotation of the rotor 32 is once stopped for a certain reason during a feedback control and the encoder 46 stops outputting the A-phase signal and the B-phase signal, the time-synchronous current supply phase setting process sets the current supply phase on the basis of an encoder count at that instant. Therefore, the time-synchronous current supply phase setting process can switch the current supply phase and hence rotate the rotor 32 so that it comes as close to a target position as possible. The reliability of the drive control (position switching control) on the SR motor 12 can thus be increased.

[Time-Synchronous Motor Control]

Figure 55:
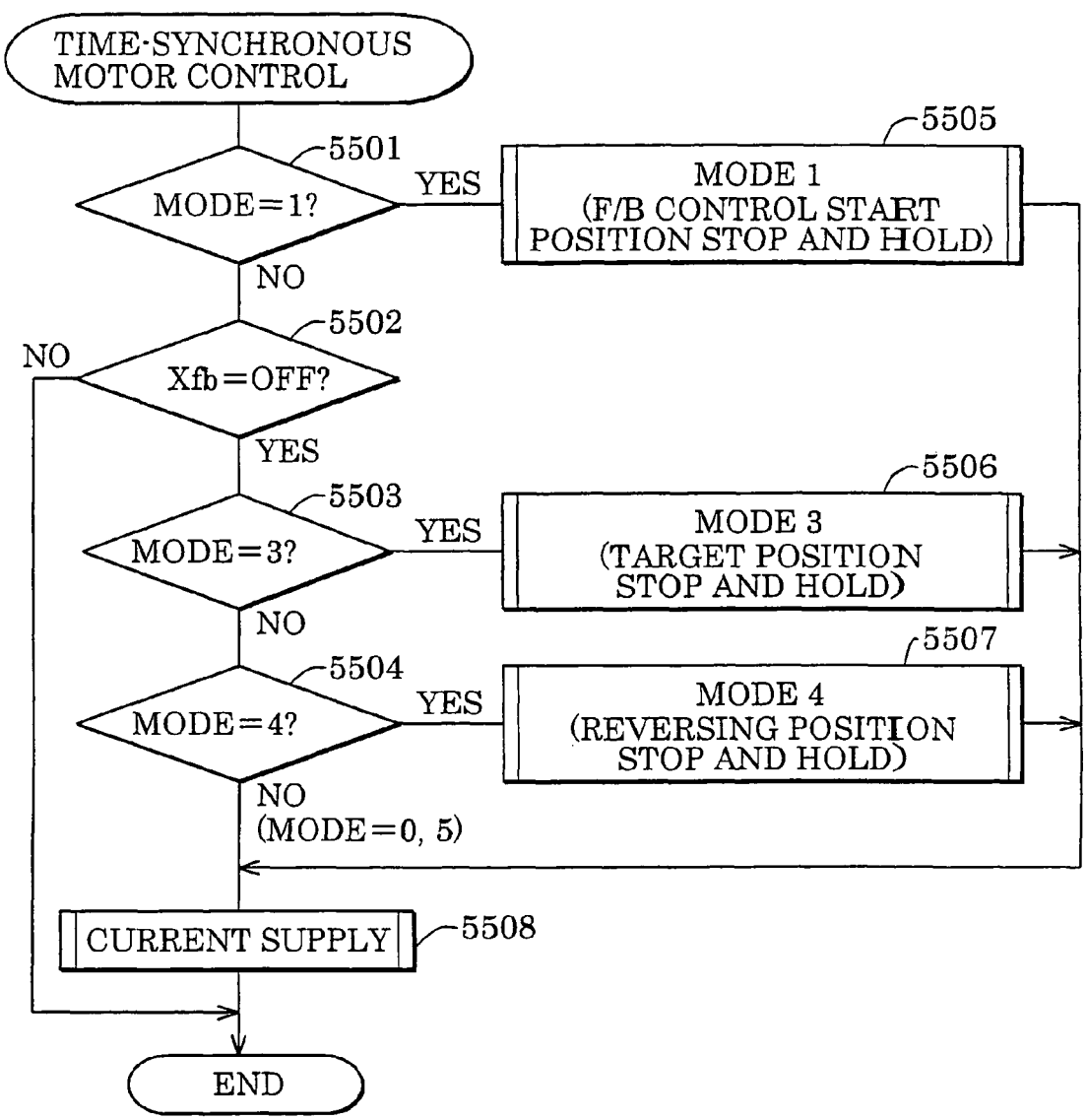
FIG. 55 is a flowchart showing a time-synchronous motor control routine according to a fifth embodiment of the invention.

A time-synchronous motor control routine shown in FIG. 55 is activated in a prescribed cycle (e.g., every 1 ms) after the end of an initial drive. An ordinary drive (a feedback control start position stopping and holding process, a time-synchronous current supply phase setting process, and a feedback control), a target position stopping and holding processing, or a reversing position stopping and holding process is executed in this routine.

Figure 56:
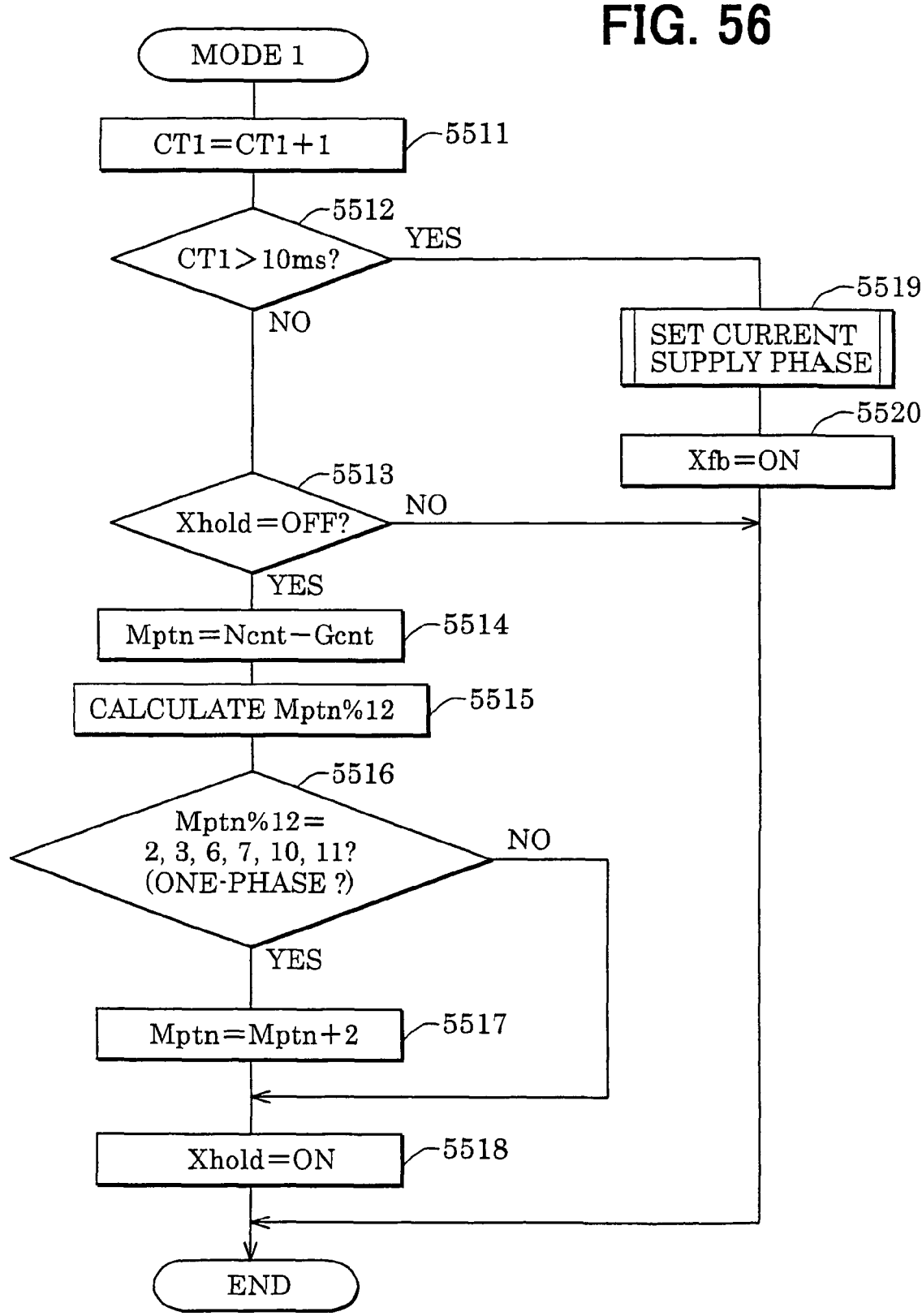
FIG. 56 is a flowchart showing a mode-1 routine.

Upon activation of this routine, at step 5501, it is determined whether the control mode determination value "mode" is equal to "1" (ordinary drive). If the control mode determination value "mode" is equal to "1," the routine proceeds to step 5505, where a mode-1 routine (described later) shown in FIG. 56 is executed, whereby a current supply phase determination value Mptn indicating a current supply phase with which to execute a feedback control start position stopping and holding process and a time-synchronous current supply phase setting process is calculated.

If it is determined at step 5501 that the control mode determination value "mode" is not equal to "1," the routine proceeds to step 5502, where it is determined whether the feedback permission flag Xfb is "off" (feedback control prohibited). If the feedback permission flag Xfb is "on" (feedback control permitted), this routine is finished without executing the remaining steps. In this case, current supply phase setting and current supply processing are performed by a feedback routine (see FIG. 30).

In this routine, if the control mode determination value "mode" is not equal to "1," step 5505 (i.e., the mode-1 routine of FIG. 56) is executed even during a feedback control. That is, the feedback control in which current supply phases are set in synchronism with output of A-phase signal pulses and B-phase signal pulses from the encoder 46 by the feedback control routine of FIG. 30 and a time-synchronous current supply phase setting process in which current supply phases are set in a prescribed cycle by the mode-1 routine are executed in parallel. With this measure, even if the rotor 32 is stopped for a certain reason during a feedback control, current supply phase determination values Mptn are calculated by the time-synchronous current supply phase setting process and the rotor 32 is rotated toward a target position.

On the other hand, if it is determined at step 5502 that the feedback control permission flag Xfb is "off (feedback control prohibited), it is determined at steps 5503 and 5504 whether the control mode determination value "mode" is equal to 3 or 4. If the control mode determination value "mode" is equal to "3" (target position stopping and holding process), the routine goes from step 5503 to step 5506, where the mode-3 routine shown in FIG. 25 is executed, whereby a current supply phase determination value Mptn indicating a current supply phase with which to execute a target position stopping and holding process is calculated.

If the control mode determination value "mode" is equal to "4" (reversing position stopping and holding process), the routine goes from step 5504 to step 5507, where a mode-4 routine shown in FIG. 26 is executed, whereby a current supply phase determination value Mptn indicating a current supply phase with which to execute a current supply position stopping and holding process is calculated.

As described above, if the control mode determination value "mode" is equal to 1, 3, or 4, a current supply phase determination value Mptn is calculated and the routine proceeds to step 5508, where a current supply processing routine shown in FIG. 27 is executed, that is, an ordinary drive, a target position stopping and holding processing, or a reversing position stopping and holding process is executed.

On the other hand, if the determination results at both of steps 5503 and 5504 are "no," that is, if the control mode determination value "mode" is equal to 0 or 5, the routine directly proceeds to step 5508, where the current supply processing routine shown in FIG. 27 is executed, that is, the current supply is turned off or an open-loop control is performed.

[Mode-1]

The mode-1 routine shown in FIG. 56 is a subroutine that is activated at step 5505 of the time-synchronous motor control routine of FIG. 55. In the mode-1 routine, a current supply phase determination value Mptn (current supply phase) for a feedback control start position stopping and holding process and a time-synchronous current supply phase setting process is set in the following manner.

Upon activation of this routine, at step 5511, the count CT1 of the current supply time counter that counts the time of a feedback control start position stopping and holding process is incremented. At the next step 5512, it is determined whether the time CT1 of the feedback control start position stopping and holding process has exceeded a prescribed time (e.g., 10 ms).

If the time CT1 of the feedback control start position stopping and holding process has not exceeded the prescribed time (e.g., 10 ms), the routine proceeds to step 5513, where it is determined whether the stopping and holding current supply phase storage flag Xhold is "off" (not stored), that is, whether the present instant is immediately before a start of the feedback control start position stopping and holding process. If the stopping and holding current supply phase storage flag Xhold is "off," the routine proceeds to step 5514, where a current position count Ncnt−Gcnt is set as a current supply phase determination value Mptn for the feedback control start position stopping and holding process:

$$Mptn = Ncnt - Gcnt$$

The current position count Ncnt−Gcnt is an encoder count Ncnt as corrected by using an initial positional deviation learned value Gcnt that was learned in an initial drive, and represents a current position of the rotor 32 correctly.

Then, the routine proceeds to step 5515, where the current supply phase determination value Mptn is divided by 12 and a remainder Mptn%12 is obtained. The number "12" is an increase or decrease of the encoder count Ncnt (current supply phase determination value Mptn) that occurs when current supply is effected for all the phases around. A current supply phase is determined according to the conversion table shown in FIG. 28 on the basis of the value Mptn%12.

At step 5516, whether one-phase current supply (U-phase, V-phase, or W-phase) is going to be performed is determined on the basis of whether the value Mptn%12 is equal to 2, 3, 6, 7, 10, or 11. If one-phase current supply is going to be performed, the routine proceeds to step 5517, where the current supply phase determination value Mptn is incremented by "2" that corresponds to one step so that two-phase current supply (U and V-phases, V and W-phases, or U and W-phases) will be performed. Executing the feedback control start position stopping and holding process with two-phase current supply which produces higher torque than one-phase current supply does prevents the rotor 32 from vibrating in the vicinity of a feedback control start position and hence can reliably stop and keep the rotor 32 at the feedback control start position.

The stopping and holding current supply phase storage flag Xhold is set to "on" (stored) at the next step 518, Then this routine is finished. When this routine is activated later, the determination result at step 5513 should become "no" and hence steps 5514-5518 are not executed. That is, the process of setting a current supply phase determination value Mptn (current supply phase) for the feedback control start position stopping and holding process is set is performed only once immediately before a start of the feedback control start position stopping and holding process.

Then, when the time CT1 of the feedback control start position stopping and holding process has exceeded the prescribed time (e.g., 10 ms), the determination result at step 5512 becomes "yes," whereupon the feedback control start position stopping and holding process is finished and a transition is made to a feedback control. During the feedback control, every time this routine is activated in the prescribed cycle (e.g., every 1 ms), the current supply phase setting routine of FIG. 31 is executed at step 5519, whereby a current supply phase determination value Mptn is calculated. It is noted that the current supply phase setting routine is also activated by a feedback control routine. Then, the routine proceeds to step 5520, where the feedback permission flag Xfb is set to "on" (feedback control permitted).

Figure 20:
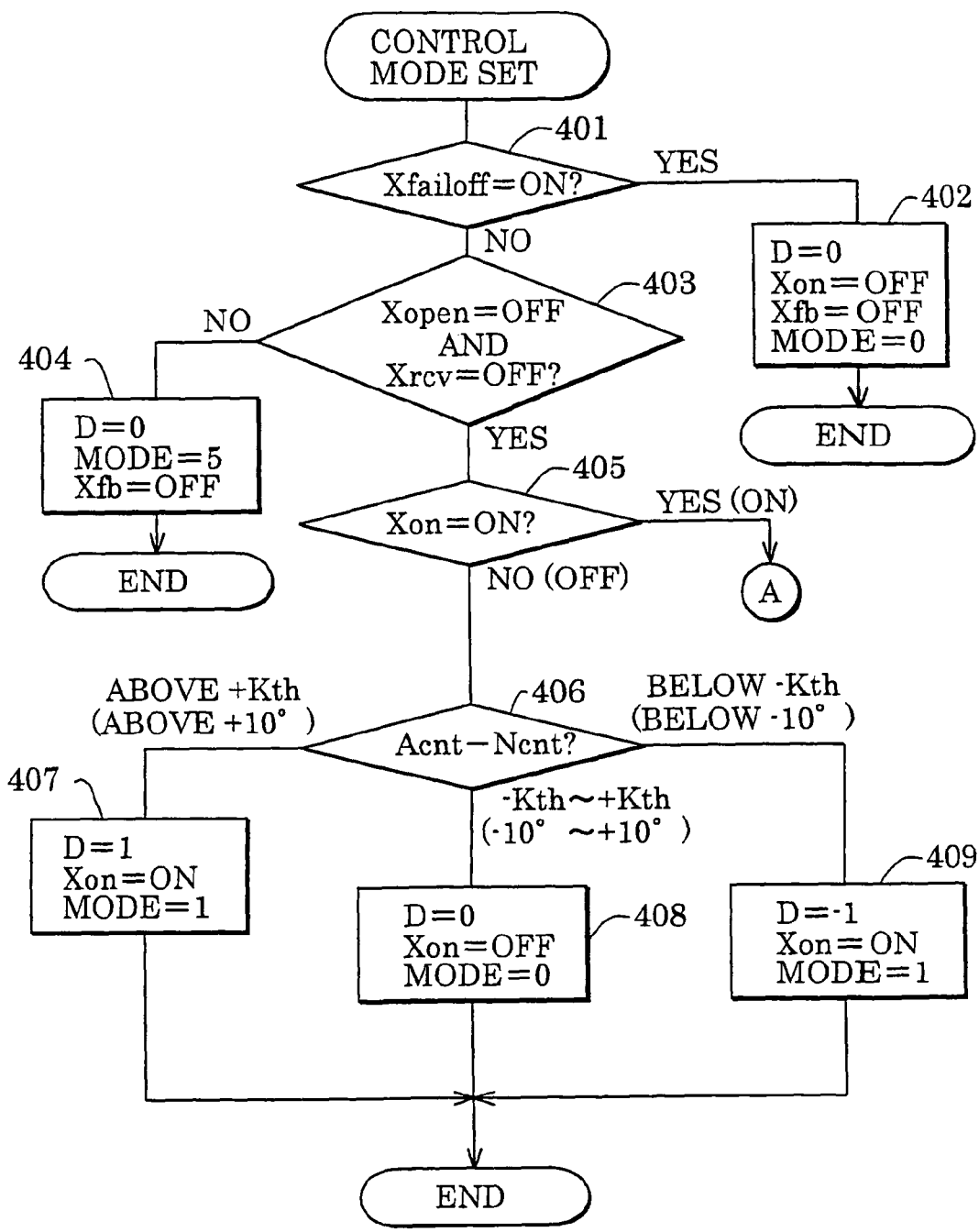

In the control mode setting routine of FIGS. 20-22, when the difference Acnt−Ncnt between the target count Acnt and the encoder count Ncnt has become smaller than or equal to the prescribed value because of the execution of the feedback control, it is determined that the rotor 32 has reached the target position (timing for finishing the feedback control) and the feedback permission flag Xfb is set to "off." The feedback control is finished and the control mode determination value "mode" is set to "3" (target position stopping and holding process). When the prescribed time (e.g., 50 ins) has elapsed thereafter, the control mode determination value "mode" is set to "0" (current supply off).

Since the mode-1 routine of FIG. 56 is not activated after the end of the feedback control, the current supply phase setting by the time-synchronous current supply phase setting process (step 5519) is performed from the start of the feedback control until the rotor 32 reaches the target position (i.e., until the feedback control is finished).

FIG. 32 is a time chart illustrating A-phase for which current supply is effected first in the case where rotation is started from a state corresponding to the U and W-phases. In this case, to start normal rotation (i.e., rotation from the P-position to the non-P-position), a current supply phase determination value Mptn is calculated according to the following equation by using an encoder count Ncnt, an initial positional deviation learned value Gcnt, and a normal rotation direction phase lead K1:

$$Mptn = Ncnt - Gcnt + K1$$

If the normal rotation direction phase lead K1 is equal to 4, for example, a current supply phase determination value Mptn is calculated according to the following equation:

$$Mptn = Ncnt - Gcnt + 4$$

To start normal rotation from a state corresponding to the U and W-phases, mod(Ncnt−Gcnt) is 4 and hence Mptn%12 is equal to 8 (=4+4). The U and V-phases are set as first current supply phases.

On the other hand, to start reverse rotation (i.e., rotation from the non-P-position to the P-position) from a state corresponding to the U and W-phases, if a reverse rotation direction phase lead K2 is equal to 3, for example, a current supply phase determination value Mptn is calculated according to the following equation:

$$\begin{aligned} Mptn &= Ncnt - Gcnt - K2 \\ &= Ncnt - Gcnt - 3 \end{aligned}$$

To start reverse rotation from a state corresponding to the U and W-phases, Mptn%12 is equal to 1 (=4−3). The V and W-phases are set as first current supply phases.

In this manner, by setting the normal rotation direction phase lead K1 and the reverse rotation direction phase lead K2 to 4 and 3, respectively, current supply phase switching patterns for the normal rotation direction and the reverse rotation direction can be made symmetrical. In either of the normal rotation direction and the reverse rotation direction, rotation can be started by effecting current supply first for A-phase of a position that is two steps deviated from the current position of the rotor 32.

[Current Supply Phase Setting]

The current supply phase setting routine of this embodiment is the same as that shown in FIG. 31. Upon activation of this routine, at step 611, it is determined whether the rotation direction instruction value D indicating a rotation direction toward a target position is equal to "1" that means the normal rotation direction (i.e., the rotation direction from the P-position to the non-P-position). If it is determined that the rotation direction instruction value D is equal to "1" (normal rotation), the routine proceeds to step 612, where it is determined whether the rotation direction of the rotor 32 has reversed (i.e., whether the encoder count Ncnt has decreased) contrary to the rotation direction instruction. If the rotation direction has not reversed, the routine proceeds to step 613, where the current supply phase determination value Mptn is updated according to the following equation by using a current encoder count Ncnt, an initial positional deviation learned value Gcnt, a normal rotation direction phase lead K1, and a speed phase lead correction amount Ks:

$$Mptn = Ncnt - Gcnt + K1 + Ks$$

The normal rotation direction phase lead K1 is A-phase lead of the current supply phase that is necessary to rotate the rotor 32 in the normal direction (i.e., A-phase lead of the current supply phase with respect to the current rotation phase of the rotor 32), and is set to "4," for example.

The speed phase lead correction amount Ks is A-phase lead correction amount that is set in accordance with a rotation speed of the rotor 32. For example, the speed phase lead correction amount Ks is set to "0" in a low-speed range and is increased to "1" or "2" as the rotation speed increases. As a result, the current supply phase determination value Mptn is corrected so as to indicate a current supply phase that is suitable for a rotation speed of the rotor 32.

On the other hand, if it is determined at step 612 that the rotation direction of the rotor 32 has reversed contrary to the rotation direction instruction, the current supply phase determination value Mptn is not updated to prevent progress of the reversed rotation. In this case, current supply is effected for the phase for which current supply was effected immediately before the reversing (i.e., the preceding current supply phase), whereby braking torque is generated in such a direction as to suppress the reversed rotation.

If it is determined at step 611 that the rotation direction instruction value D is equal to "−1" (the reverse rotation direction, i.e., the rotation direction from the non-P-position to the P-position), the routine proceeds to step 614, where it is determined whether the rotation direction of the rotor 32 has reversed (i.e., whether the encoder count Ncnt has increased) contrary to the rotation direction instruction. If the rotation direction has not reversed, the routine proceeds to step 615, where the current supply phase determination value Mptn is updated according to the following equation by using a current encoder count Ncnt, an initial positional deviation learned value Gcnt, a reverse rotation direction phase lead K2, and a speed phase lead correction amount Ks:

$$Mptn = Ncnt - Gcnt - K2 - Ks$$

The reverse rotation direction phase lead K2 is A-phase lead of the current supply phase that is necessary to rotate the rotor 32 in the reverse direction (i.e., A-phase lead of the current supply phase with respect to the current rotation phase of the rotor 32), and is set to "3," for example. The speed phase lead correction amount Ks is set in the same manner as in the case of the normal rotation.

On the other hand, if it is determined at step 614 that the rotation direction of the rotor 32 has reversed contrary to the rotation direction instruction, the current supply phase determination value Mptn is not updated to prevent progress of the reversed rotation (i.e., normal rotation). In this case, current supply is effected for the phase for which current supply was effected immediately before the reversing (i.e., the preceding current supply phase), whereby braking torque is generated in such a direction as to suppress the reversed rotation (i.e., normal rotation).

After the current supply phase determination value Mptn has been determined in the above manner, the current supply processing routine is executed. While the feedback control is being performed, a current supply phase corresponding to a value Mptn%12 is selected at step 555 by searching the conversion table and the windings 33 or 34 of the selected current supply phase are energized.

In the above embodiment, a time-synchronous current supply phase setting process that sets the current supply phase on the basis of the encoder count in a prescribed cycle (e.g., every 1 ms) from a start of a feedback control on the SR motor 12 until the rotor 32 is rotated to a rotation position is executed parallel with the feedback control. Therefore, even if the rotation of the rotor 32 is stopped for a certain reason during a feedback control the encoder 46 stops outputting an A-phase signal and a B-phase signal, the time-synchronous current supply phase setting process can set a current supply phase on the basis of an encoder count at that instant. Therefore, the rotor 32 can be rotated so as to come as close to a target position as possible. The reliability of the drive control (position switching control) on the SR motor 12 can thus be increased.

In this embodiment, a time-synchronous current supply phase setting process is executed in the entire period from the start of a feedback control to an instant when the rotor 32 reaches a target position. Therefore, with whatever timing the rotor 32 is stopped, the time-synchronous current supply phase setting process can set a current supply phase without delay immediately after the stop of the rotor 32. This provides an advantage that the stop time of the rotor 32 can be shortened.

However, in the invention, a time-synchronous current supply phase setting process may be continued until the rotor 32 is rotated to a target position in a period when the rotation speed of the rotor 32 is lower than or equal to a prescribed value. With this measure, a time-synchronous current supply phase setting process is executed only after the rotation speed of the rotor 32 has decreased to a value at which the rotor 32 may stop temporarily. This provides an advantage that the computation load of the CPU of the ECU 41 can be reduced.

As a further alternative, a time-synchronous current supply phase setting process may be executed only when the rotor 32 has stopped in the middle of a feedback control.

The present invention should not be limited to the above embodiments and modifications, but may be implemented in various other ways without departing from the spirit of the invention.

The invention claimed is:

1. A motor control apparatus comprising:
   an encoder for producing a pulse output signal in synchronism with rotation of a rotor of a motor that rotates a control object;
   pulse counting means for counting pulses of the output signal of the encoder;
   control means for detecting a rotation position of the rotor on the basis of a count of the pulse counting means during a drive control on the motor and sequentially switching a current supply phase of the motor so as to rotate the rotor to a target position;
   first current supply phase setting means for setting a current supply phase on the basis of the count of the pulse counting means in synchronism with output of a pulse of the output signal of the encoder during the drive control on the motor; and
   second current supply phase setting means for setting a current supply phase on the basis of the count of the pulse counting means in a fixed prescribed cycle until the rotor reaches the target position,
   wherein every time the first or second current supply phase setting means sets a current supply phase, the control means energizes a winding of the current supply phase thus set.

2. The motor control apparatus according to claim 1, wherein the encoder produces an A-phase signal and a B-phase signal that have a prescribed phase difference in synchronism with rotation of the rotor,
   the pulse counting means counts edges of the A-phase signal and the B-phase signal by edge interruption processing on the A-phase signal and the B-phase signal, and
   the first current supply phase setting means sets a current supply phase by edge interruption processing on the A-phase signal and the B-phase signal.

3. The motor control apparatus according to claim 1, wherein the second current supply phase setting means sets a current supply phase in the prescribe cycle from a start of the drive control until the rotor reaches the target position.

4. The motor control apparatus according to claim 1, wherein the second current supply phase setting means sets a current supply phase in the prescribe cycle until the rotor reaches the target position in a period in which a rotation speed of the rotor is lower than or equal to a prescribed value.

5. The motor control apparatus according to claim 1, wherein the motor is a switched reluctance motor.

6. The motor control apparatus according to claim 1, wherein the motor drives a position switching mechanism for switching between positions of an automatic transmission of a vehicle.

* * * * *